United States Patent
Jenkins

(10) Patent No.: US 7,392,254 B1
(45) Date of Patent: Jun. 24, 2008

(54) WEB-ENABLED TRANSACTION AND MATTER MANAGEMENT SYSTEM

(76) Inventor: Steven R. Jenkins, 9302 Timberhollow Cir., Dallas, TX (US) 75231

( * ) Notice: Subject to any disclaimer, the term of this patent is extended or adjusted under 35 U.S.C. 154(b) by 1286 days.

(21) Appl. No.: 09/949,738

(22) Filed: Sep. 10, 2001

Related U.S. Application Data

(63) Continuation-in-part of application No. 09/419,327, filed on Oct. 15, 1999.

(60) Provisional application No. 60/104,527, filed on Oct. 16, 1998.

(51) Int. Cl.
*G06F 17/30* (2006.01)

(52) U.S. Cl. .......................... 707/10; 707/9; 707/104.1

(58) Field of Classification Search ................ 707/1–4, 707/200, 202, 204, 10, 205, 9, 104.1; 705/1, 705/35, 37; 709/200, 204, 205; 711/100, 711/154, 161, 162; 345/700, 733, 751, 752, 345/759; 715/700, 733, 751, 752, 759
See application file for complete search history.

(56) References Cited

U.S. PATENT DOCUMENTS

| | | | | |
|---|---|---|---|---|
| 5,446,842 | A | * | 8/1995 | Schaeffer et al. ............ 709/205 |
| 5,623,655 | A | * | 4/1997 | Chisaka .......................... 707/8 |
| 5,815,415 | A | * | 9/1998 | Bentley et al. .................. 703/4 |
| 5,895,461 | A | * | 4/1999 | De La Huerga et al. ......... 707/1 |
| 6,012,045 | A | * | 1/2000 | Barzilai et al. ................ 705/37 |
| 6,088,717 | A | * | 7/2000 | Reed et al. ................... 709/201 |
| 6,212,549 | B1 | * | 4/2001 | Page et al. ................... 709/205 |
| 6,341,291 | B1 | * | 1/2002 | Bentley et al. .............. 707/203 |
| 6,453,328 | B1 | * | 9/2002 | Schaeffer et al. ............ 715/515 |
| 6,678,698 | B2 | * | 1/2004 | Fredell et al. ............. 707/104.1 |
| 6,769,013 | B2 | * | 7/2004 | Frees et al. .................. 709/205 |
| 7,213,030 | B1 | * | 5/2007 | Jenkins .................... 707/104.1 |

\* cited by examiner

*Primary Examiner*—Jean M. Corrielus
(74) *Attorney, Agent, or Firm*—Haynes and Boone, LLP

(57) ABSTRACT

A method and apparatus for a Web-enabled transaction and matter management application are described. In one embodiment, the application is centered around a user-friendly home navigation page designed to facilitate convenience for the user in accessing information or entering and tracking data. All information is sorted by project or matter name. A client user may view information one matter at a time, all matters at once, or any user-specified number of matters. Access is restricted to authorized users with password access rights. The application enables the tracking of information that is beneficial to all levels of the user's organization, that is substantive and relevant to different levels of the user's staff, and that aids the client in making informed decisions regarding its current transactions and documents relating thereto.

24 Claims, 99 Drawing Sheets

Fig. 5 new client information

| | |
|---|---|
| Client Name | ABC Corp |
| Attention | Adam Beck |
| Address1 | 901 Main Street |
| Address2 | Suite 3100 |
| City | Dallas |
| State | Texas ▼ |
| Zip Code | 75202 |
| Country | USA |
| Phone1 | 214.555.5555 |
| Phone2 | 214.555.5556 |
| Fax | 214.555.5557 |
| E-mail | becka@abccorp.com |
| Web Site | abccorp.com |
| Word Processing | WordPerfect 8.0 |

500    502—[Submit]  [Reset]

*Fig. 8* new client information

Client Name: ABC Corp

Matter Management
- ☑ Status
- ☑ Critical Dates
- ☑ CheckList
- ☑ Working Groups

Quick Views
- ☑ Hot Issue
- ☑ Discuss
- ☑ Responsibilities

Document Management
- ☑ Matter Library
- ☐ Client Library

Matter Notes
- ☑ Client Notes
- ☑ Counsel Notes
- ☐ Other Notes

Reports
- ☐ XXX1
- ☐ XXX2
- ☐ Billing Reports
- ☐ Custom Reports

800

[Submit] — 802

Fig. 10

Fig. 13 new client information

Client Name: ABC Corp

1300

| | Responsibility Party | Discussion Party | Approval Party | Working Group List | |
|---|---|---|---|---|---|
| Cathy Murray Haynes and Boone, LLP | ☑ | ☑ | ☑ | ☑ | Add 1302 |
| Clint Lofman Archon Group, L.P. | ☐ | ☐ | ☐ | ☐ | Add |
| Sherri Miller Archon Group, L.P. | ☐ | ☐ | ☐ | ☐ | Add |
| William Mundinger Archon Group, L.P. | ☐ | ☐ | ☐ | ☐ | Add |
| timo timo timo | ☐ | ☐ | ☐ | ☐ | |

Fig. 15

| First Name | Adam |
| MI | E. |
| Title | President |
| Company Name | ABC Corp |
| Address 1 | 901 Main Street |
| Address 2 | Suite 3100 |
| City | Dallas |
| State | Texas_ |
| Country | USA |
| Zip Code | 75202 |
| Phone Number 1 | 214.555.5555 |
| Phone Number 2 | 214.555.5556 |
| E-mail | becka@abccorp.com |
| Assistants Name | Sally Johns |
| Assistants Phone 1 | 214.555.5559 |
| Word Processor | WordPerfect 8.0 |
| Access Level | 5 |
| Phone Number 3 | 214.555.5558 |

1500

1502 — [Create User]  [Reset]

Fig. 17 new matter information

Figure 17:
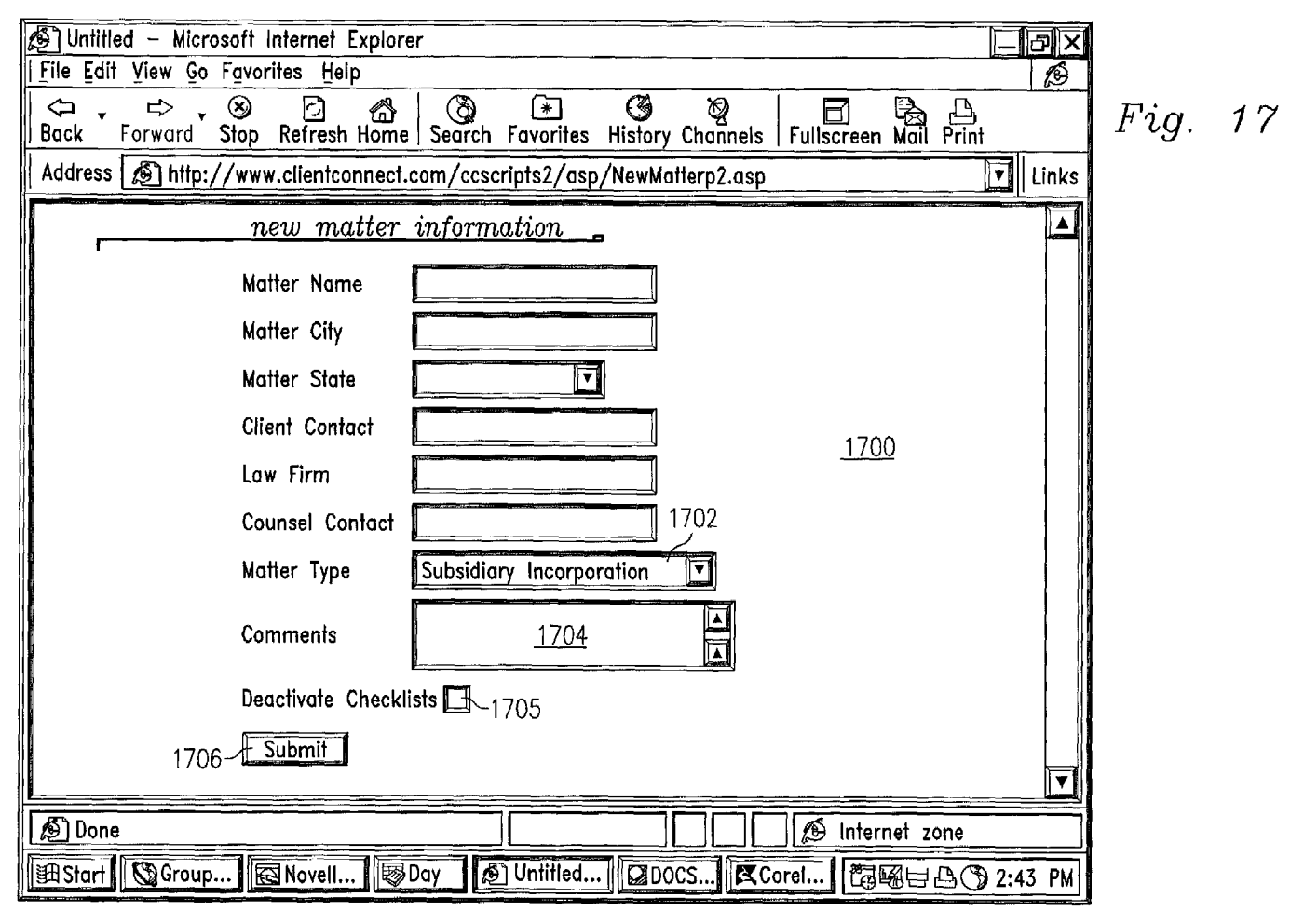

Matter Name
Matter City
Matter State
Client Contact
Law Firm
Counsel Contact
Matter Type: Subsidiary Incorporation  1704
Comments Deactivate Checklists  1705

1706 — Submit

1700

1702

Fig. 28 new user information 2800

| Last Name | First Name | Company Name | Edit Login/General Info | Assign Roles/Permissions | Delete User |
|---|---|---|---|---|---|
| beta | beta | beta.inc | Login/General Info | Assign Roles/Permissions//Update Permissions | Delete User |
| Barger | Ron | Archon Group, L.P. | Login/General Info | Assign Roles/Permissions//Update Permissions | Delete User |
| Burden | Buddy | Archon Group, L.P. | Login/General Info | Assign Roles/Permissions//Update Permissions | Delete User |
| Neblett | Tabb | Archon Group, L.P. | Login/General Info | Assign Roles/Permissions//Update Permissions | Delete User |
| Barshinger | Michael | Innovative Integration | Login/General Info | Assign Roles/Permissions//Update Permissions | Delete User |
| Beck | Adam | ABC Corp | Login/General Info | Assign Roles/Permissions//Update Permissions | Delete User |

HAYNES AND BOONE, LLP
Attorneys      *client connect*

_4500_

To post a new document please provide the following information...

Document Name ?  [_____]—4502
Version Comment  Original Version
Document Type ?  [Documents ▼]—4504
Application ?    [▼]—4506
Author           HB-Murray —4508
Document Path ?  [_____] [Browse...]
Document Reference ? [_____] (optional)—4510

[OK]—4512 [Cancel]

Help on posting a new document

Document Name – Please specify a descriptive name no greater than 80 characters in length.
Document Type – This category determines where the document will be listed on the Document Management Page.
Application – Please select the application from which this document was created.
Document Path – Please specify the location of the document to be posted.
Document Reference – This optional field can be used to store the originating DOCS Open document number, if applicable.

*Fig. 45*

HAYNES AND BOONE, LLP
Attorneys *client connect*

Document Profile...

| | |
|---|---|
| Application | |
| Document Number | 216 |
| Document Name | Office Lease Agreement, with Acme Corporation as Tenant |
| Author | HB-Jenkins |
| Last Edited By | HB-Jenkins |
| Document Type | Drafts |
| Originally Posted | 4/25/99 2:28:01 PM |
| Last Posted | 4/25/99 2:30:20 PM |
| Client | Archon Group, L.P. – Demo |
| Project | Echo Hills Shopping Center |
| Reference | C:\Download\00102-01.pdf |

Post New Version | Return

Document Versions...

| ID | Author | Last Posted | Comments | Actions |
|---|---|---|---|---|
| 216.1 | HB-Jenkins | 4/25/99 2:28:01 PM | Latest Draft, dated October 5, 1999, redlined to show changes by H&B from original draft, highlighted and annotated by Jenkins | View Download |
| 216.2 | HB-Jenkins | 4/25/99 2:30:20 PM | Tenant Comments, received October 12, 1999, including handwritten annotations by Tenants counsel with highlighting and comments by H&B | View Download |

Document History...

| ID | Author | Activity Date | Activity Type |
|---|---|---|---|
| 216.1 | HB-Jenkins | 4/25/99 2:28:01 PM | Create |
| 216.1 | HB-Jenkins | 4/25/99 2:29:19 PM | Edit Version Profile |

*Fig. 54*

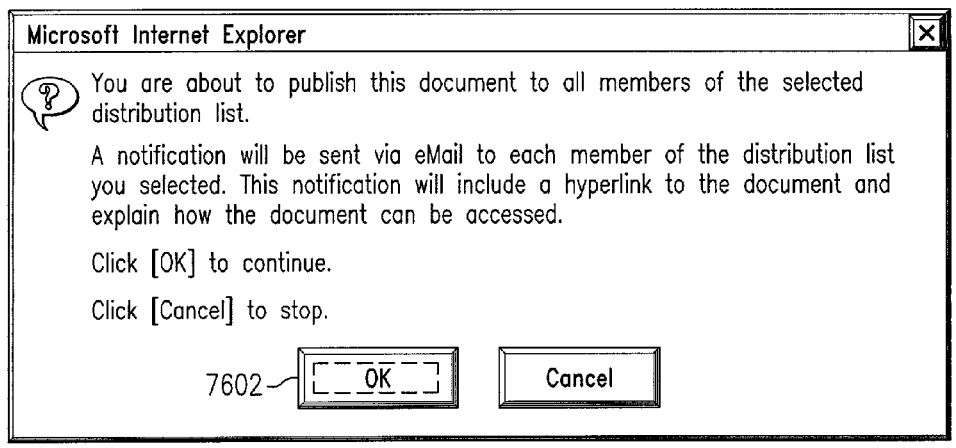
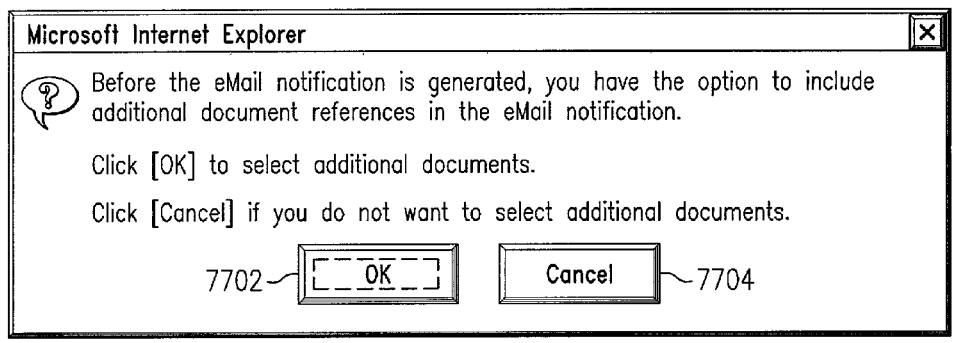
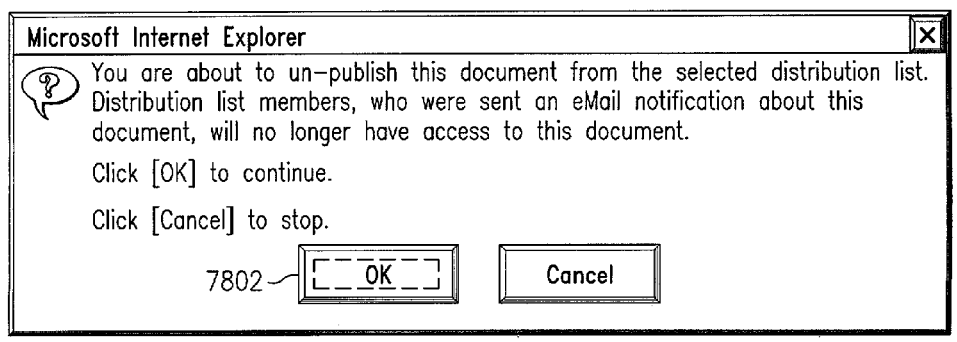

| Publishing Document to ccDocs |
|---|

At this time there are no distribution lists for this Matter. In order to publish and distribute a document, complete the form below to create a distribution list.

A distribution list is essentially a list of eMail addresses. In the field below, please list each eMail address separated by a comma. The next step will permit you to provide additional optional information for each member of the distribution list (name, company, phone, fax).

Members:*  
7902

For Example: "user@domain.com, email@abcdefg.com, userb@domain.net"

List Name:* ──────────────── 7904

7906 — [💾 Save]   [X Cancel]

* —red asterisk denotes required fields

| Publishing Document to ccDocs |
|---|
| Edit Distribution List |

| Company | Name | eMail* | Phone | Fax | 8002 |
|---|---|---|---|---|---|
|  |  | wilsonk@abc.com * |  |  | DELETE |
|  |  | knelson@mdb.org * |  |  | DELETE |
|  |  | johnstonb@yahoo * |  |  | DELETE |

To add new members to this Distribution List, please list each eMail address separated by a comma. After you click the [Save] button, you will be able to provide additional optional information for each new member of the distribution list (name, company, phone, fax).

Additional Members:  
(optional)  
8004

For Example: "user@domain.com, email@abcdefg.com, userb@domain.net"

List Name:* [Client ──────────────── ] ─ 8005

8006 — [💾 Save]

Fig. 83

Table of Contents

- My Portfolios
- Reports
- Administration
  - Companies
  - People
  - Projects
  - ABC Corporation
    - Abrams Place Shopping
    - Casa Manana
    - Commerce Street Plaza
    - Duck Creek & SH 321
    - Echo Hills Shopping Center
  - ACME Company
    - Wylie Company
- Portfolio Manager

Administration --> Company

Select Company:

Step 1: Search company database

Company: [Begins With ▼] [ab] [10 Records Per Page ▼]

[Search]

Step 2: Select appropriate company or click the [ Add New Company ] button

Company
ABC Corporation
ABC Software

Records 1 - 2 of 2

[Add New Company]

Helpful Hints:
- Use this form to search the company database then edit company records.
- If the company does not already exist, the search results will present an option to add a new company to the database.

Company Profile for ABC Corporation

Details

Company: ABC Corporation
Web Site: abccorp.com

| Location | Address |
|---|---|
| Headquarters | <View Address> |

Edit ~8404a

8402a

License Status:

8404b  8405a — <View Licensed Components>
Edit   8405b — <View Unlicensed Components>

8402b

Company Permissions:

8404c  8410a — <View Company Administrators>
Edit   8410b — <View People who can create new Project>

8402c

People Groups:

| Name | Description | | |
|---|---|---|---|
| Core Users 1 | The Main List of users | 8414 — <View Members> | |
| Secondary Group | | 8414 — <View Members> | |

Edit ~8404d

8402d

Project Templates:

Edit ~8404e          <View Templates>

8402e

Project Categories:

| Category Name | Category Type |
|---|---|
| [*] Default | Department |
|   [*] Default | Project Type |
|     [*] Sub type 1 | Project Sub-Type |
| [*] Main | Project Type |
| [*] Main | Project Type |

Edit ~8404f

```
┌─────────────────────────────────────────────────┐
│              Licenses for ABC Corporation       │
├─────────────────────────────────────────────────┤
│ <<< Click here to return to the Company Profile─ 8604 │
├─────────────────────────────────────────────────┤
│ Licenses:                                       │
├─────────────────────────────────────────────────┤
│ Select the components this company has licensed │
│   ☑ Status Component                            │
│   ☑ Notes Component 1                           │
│   ☐ Notes Component 2                           │
│   ☐ Notes Component 3                           │
│   ☑ Dates Component                             │
│   ☑ Checklist Component                         │
│   ☑ Document Management Component               │
│   ☑ Response Threading Component                │
│   ☑ Contact Management Component                │
│   ☑ ccDocs Component                            │
│  [ Edit ] ─ 8602                                │
└─────────────────────────────────────────────────┘
                              ⊕ Internet
```

Fig. 87

```
Add Permissions:
  Step 1: Search the people database
    First Name:  [Begins With ▼] [_____]
    Last Name:   [Begins With ▼] [_____]
    Company:     [Begins With ▼] [_____]
    Sort Order:  ● Person    ○ Company
    Max Records: [10 Records Per Page ▼]  [Search]~8706
                                                        } 8702
  Delete Permissions:
    Company Administrators: [Haynes and Boone, LLP --> Mark Zeigler]
    People who can
    Create New Projects: [ACME Company --> Bob Smith]
                                                        } 8704
           [Delete Selected People]~8714
```
8700

Fig. 87a

```
Add Permissions:
  Step 1: Search the people database
    First Name:  [Begins With ▼] [cathy_____]
    Last Name:   [Begins With ▼] [murray_____]
    Company:     [Begins With ▼] [_____]
    Sort Order:  ● Person    ○ Company
    Max Records: [10 Records Per Page ▼]  [Search]~8706
                                                        } 8702
  Step 2: Select one or more people, specify permissions, then click
  [ Add Selected Permission ]
    Person          Company              Permission
    ☐ Cathy Murray  Haynes Boone LLP  [Create New Projects ▼]~8710
           [Add Selected Permission]~8712                } 8708
              Records 1 - 2 of 2
  Delete Permissions:
    Company Administrators: [Haynes and Boone, LLP --> Mark Zeigler]  } 8704
```

ABC Corporation --> [ New Project ]

The settings for a project have been divided into three major categories:

Step 1: Project Profile   <---- You are here!
Step 2: Project Configuration
Step 3: Permissions Project Details:

Project Owner: ABC Corporation
Project Name:* Galleria Project
Department:* Default
Project Type:* <Select Project Type>
Project Sub-Type:
Description:

Date Created: 4/26/2001
Start Date:* 4/26/2001 ~9402 ~9404

⊞ Project Leads: ~9402
⊞ Project Links: ~9404

9400

Table of Contents
My Portfolios
Reports
Administration
  Companies
  People
  Projects
ABC Corporation
  Abrams Place Shopping
  Casa Manana
  Commerce Street Plaza
  Duck Creek & SH 321
Client Connect
  Weekly Update
Portfolio Manager
Change Password
Logout

WEB-ENABLED TRANSACTION AND MATTER MANAGEMENT SYSTEM

CROSS-REFERENCE TO RELATED APPLICATION

This application claims the benefit of U.S. Provisional Patent Application Ser. No. 60/104,527, filed on Oct. 16, 1998, and is a continuation-in part of U.S. patent application Ser. No. 09/419,327, filed Oct. 15, 1999, both of which are hereby incorporated by reference in their entireties.

BACKGROUND

The disclosures herein relate generally to communications software applications and more particularly to a Web-enabled transaction and matter management system.

The needs of a company for effective channels of communication among its own employees as well as between those employees and its service providers have never been greater. For example, the current volume and velocity of transactions and matters have strained traditional ways of working and communicating between law firms or other outside service providers and their clients. Many clients have expressed an interest in harnessing the power of technology, in general, and the Worldwide Web (the "Web"), in particular, to create a competitive edge that enables them to better manage their transactional and matter processes.

Recent advances in technology, particularly the growth in the acceptability of the Web, have created the possibility of applying technology to develop more innovative and efficient ways of working and communicating between clients and their outside service providers (e.g., law firms, accounting firms, advertising agencies); however, most applications available today fall far short of meeting the clients' needs and expectations.

Other currently available information management applications are targeted primarily to a company's in-house service providers and their staff—to the exclusion of the business people. In addition, applications are largely passive, with the company's employees merely viewing information entered by an outside service provider. The reports generated by such applications are also fairly limited in scope, including, for example, cost and expense-centered reports.

Therefore, what is needed is a system for providing more effective channels of communication between a client and its employees and the client's outside service providers.

SUMMARY

One embodiment, accordingly, provides a method and apparatus for a Web-enabled transaction and matter management application in the form of a software application. Considering the legal service provider example, in one embodiment, the application operates according to the following functions:

1. the information tracked is beneficial to all levels of a client's organization, including the CEO, senior managers, business people, support staff, and general counsel, where applicable;
2. the information tracked is substantive and relevant to different levels of the client's staff, and aids the client in making informed decisions regarding its current transactions and documents relating thereto;
3. the application functions consistent with the way the client works and thinks;
4. the application is flexible and adaptable to the client's specific types of transactions and matters;
5. the information is available 24 hours a day, seven days a week from any location in the world and connectivity is simple yet dependable;
6. the application is user-friendly and needs minimal training time;
7. the application is useable by clients and their outside counsel without requiring them to retool their own hardware and software; and
8. the application is versatile enough to permit clients that have multiple outside service providers to link all outside service providers together so that the client has the benefit of flowing transaction and matter information to and from such outside service providers in a uniform way.

The application of the present invention is designed to meet any or all of the above functions. Accordingly, in one embodiment, the application is the first Web-enabled, fully interactive transaction and matter management application designed from the client's perspective.

In this embodiment, the application is centered around a user-friendly home navigation page designed to facilitate convenience for the client user in accessing information or entering data. All information is sorted by project or matter name. The number of matters is virtually unlimited. A client user may view information one project at a time, all matters at once, or any user-specified number of projects. Access is restricted to authorized users with password access rights.

The following features are also important in embodiments of the application:

1. information and data, whenever possible, flow or are directed to specific individuals within the client's organization or the outside service provider's firm to facilitate the greatest awareness of relevant information with the least amount of user effort;
2. in order to avoid "information overload," information and data entered using the invention is continually filtered, without specific action required by the client user, so that the client user is viewing currently relevant information unless the client user desires to see unfiltered information; and
3. client and counsel users are able to respond to any item of information or question in a quick, convenient fashion without the need to access or use another application.

A technical advantage achieved with the invention is that it is beneficial to all levels of clients' staff, including CEO, senior managers, business people, support staff, and general counsel, providing each with the information they need to be aware of.

Another technical advantage achieved with the invention is that it provides interactive tracking and management of substantive business and legal information to facilitate decision-making by the client.

Another technical advantage achieved with the invention is that it is accessible 24 hours a day by authorized client and counsel users from his or her office or home computer or from any other computer via Internet connection.

Yet another technical advantage achieved with the invention is that it connects the client and its outside service providers in a private virtual office.

Yet another technical advantage achieved with the invention is that it is password protected with extensive security features.

Still another technical advantage achieved with the invention is that it is suitable for clients with either a large number of transactions or single complex matters.

BRIEF DESCRIPTION OF THE DRAWINGS

FIG. 4 illustrates a "Wizard Main Menu" screen of the application of FIG. 1 or 1a.

FIG. 5 illustrates a "New Client Information" screen of the application of FIG. 1 or 1a.

FIG. 6 illustrates a "Practice Area/Client Work Group Designation" screen of the application of FIG. 1 or 1a.

FIG. 7 illustrates a "New Matter Designation" screen of the application of FIG. 1 or 1a.

FIG. 8 illustrates a "Select Components" screen of the application of FIG. 1 or 1a.

FIG. 9 illustrates a "Name Categories for Components" screen of the application of FIG. 1 or 1a.

FIG. 10 illustrates a "Name Columns for Checklists" screen of the application of FIG. 1 or 1a.

FIG. 11 illustrates a "Name Checklists" screen of the application of FIG. 1 or 1a.

FIG. 12 illustrates a "User Search" screen of the application of FIG. 1 or 1a.

FIG. 13 illustrates an "Add User to User Groups" screen of the application of FIG. 1 or 1a.

FIG. 14 illustrates a "Role Designation" screen of the application of FIG. 1 or 1a.

FIG. 15 illustrates a "New User Information" screen of the application of FIG. 1 or 1a.

FIG. 16 illustrates an "Add New Matter" screen of the application of FIG. 1 or 1a.

FIG. 17 illustrates a "New Matter Information" screen of the application of FIG. 1 or 1a.

FIG. 18 illustrates a "Modify Client Level Information" screen of the application of FIG. 1 or 1a.

FIG. 19 illustrates a "Change Roles" screen of the application of FIG. 1 or 1a.

FIG. 20 illustrates an "Edit User Group" screen of the application of FIG. 1 or 1a.

FIG. 21 illustrates a "Change Component Settings" screen of the application of FIG. 1 or 1a.

FIG. 22 illustrates a "Component Selections" screen of the application of FIG. 1 or 1a.

FIG. 22a illustrates a "Modify Component/Items Categories" screen of the application of FIG. 1 or 1a.

FIG. 22b illustrates a "Change Checklists" screen of the application of FIG. 1 or 1a.

FIG. 22c illustrates a "Change Checklist Settings" screen of the application of FIG. 1 or 1a.

FIG. 23 illustrates a "Modify Checklist Items/Categories" screen of the application of FIG. 1 or 1a.

FIG. 24 illustrates an "Add User Group" screen of the application of FIG. 1 or 1a.

FIG. 25 illustrates a "User Search" screen of the application of FIG. 1 or 1a.

FIG. 26 illustrates a "Search Results" screen of the application of FIG. 1 or 1a.

FIG. 27 illustrates a "Modify User Information" screen of the application of FIG. 1 or 1a.

FIG. 28 illustrates a "Search Results" screen of the application of FIG. 1 or 1a.

FIG. 29 illustrates an "Add User to Matters" screen of the application of FIG. 1 or 1a.

FIG. 29a illustrates a "Specify User Access Levels" screen of the application of FIG. 1 or 1a.

FIG. 30 illustrates a "Delete Client" screen of the application of FIG. 1 or 1a.

FIG. 33 illustrates a "Counsel Notes" screen of the application of FIG. 1 or 1a.

FIG. 33d illustrate a "Counsel Notes E-mail" screen of the application of FIG. 1 or 1a.

FIG. 42a illustrates a flowchart of the operation of a Matter Library function of the application of FIG. 1 or 1a.

FIG. 45 illustrates a "Document Profile" screen of the application of FIG. 1 or 2.

FIG. 54 illustrates the Document Profile screen of FIG. 48 when the user that is logged on is not the author of the subject document.

FIGS. 74-81 illustrate a document publishing website feature of the alternative embodiment of the application of FIGS. 1 and 1A.

FIGS. 82-88 illustrate a company administrative component of the alternative embodiment of the application of FIGS. 1 and 1A.

FIGS. 89-92 illustrate a people administrative component of the alternative embodiment of the application of FIGS. 1 and 1A.

FIGS. 93-95 illustrate a projects administrative component of the alternative embodiment of the application of FIGS. 1 and 1A.

DESCRIPTION OF A PREFERRED EMBODIMENT

Figure 1:
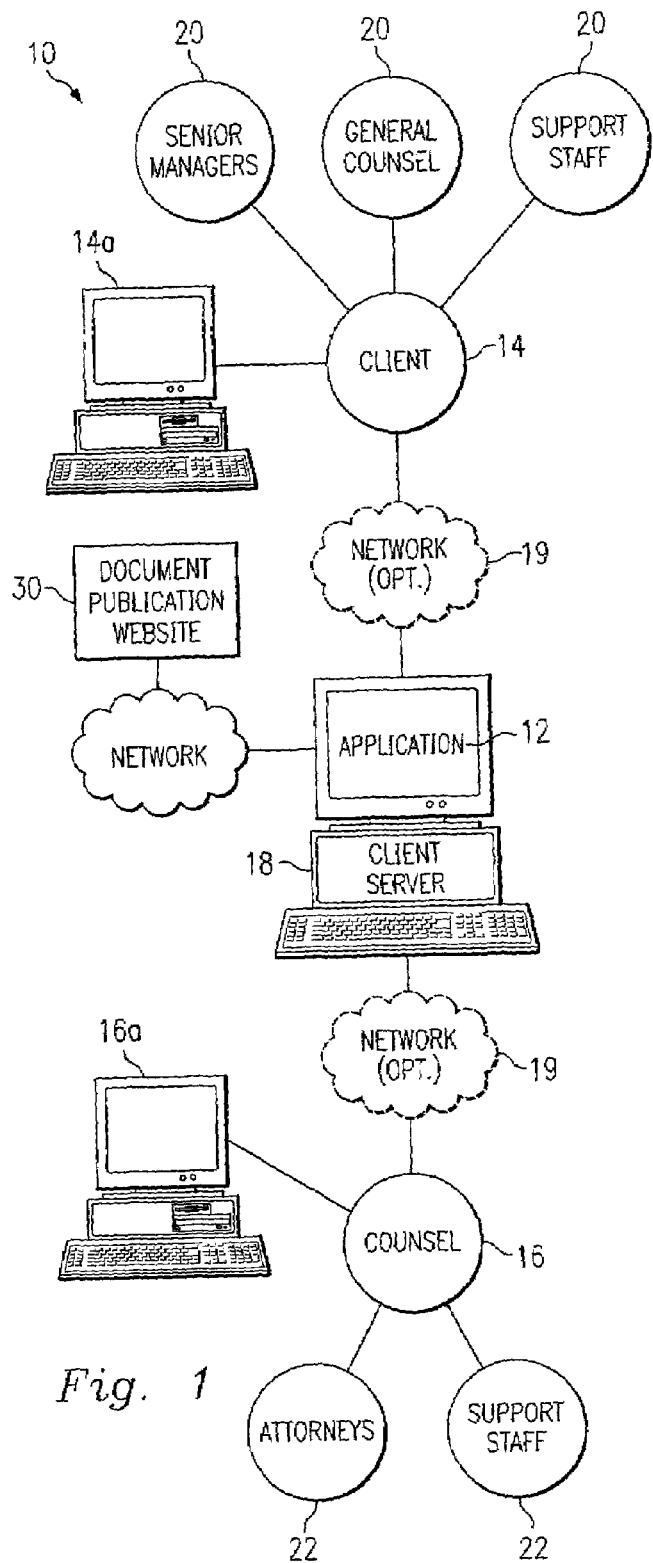
FIG. 1 illustrates one network environment for implementing the application of the present invention.

FIG. 1 illustrates one embodiment of a communications environment 10 in which a transaction and matter management application 12 embodying features of the present invention may be implemented. The communications environment 10 is designed to facilitate communication between a client 14, which may be, for example, a small company or large corporation, and a provider such as a single outside counsel 16 via a client server 18 which includes one or more computers. The client 14 and the outside counsel 16 each include one or more computers, such as a computers 14a and 16a, respectively.

It should be noted that, as used herein, the term "outside counsel" shall be deemed to include any type of outside service provider, including, for example, law firms, accounting firms, advertising agencies, etc. The specific example of a law firm is used herein to facilitate a complete understanding of the invention and should not be construed to limit application of the invention in connection with other outside service providers.

In the embodiment shown in FIG. 1, the client server 18 is preferably located on the premises of a third party provider for that third party provider to maintain and service; however, it is possible that the client server 18 will be located on the client's premises. It will be recognized that the application 12 resides on the client server 18.

To illustrate different configurations, a network 19 is shown in phantom between the client server 18 and the client 14 as well as between the client server and the outside counsel 16. It is understood that many different configurations of the network 19 may exist, and the network may be of different types, e.g., a voice network, a data network, a public switched telephone network, or a local area network ("LAN"). Also, in some applications, the client server 18 may represent a functional subset of the computer 14a.

It should also be recognized that both the client 14 and the outside counsel 16 will typically comprise a LAN to which several individual client users 20 and counsel users 22 are respectively connected. Examples of client users include senior managers, general counsel, support staff, and business people. Examples of counsel users include attorney's and staff. Of course, legal service providers are merely one example of participants in the present invention. Other examples include accounting service providers, maintenance providers, and others.

Figure 1A:
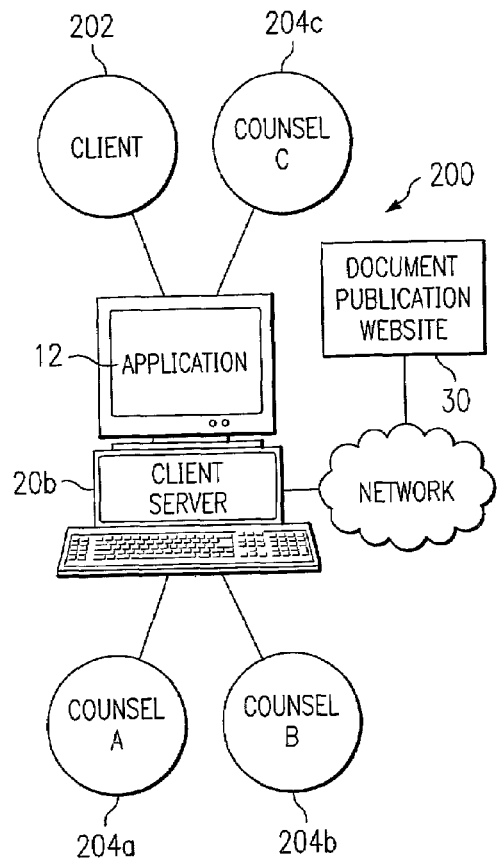
FIG. 1a illustrates an alternative network environment for implementing the application of the present invention.

FIG. 1a illustrates an alternative embodiment of the communications environment 10 (FIG. 1), designated by a reference numeral 200, in which the transaction and matter management application 12 may be implemented. Computers and networks exist in the environment 200, such as is shown in FIG. 1. In contrast to the communications environment 10, the communications environment 200 is designed to facilitate communication between a client 202 and multiple outside counsel, represented in FIG. 1a by three outside counsel 204a, 204b, 204c, via a client server 206. Also in contrast to the embodiment shown in FIG. 1a, in the embodiment shown in FIG. 1a, the client server 206 is preferably located on the client's premises, to facilitate access by the multiple outside counsel 204a-204c. Again, the application 12 resides on the client server 206.

Although not shown in FIG. 1a, it will be recognized that, as discussed with respect to FIG. 1, the environment 200 supports a variety of client users (e.g., senior managers, general counsel, support staff, and business people) and counsel users (e.g., attorneys and support staff) via respective LANs of the client 202 and counsel 204a-204c.

Figure 2:
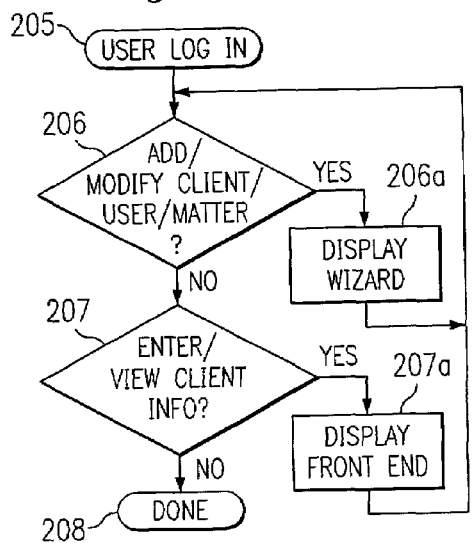
FIG. 2 is a flowchart of the operation of the application of the present invention.
Figure 2A:
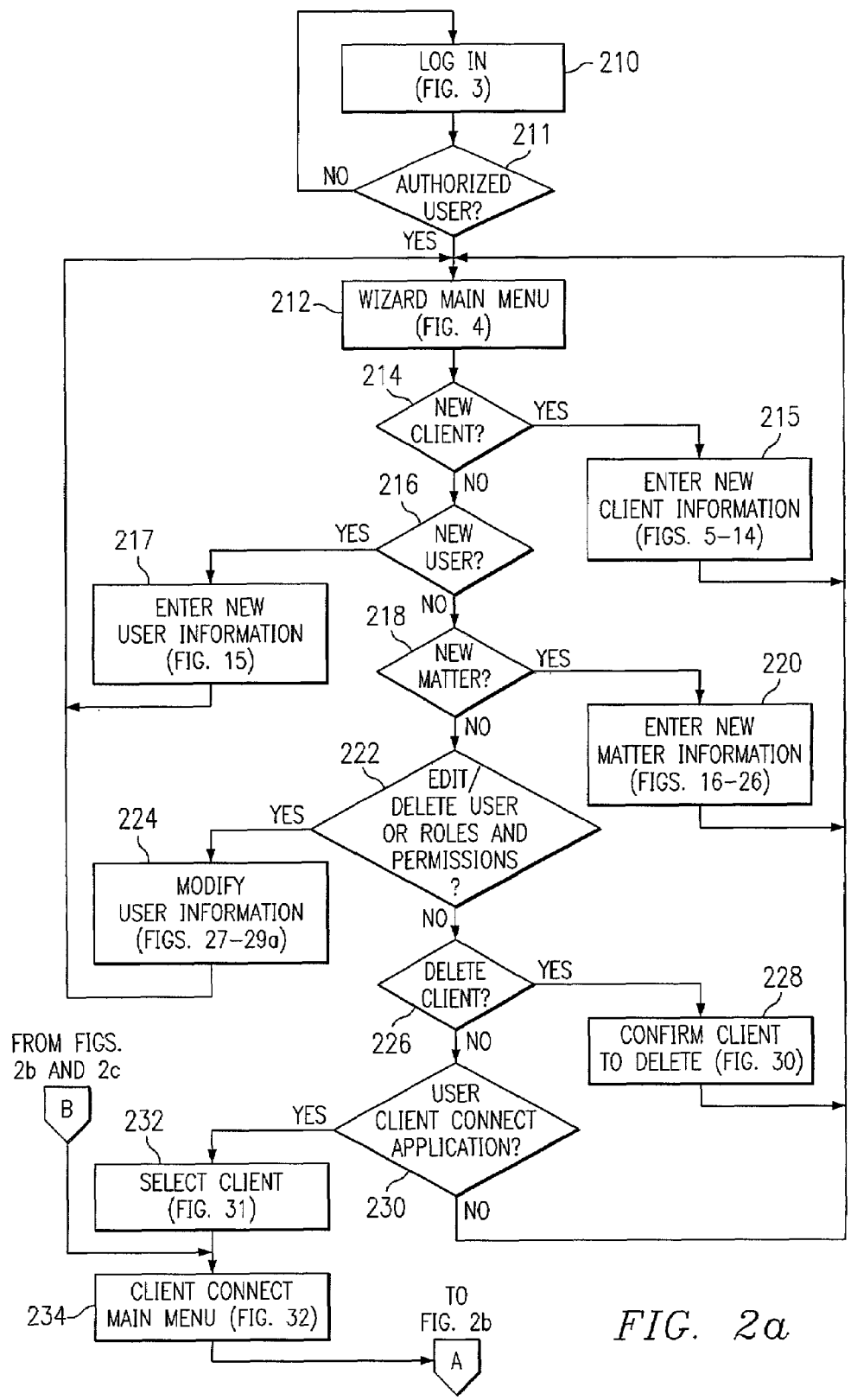
FIGS. 2a-2c illustrate a more detailed flowchart of the operation of the application of the present invention.
Figure 2B:
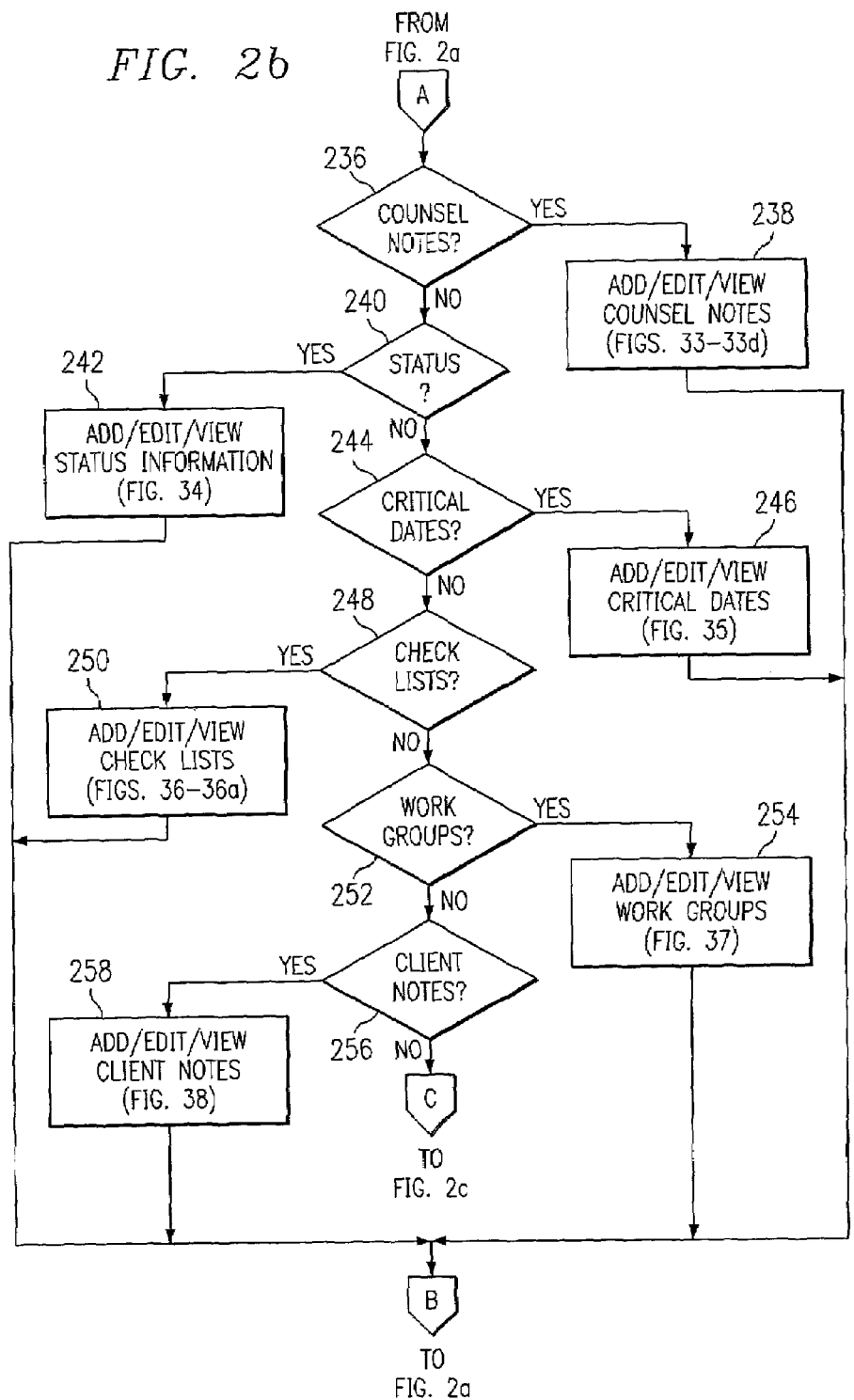
Figure 2C:
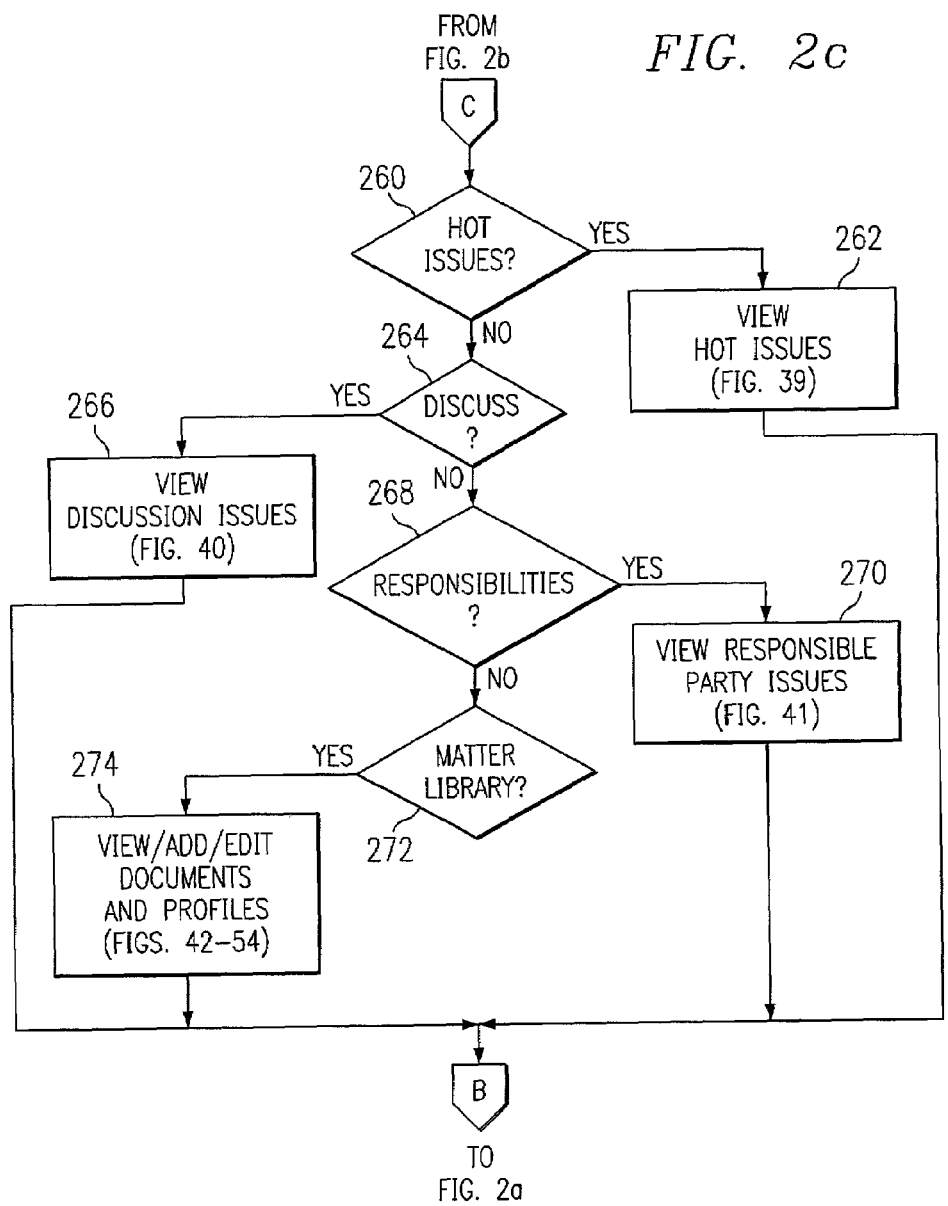
Figure 3:
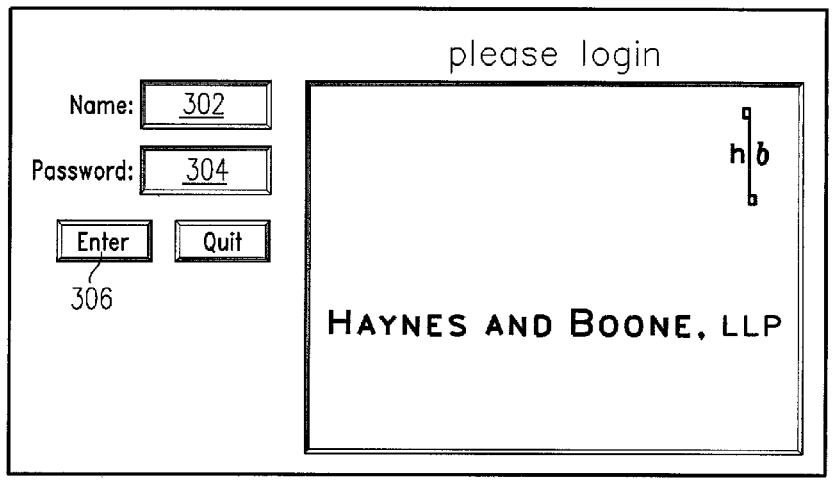
FIG. 3 illustrates a log in screen of the application of FIG. 1 or 2.

FIG. 2 illustrates a flowchart of the operation of the application 12. FIGS. 2a-2c illustrate a more detailed flowchart of the operation of the application 12. FIG. 3 et seq. are used to illustrate the operation and use of the application 12. Using a computer associated with either the client 14, in the case of a client user, or counsel 16, in the case of a counsel user, a user initially accesses a home page of the application 12, it being recognized that this may be accomplished by entering the Internet "address" for the home page in the appropriate field of a web browser application executing on the user's computer.

In general, referring to FIG. 2, in step 205, the user logs in to the application 12 using a log in screen 300 (FIG. 3). The log in process is described in further detail below in connection with step 210 (FIG. 2a). In step 206, a determination is made whether the user wants to add or modify a client, matter, or user. If so, execution proceeds to step 206a, in which a Wizard function of the application 12, which enables authorized users to configure the appearance of a front end of the application as described in greater detail below with reference to FIGS. 4-30, is displayed; otherwise, execution proceeds to step 207, in which a determination is made whether the user wants to access the front end of the application to enter and/or access client information as described below. If so, execution proceeds to step 207a, in which the front end function, as described in greater detail with reference to FIGS. 31-54, is displayed; otherwise, execution terminates in step 208.

Figure 4:
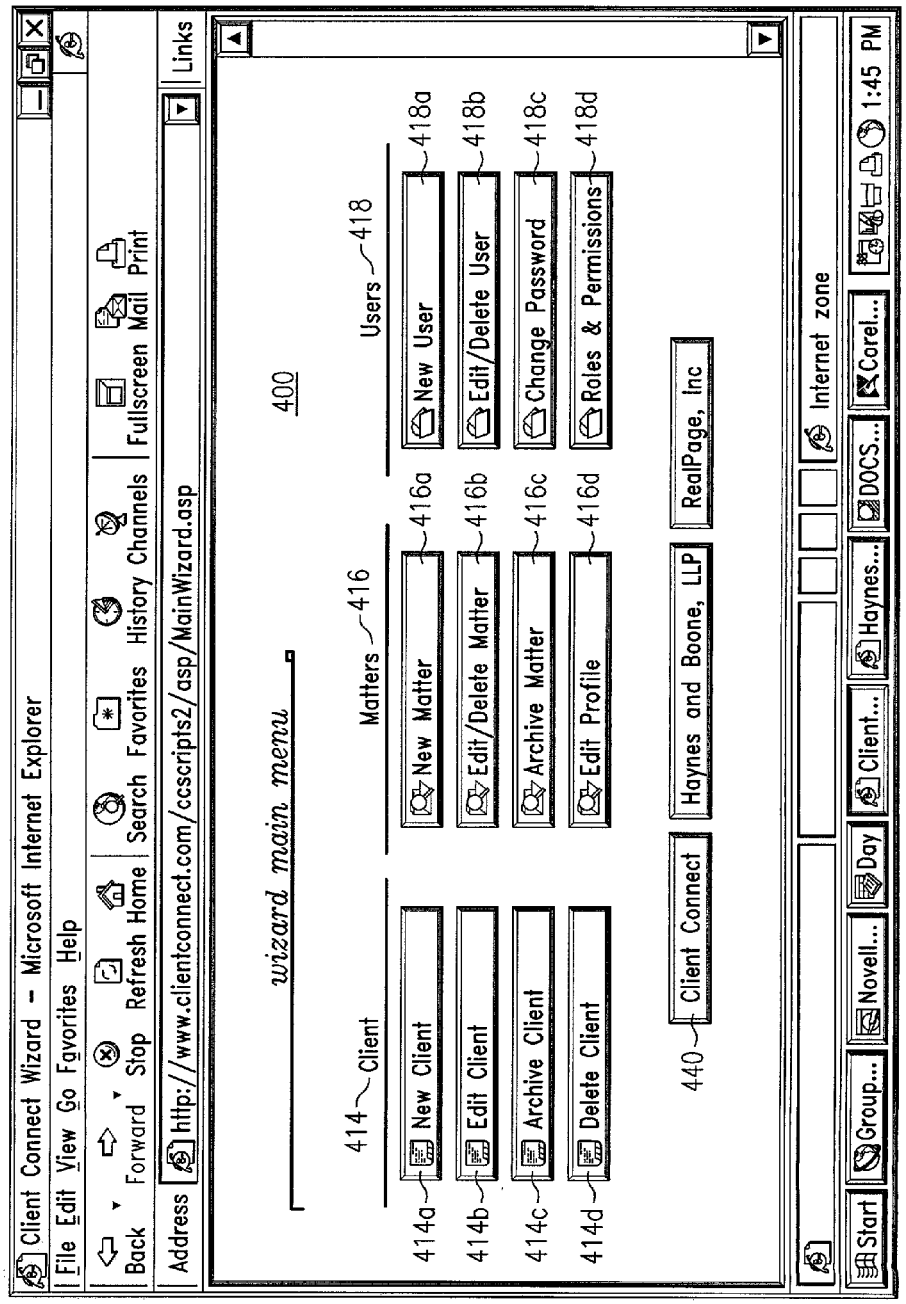

Referring now to FIGS. 2a-2c, in step 210 (FIG. 2a) the user logs in to the application using a log in screen 300, as shown in FIG. 3. The log in process serves as a security measure, such that only those users who are authorized to access use the application 12 will be granted access thereto. Once a user has entered a name and password in the appropriate fields 302 and 304, respectively, and clicks on an "Submit Query" button 306, in step 211, the application 12 determines whether the name and password correspond to an authorized user. If so, execution proceeds to step 212 (FIG. 2a) in which a "Wizard Main Menu" screen 400, as illustrated in FIG. 4, is displayed.

As will be described in greater detail below with reference to FIGS. 4-30, the Wizard of the application 12 enables an authorized user to control the appearance and other features of the application as presented to other "front end" users, as also described below (FIG. 31 et seq.), using a plurality of buttons displayed on the Main Menu screen 400. For ease of location and use, the buttons are divided into three categories, respectively designated "Client" 414, "Matters" 416, and "Users" 418. The buttons included in the Client category 414 include "New Client" 414a, "Edit Client" 414b, "Archive Client" 414c, and "Delete Client" 414d. The buttons included in the Matters category 416 include "New Matter" 416a, "Edit/Delete Matter" 416b, "Archive Matter" 416c, and "Edit Profile" 416d. Finally, the buttons included in the Users category 418 include "New User" 418a, "Edit/Delete User" 418b, "Change Password" 418c, and "Roles & Permissions" 418d. Several of the more important functions and features accessible using these buttons will be described below.

Figure 6:
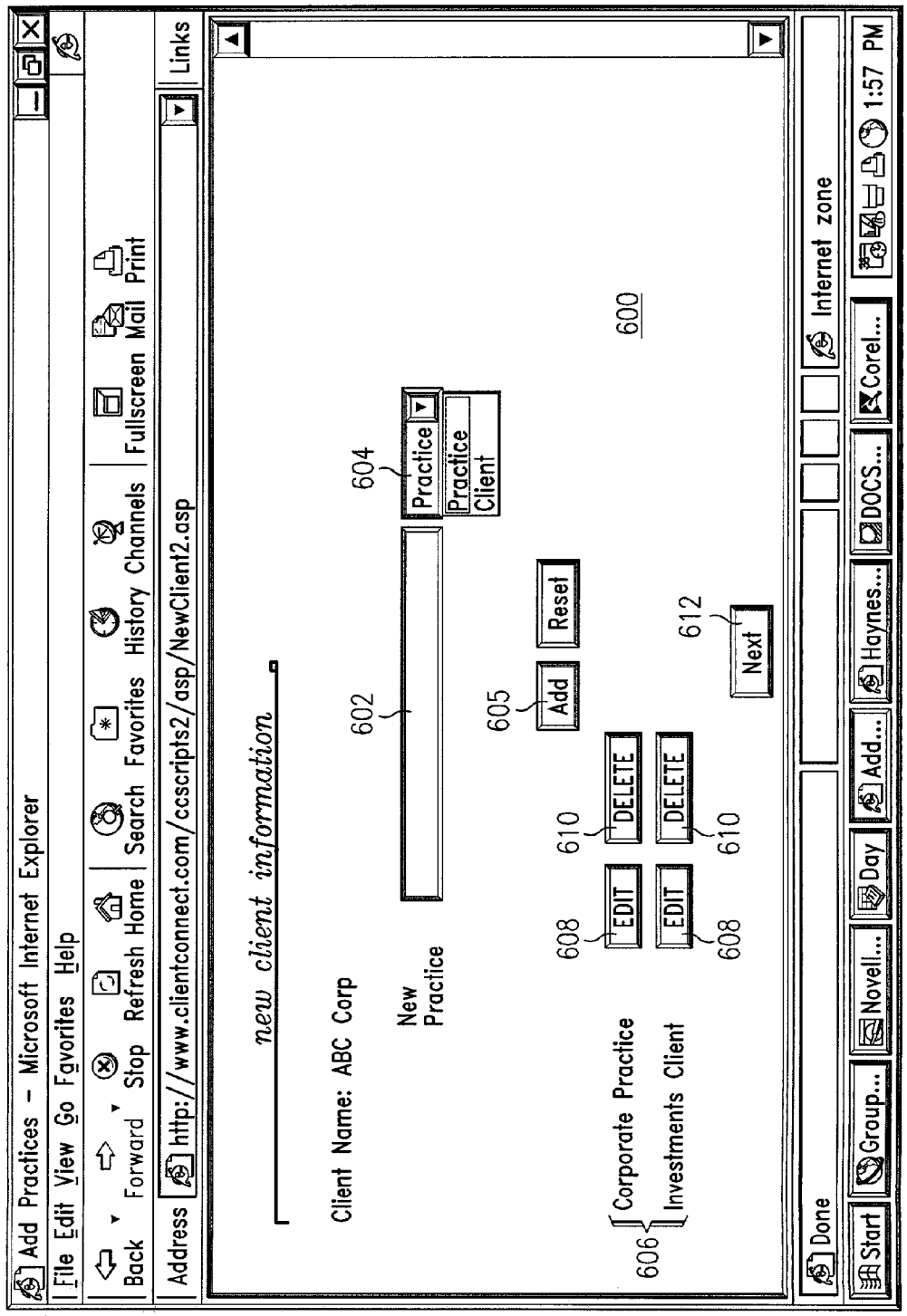

In step 214, a determination is made whether the user has clicked on the New Client button 414a. If so, execution proceeds to step 215, in which a "New Client Information" screen 500, as illustrated in FIG. 5, is displayed. Using this screen 500, the user enters in the appropriate fields all of the information relevant to establishing a new client, including, for example, the client's name and a primary contact, as well as the client's address, phone and fax numbers, E-mail address, and web site address, if any, and a designation of the client's word processing system. Once all of the relevant information is entered in the respective fields, clicking on a "Submit" button 502 results in the display of a "Practice Area/Client Work Group Designation" screen 600, as illustrated in FIG. 6.

Figure 7:
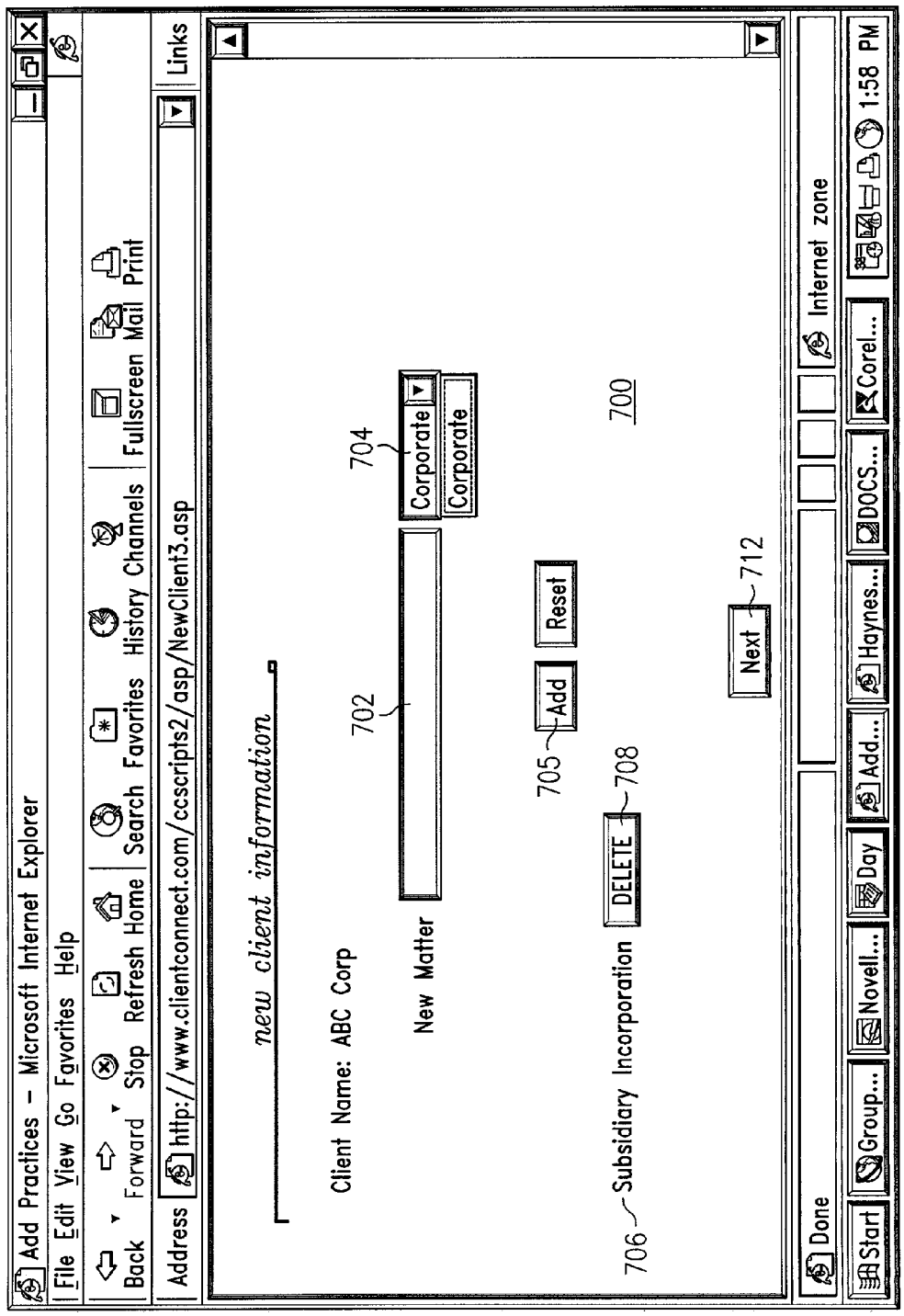

Using the Practice Area/Client Work Group Designation screen 600, the user enters, in a New Practice field 602 the name of the practice area/client work group. Using a drop-down menu 604, the user specifies whether the entry in the field 602 designates a new practice ("Practice") or client work group ("Client'). Once this information is entered and the user clicks on an "Add" button 605, the name and type of practice is included in a list 606 displayed on the screen 600. Practice areas/work groups can be edited and deleted from the list 606 by clicking on the associated "Edit" and "Delete" buttons 608, 610, respectively. Clicking on a "Next" button 612 results in the display of a "New Matter Designation" screen 700 as illustrated in FIG. 7.

Using the New Matter Designation screen 700, a user can add new matters to the practice areas/work groups set up using the screen 700. The name of the new matter is entered in a "New Matter" field 702 and then the practice area/work group is selected from a drop-down menu 704. Once this information is entered and the user clicks on an "Add" button 705, the name of the new matter is included in a list 706 displayed on the screen 700. Matters can be deleted from the list 706 by clicking on the associated "Delete" button 708. Clicking on a "Next" button 712 results in the display of a "Select Components" screen 800 as illustrated in FIG. 8.

Using the Select Components screen 800, the user selects the various components to be made available for the new client by checking the box associates with the selected components. The selected components will be displayed as active buttons on the "Main Menu" screen (FIG. 32) for the client.

Figure 9:
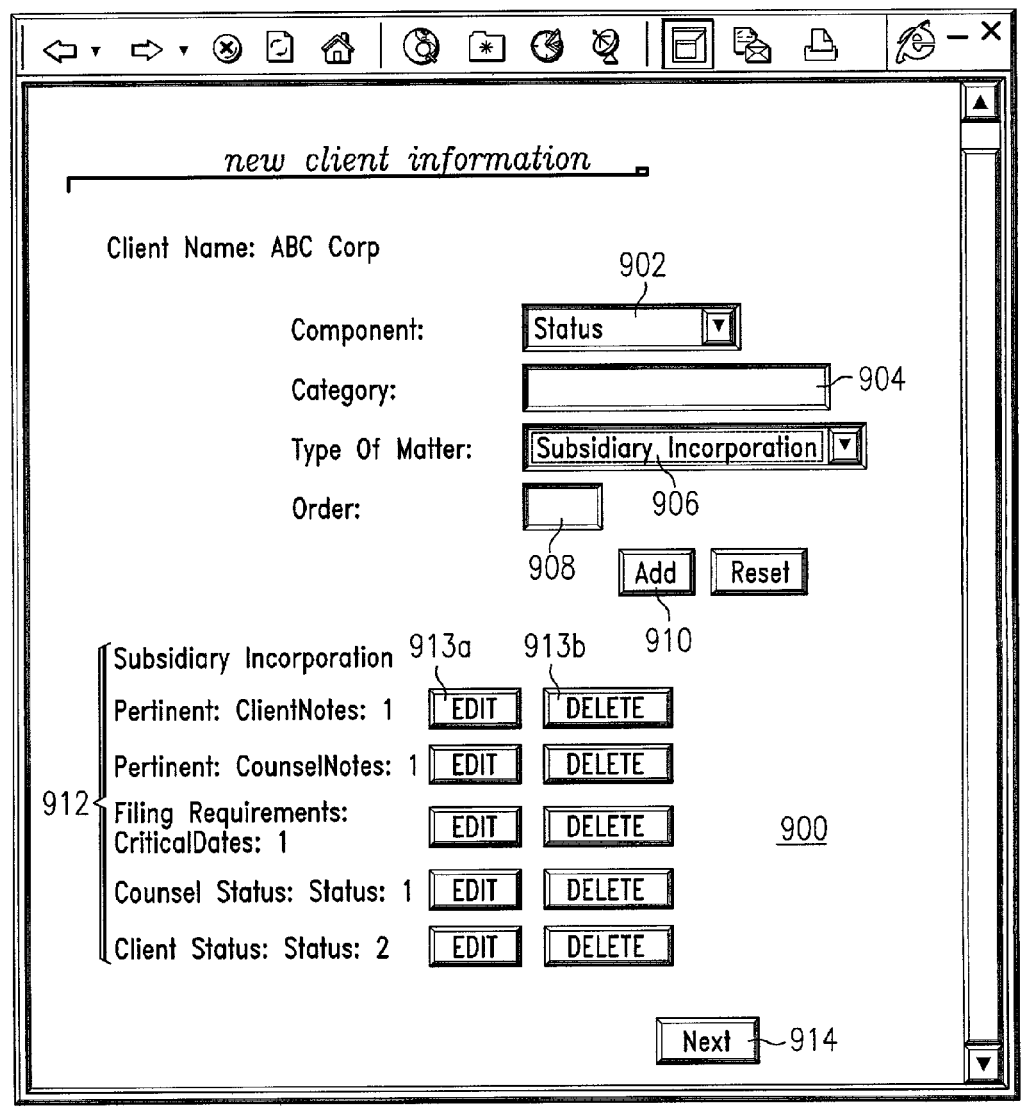

As shown in FIG. 8, the following components have been selected for client "ABC Corp.," "Status," "Critical Dates," "Checklist," "Working Groups," "Hot Issue," "Discuss," "Responsibilities," "Matter Library," "Client Library," "Client Notes," "Counsel Notes," "Billing Reports," and "Custom Reports." Clicking on a "Submit" button 802 completes the selection process and results in the display of a "Name Categories for Components" screen 900, as shown in FIG. 9.

Figure 10:
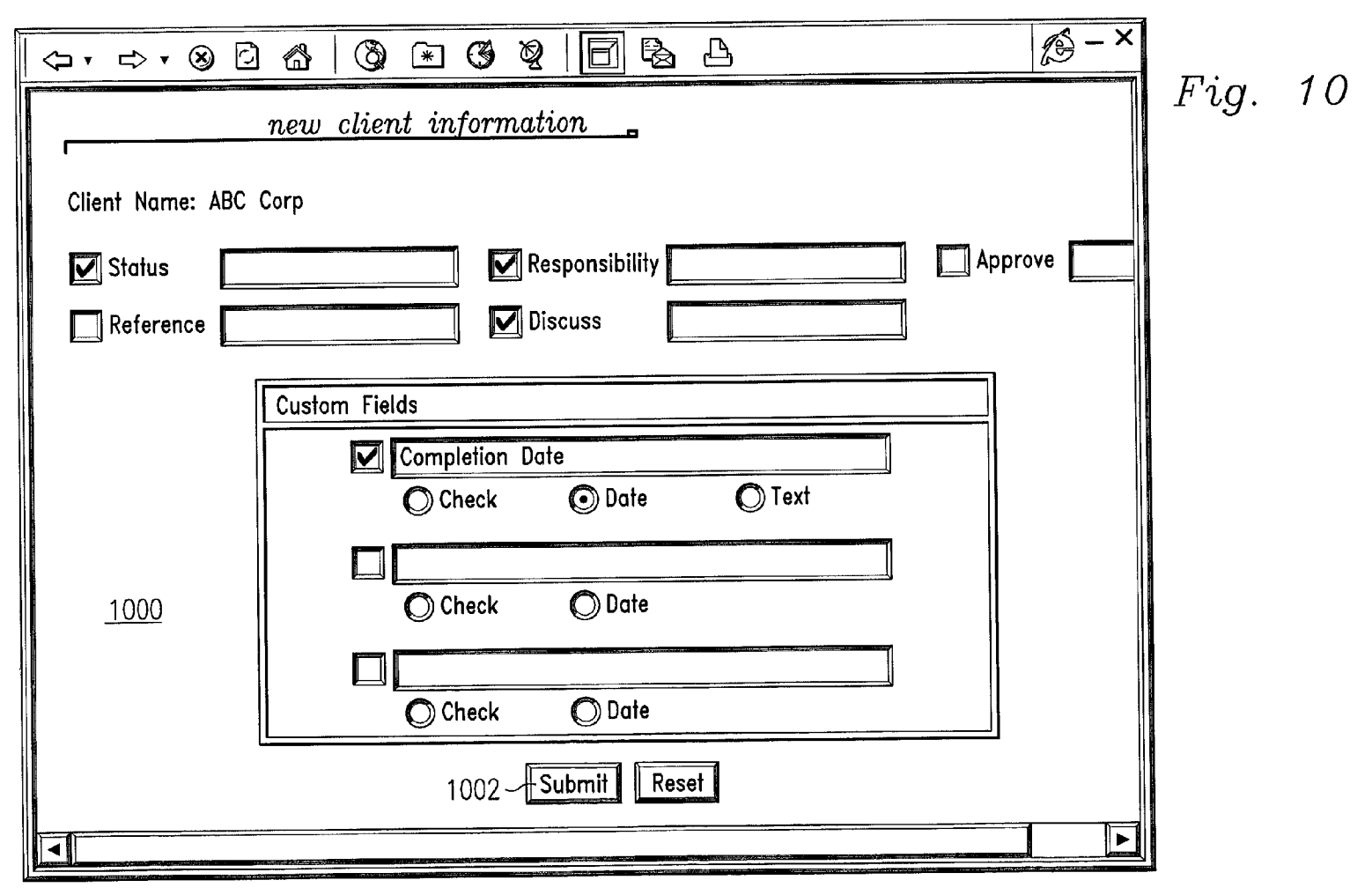

Referring to FIG. 9, the Name Categories for Components screen 900 is used to add various categories for components. As will be explained in further detail with reference to FIGS. 33-38, the categories added using the screen 900 will be displayed on the individual screens of the respective components. As shown in FIG. 9, the user selects a component from a drop-down menu 902, it being recognized that the menu 902 will include all of the components selected using the screen 900 (FIG. 8). The user then enters the name of the category in a "Category" field 904, selects a type of matter from a drop-down menu 906 comprising a list of the matters added using the New Matter Designation screen 700 (FIG. 7), and designates the numerical order in which the category should appear on the component screen in an "Order" field 908. For example, if a "1" is entered in the order field 908, the category will be the first category listed on the component screen; if a "2" is entered, the category will be the second category listed, and so on. Clicking on an "Add" button 910 results in the information being added to a list 912 under the type of matter specified. Categories can be edited and deleted by clicking on associated "Edit" and "Delete" buttons 913a, 913b, respectively. Once all of the categories have been added in this matter, clicking on a "Next" button 914 results in the display of a "Name Columns for Checklists" screen 1000, as shown in FIG. 10.

Figure 36:
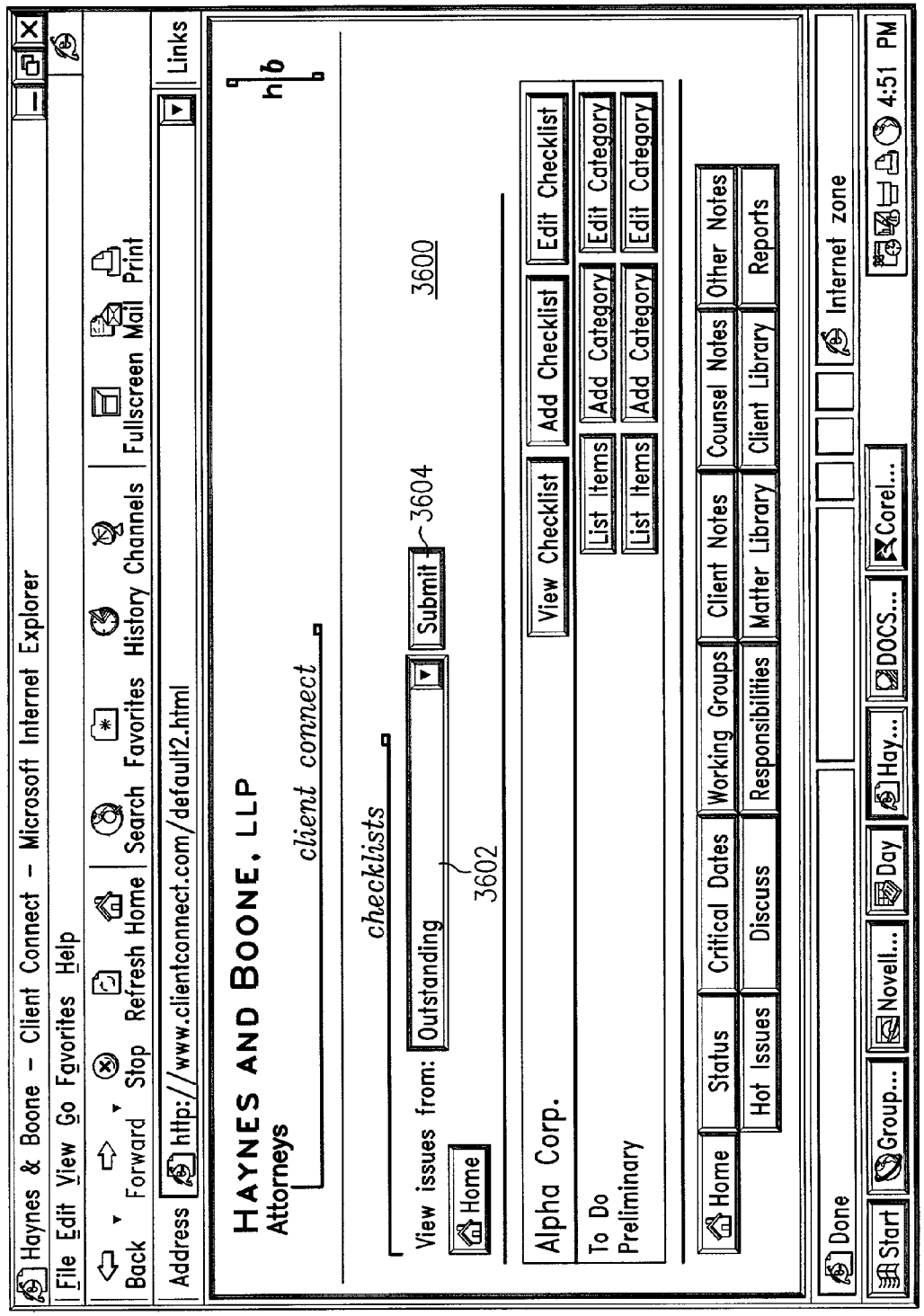
FIG. 36 illustrates a "Checklists" screen of the application of FIG. 1 or 2.

The Name Columns for Checklists screen 1000 is used to designate which columns will appear on the "Checklists" screen, as described in greater detail with reference to FIG. 36. In particular, the user selects the columns to appear on the Checklists screen (FIG. 36) by checking the box associated with the selected columns. In one embodiment, available columns include a "Status" column, a "Responsibility" column, an "Approve" column, a "Reference" column, and a "Discuss" column. The default names for these columns can be changed by entering a different name in the field associated with the column. In addition to the previously described five column headings, there are three "custom" fields, one of which may be designated as a check box, a date, or a text entry column, and the other two of which may be designated as either a check box or date column. Again, selection of these custom fields is accomplished by entering a name for the column in the field associated therewith and checking the check box associated with the field. Once the column names have been entered as previously described, clicking on a "Submit" button 1002 results in the submission of the information entered thereon.

Figure 11:
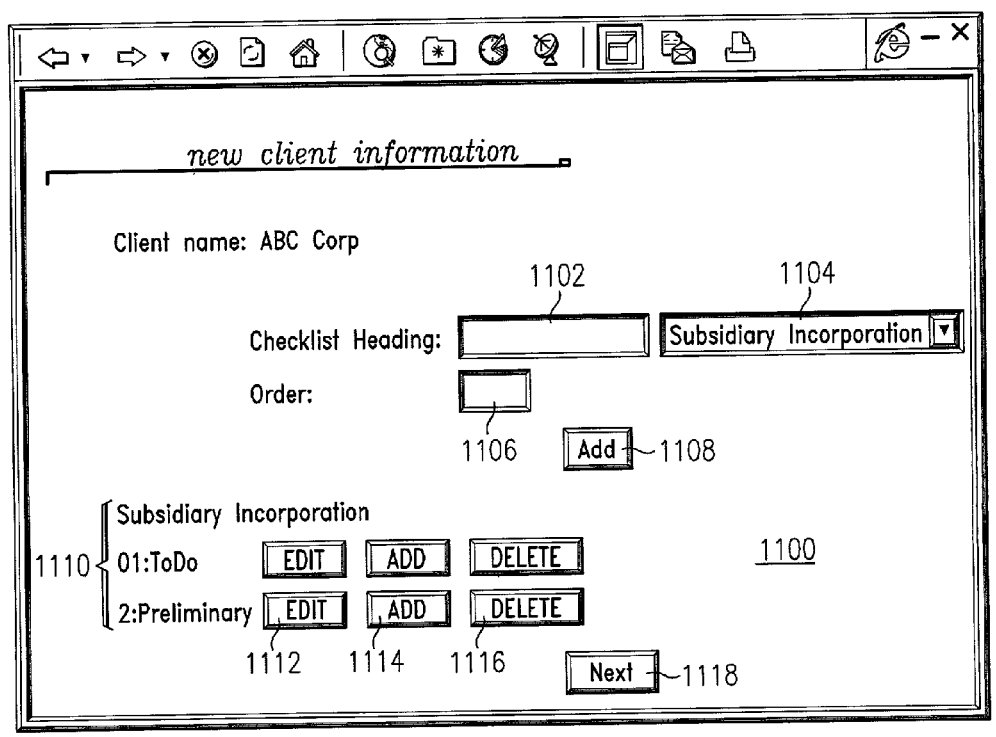
Figure 12:
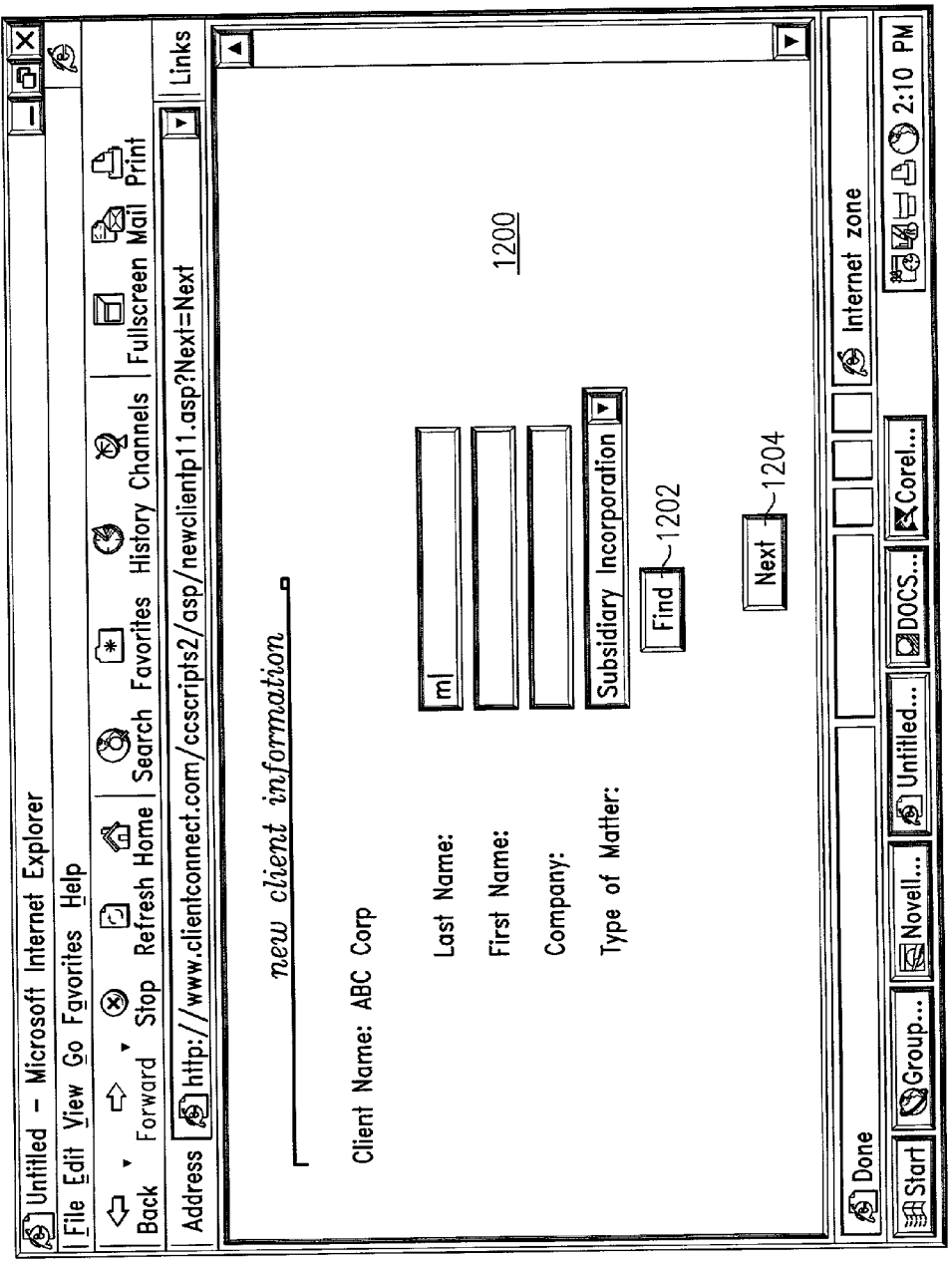

A "Name Checklists" screen 1100 is shown in FIG. 11. Using the screen 1100, the user enters a Checklist name in a "Checklist Heading" field 1102, selects a matter type from a drop-down menu 1104, and enters a number indicating where in the list of Checklists the current Checklist is to appear in an "Order" field 1106. Once the information has been entered as previously described, the user clicks on an "Add" button 1108 to add the information to a list 1110 under the appropriate matter heading. Checklists can be edited, added, and/or deleted by clicking on the respective button 1112, 1114, and/or 1116 associated with the Checklist in the list 1110. Clicking on a "Next" button 1118 results in the display of a "User Search" screen 1200, as shown in FIG. 12.

Figure 14:
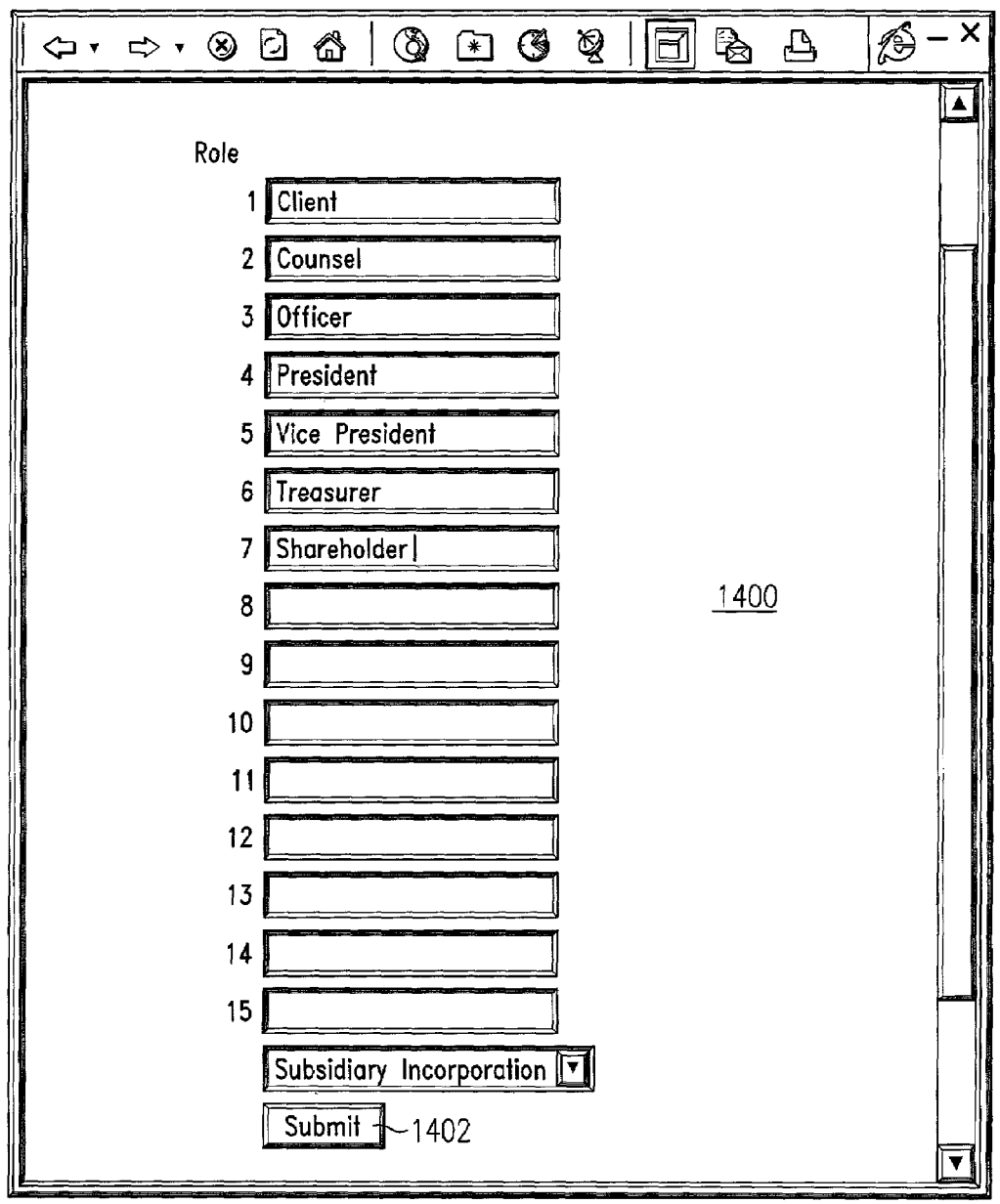

Using the User Search screen 1200, the user enters a relevant portion of identifying information for a user to be searched for and then clicks on a "Find" button 1202, which results in the display of a list of users who fit the criteria. An exemplary "Search Results" screen 1300 for the search information illustrated in FIG. 12 is shown in FIG. 13. Using the Search Results screen 1300, the user checks the appropriate boxes corresponding to the selected user to include the selected user in various user groups, such as "Responsible Party," "Discussion Party," "Approval Party," and "Working Group List." Clicking on an "Add" button 1302 adds the selected user to the selected work groups and returns the user to the screen 1200 (FIG. 12). Clicking on a "Next" button 1204. results in the display of a "Role Designation" screen 1400, as shown in FIG. 14, that can be used by the user to designated various user roles or titles, e.g., "Client," "Counsel," "Officer," "President," "Vice President," "Treasurer," and "Shareholder." Clicking on a "Submit" button 1402 returns the user to the Wizard Main Menu screen 400.

It should be noted that the designations made using the screens illustrated in FIGS. 8-14 are client level designations; that is, unless modified as described below, they apply to all matters for a particular client.

If in step 214, it is determined that the user has not clicked on the New Client button 414a, in step 218, a determination is made whether the user has clicked on the New User button 418a. If so, execution proceeds to step 219, in which a "New User Information" screen 1500, as shown in FIG. 15, is displayed. Using the New User Information screen 1500, the user enters identifying information for a new user, including the new user's name, title, company name and address, phone number, E-mail address and access level, as well as an assistant's name and phone number and a designation of the word processing system of the new user. Clicking on a "Create User" button 1502 submits the information entered on the screen 1500 and returns the user to the Wizard Main Menu screen 400 (FIG. 4).

Figure 16:
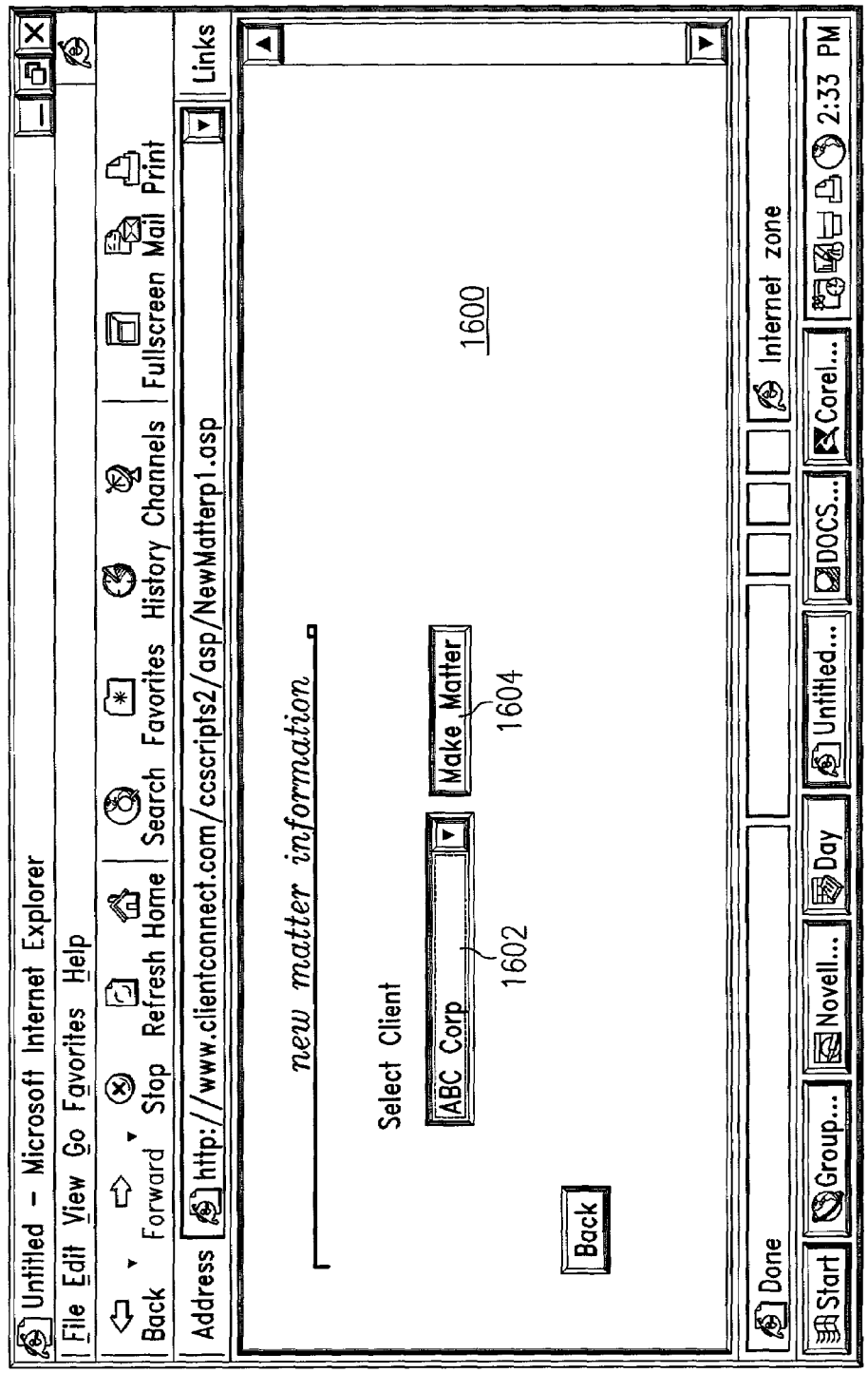

If in step 216, it is determined that the user has not clicked on the New User button 418a, in step 218, a determination is made whether the user has clicked on the New Matter button 416a. If so, execution proceeds to step 220, in which an "Add New Matter" screen 1600, as shown in FIG. 16, is displayed. Using the Add New Matter screen 1600, the user selects a client from a drop-down menu 1602 and then clicks on a "Make Matter" button 1604, which results in the display of a "New Matter Information" screen 1700, as illustrated in FIG. 17.

Figure 18:
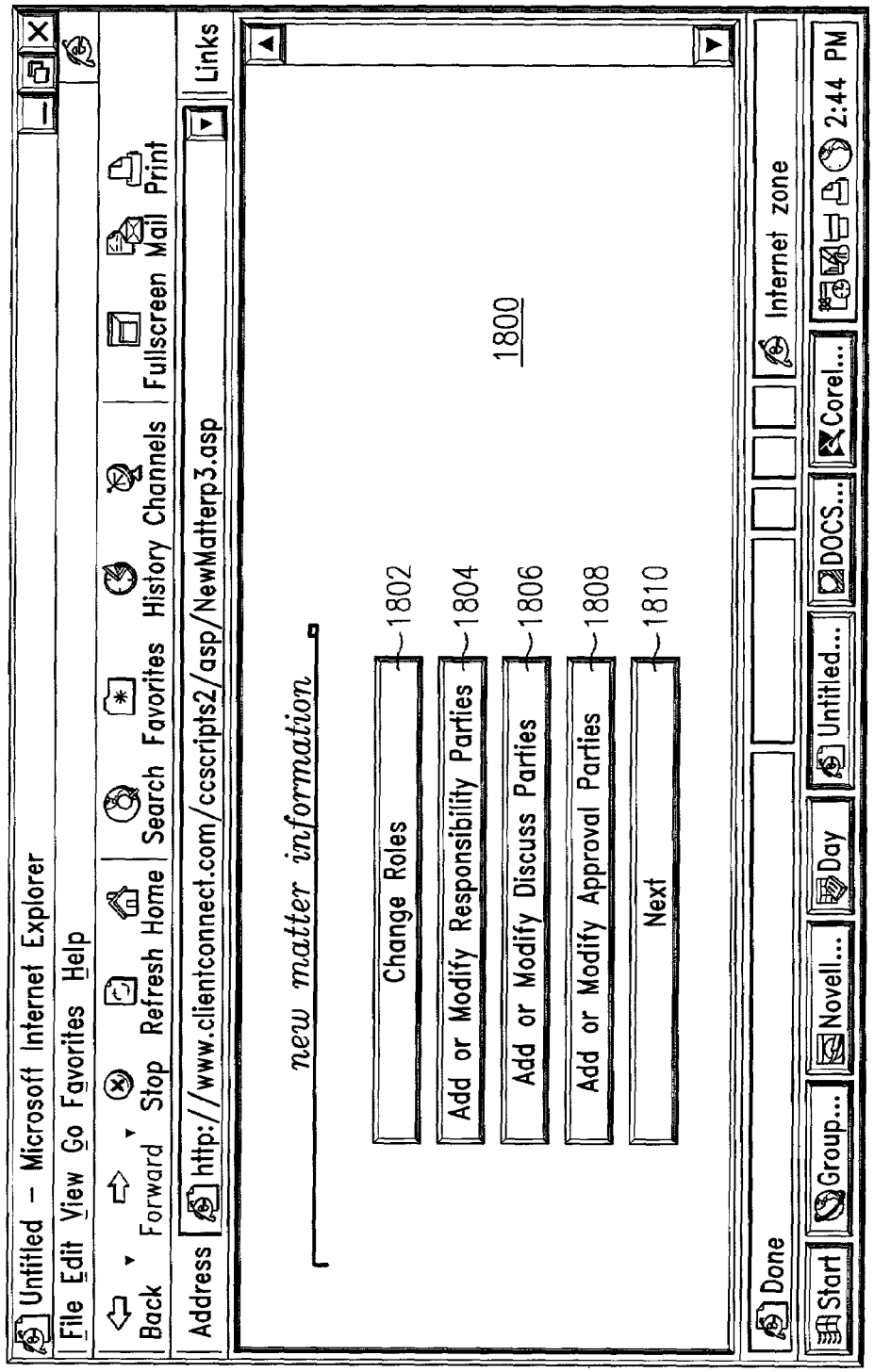

Using the New Matter Information screen 1700, the user enters various items of information for a new matter, including the matter name, city, state, client contact, law firm, and counsel contact. In addition, the user selects a matter type from a "Matter Type" drop-down menu 1702 and enters any necessary comments in a "Comments" field 1704. Checking a checkbox 1705 designated "Deactivate Checklists" enables a user to skip the portion of the Wizard that sets up the Checklists, as described below. When the user is later ready to set up the Checklists, he or she simply returns to this screen 1700 and unchecks the checkbox 1705 and then proceeds with Checklist set up as described below. Once the information is completed, the user clicks on a "Submit" button 1706 to create the new matter, at which point a "Modify Client Level Information" screen 1800, as shown in FIG. 18, is displayed.

Figure 19:
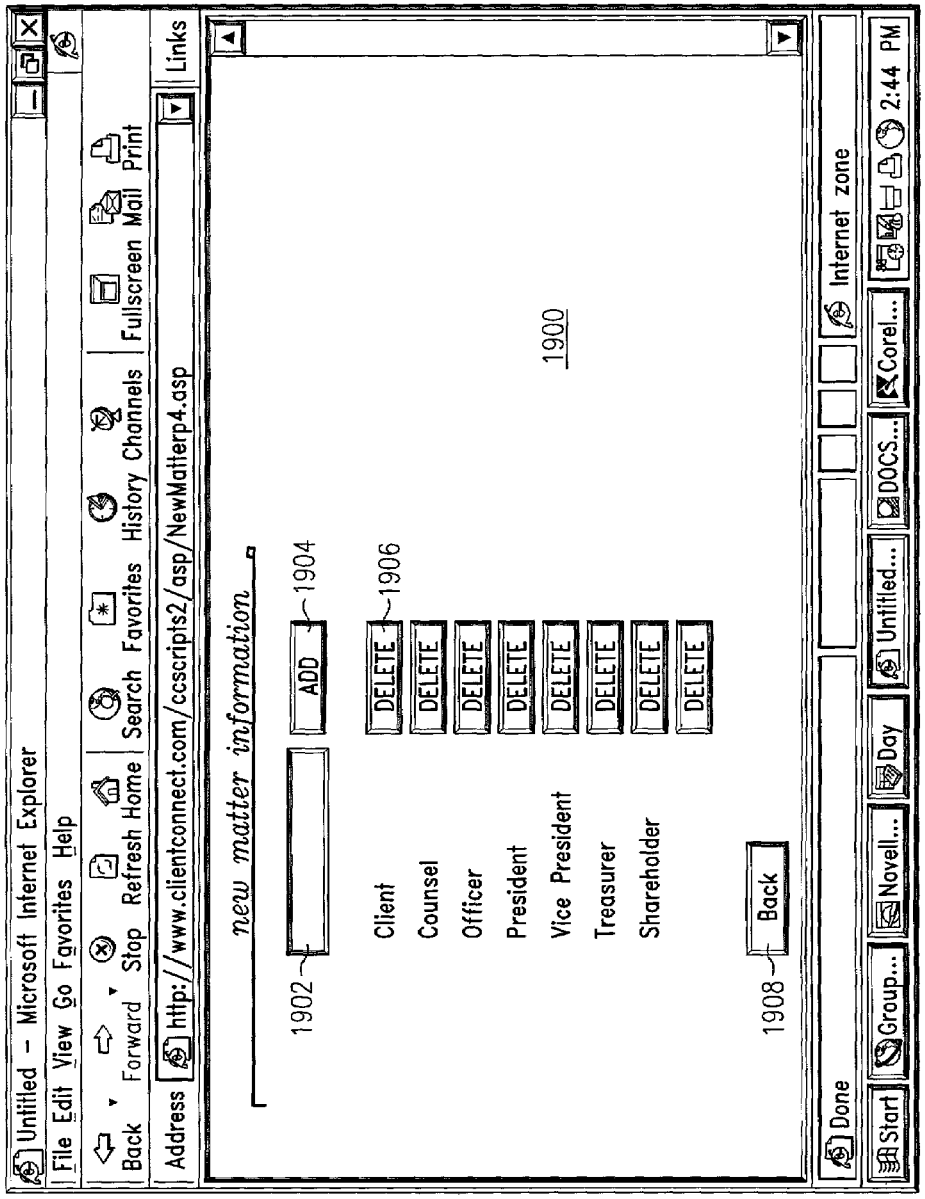

The screen 1800 includes a plurality of buttons for modifying the client level information for the new matter created using the screen 1700 (FIG. 17), including a "Change Roles" button 1802, an "Add or Modify Responsibility Parties" button 1804, an "Add or Modify Discuss Parties" button 1806, and an "Add or Modify Approved Parties" button 1808. Clicking on the Change Roles button 1802 results in the display of a "Change Roles" screen 1900, as shown in FIG. 19.

Using the Change Roles screen 1900, the user can delete roles designated using the Role Designation screen 1400 (FIG. 14) by clicking on a "Delete" button 1901 associated with the role to be deleted and can add new roles by entering the name of the role in a field 1902 and clicking on an "Add" button 1904. It will be recognized that the role changes are effective only for the matter created using the screen 1700 (FIG. 17). Clicking on a "Back" button 1906 returns the user to the screen 1800.

Figure 20:
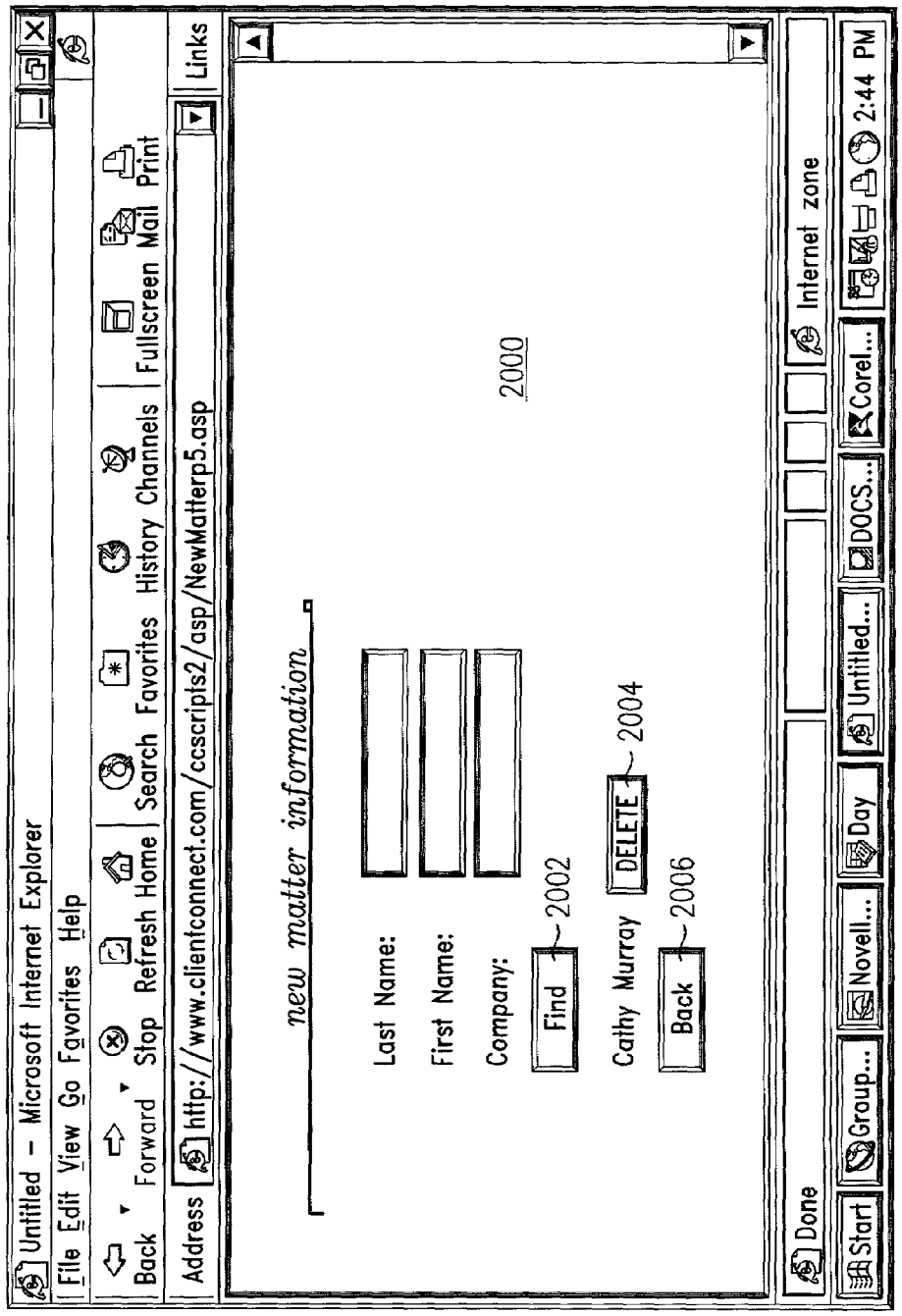

Referring again to FIG. 18, clicking on any of the buttons 1804, 1806, or 1808 results in the display of an "Edit User Group" screen 2000, as shown in FIG. 20. The screen 2000 operates in a similar fashion as the screen 1200 (FIG. 12) and clicking on a "Find" button 2002 results in the display of a screen similar to the screen 1300 (FIG. 13), with which the user can edit the user groups for the selected user. In addition, a user can be deleted from the user group by clicking on a "Delete" button 2004 associated with the user name. Clicking on a "Back" button 2006 returns the user to the screen 1800 (FIG. 18).

Figure 21:
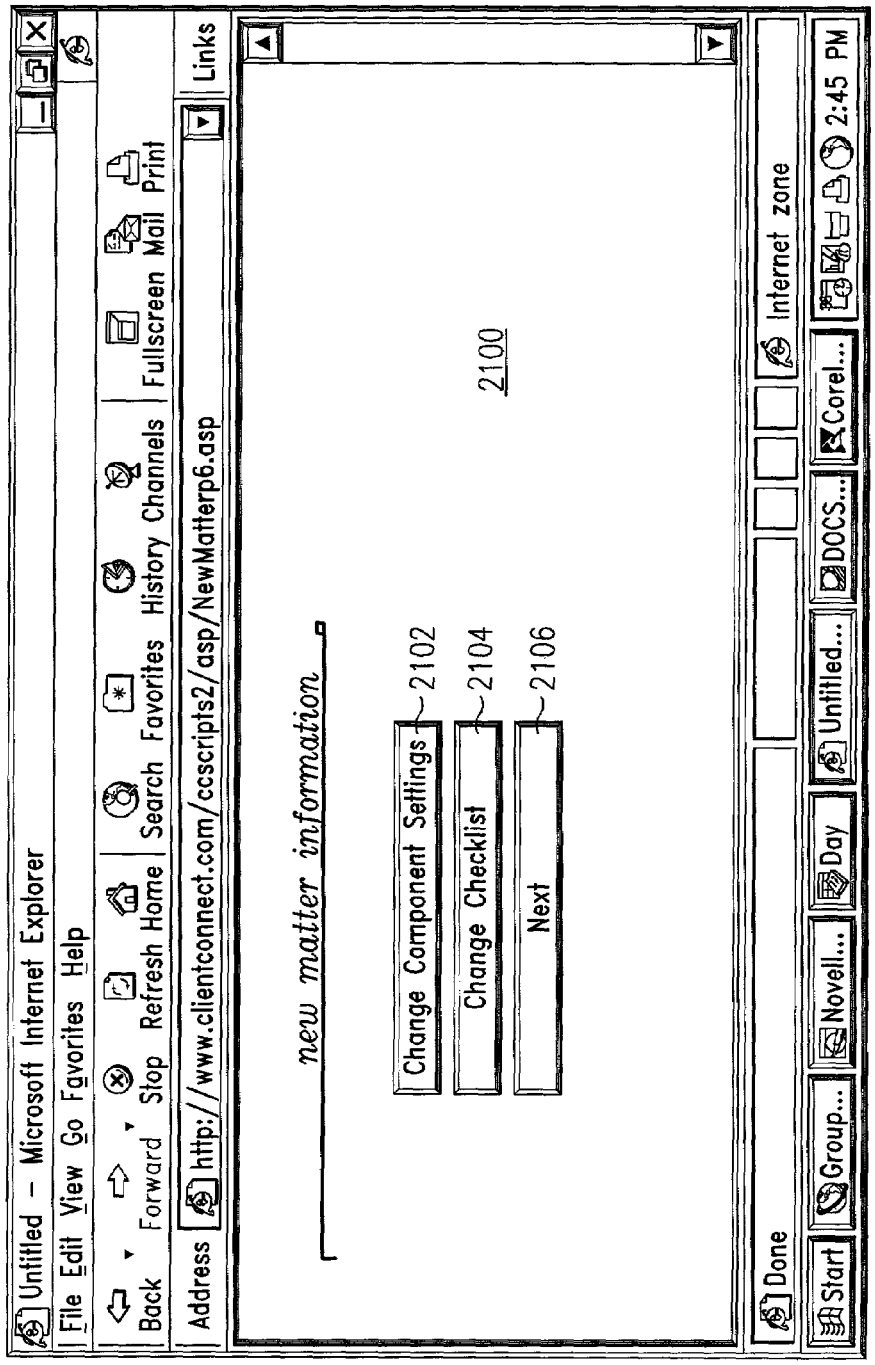
Figure 22:
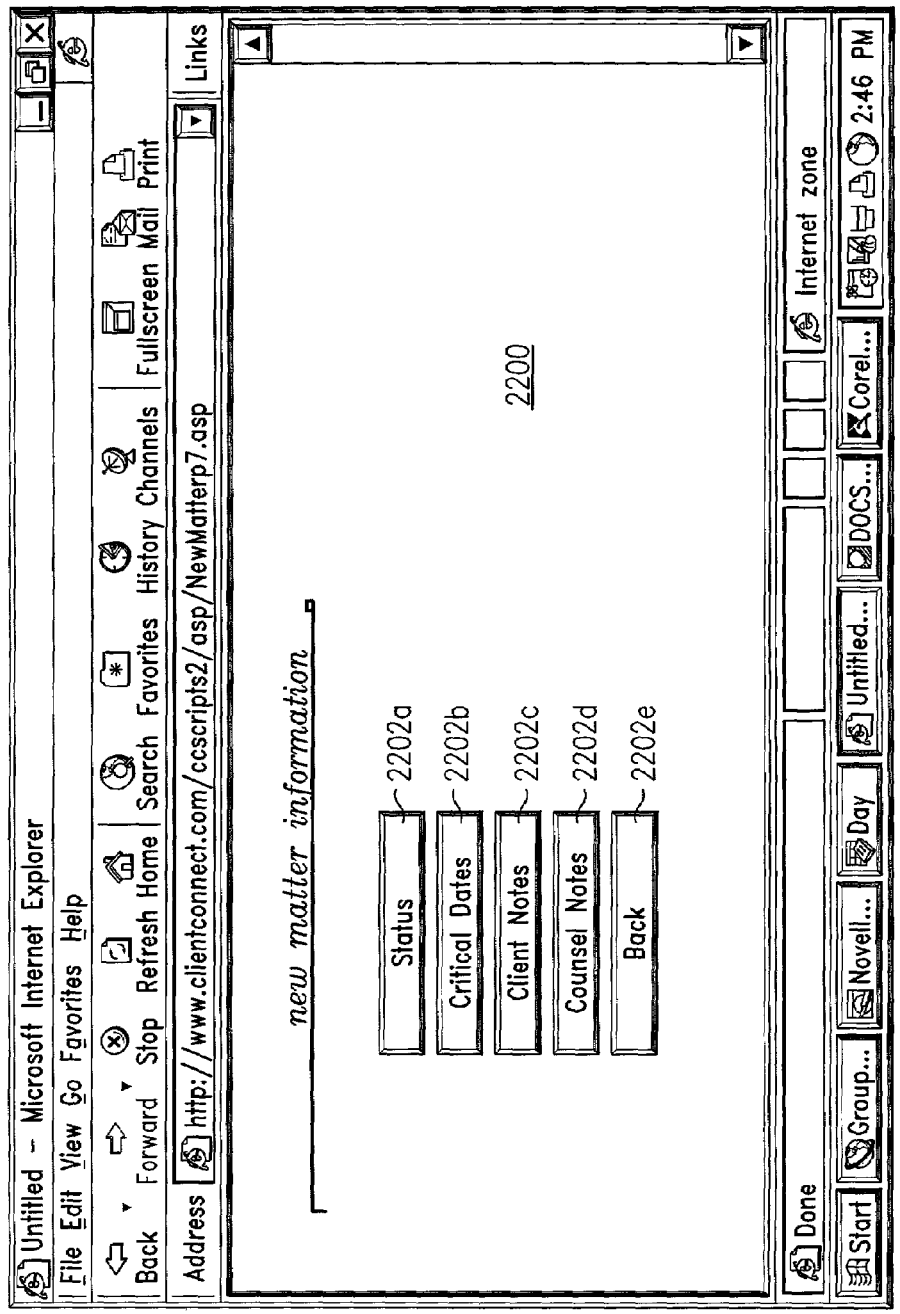
Figure 22A:
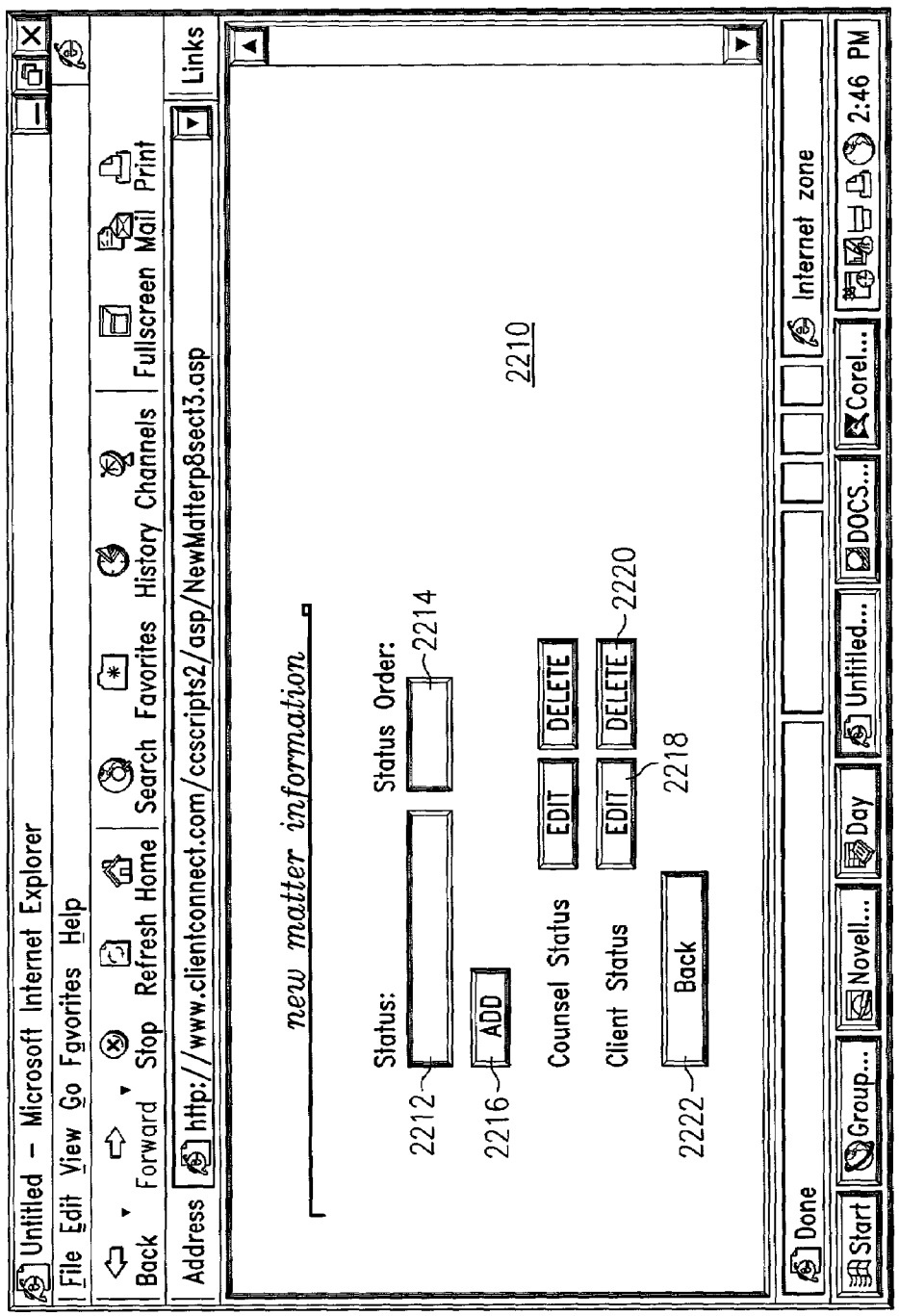

Clicking on a "Next" button 1810 results in the display of a "Change Component Settings" screen 2100, as shown in FIG. 21. The screen 2100 is used to change the component settings for the selected matter. Clicking on a "Change Component Settings" button 2102 results in the display of a "Component Selections" screen 2200, as shown in FIG. 22. Using this screen 2200, the user can change the component selections for any of the indicated components by clicking on the associated button 2202a-2202d. For example, clicking on the "Status" button 2202a results in the display of a "Modify Component Categories" screen 2210, as shown in FIG. 22a.

Using the screen 2210, the user can add a status category by entering the text for the category in a field 2212, the order in which the new category is to appear in a field 2214 and then clicking on an "Add" button 2216. Alternatively, the user can edit or delete existing categories by clicking on an associated "Edit" or "Delete" button 2218, 2220, respectively. Clicking on a "Back" button 2222 returns the user to the screen 2200 (FIG. 22). Similarly, from the screen 2200, clicking on a "Back" button 2202e returns the user to the screen 2100. It will be recognized that clicking on either of the buttons 2202b-2202d will results in the display of a screen similar to the screen 2200 for the respective component.

Figure 22B:
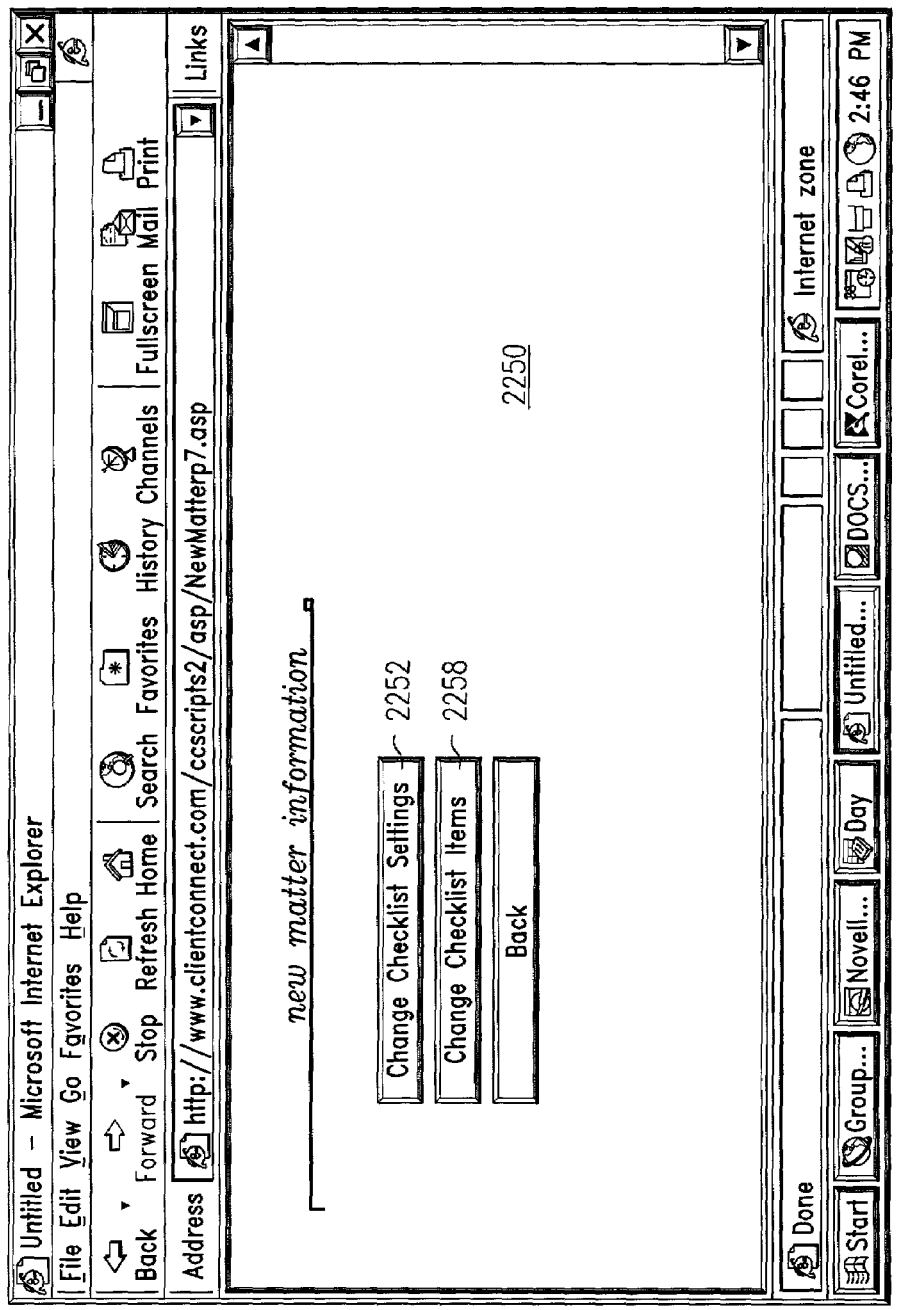
Figure 22C:
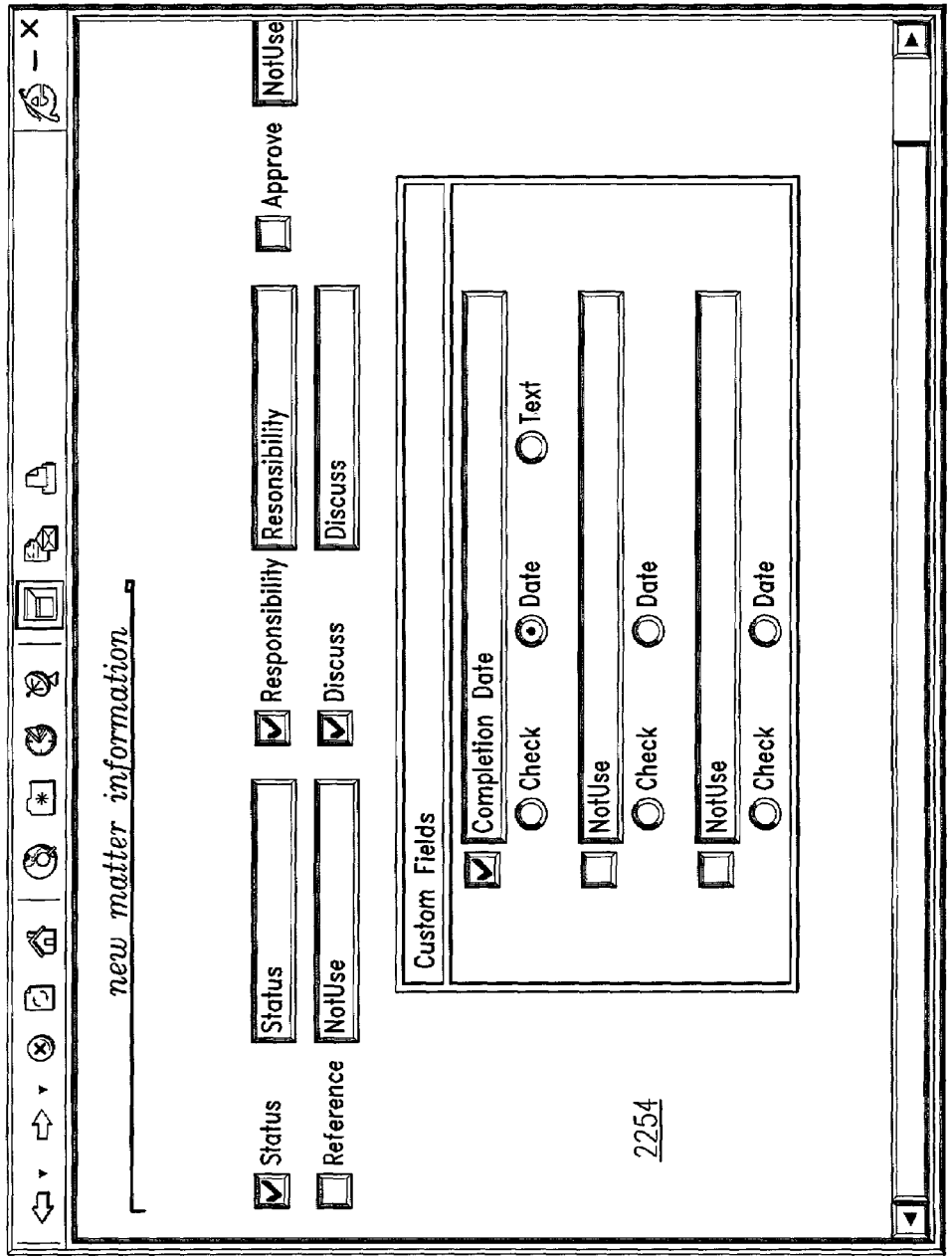
Figure 23:
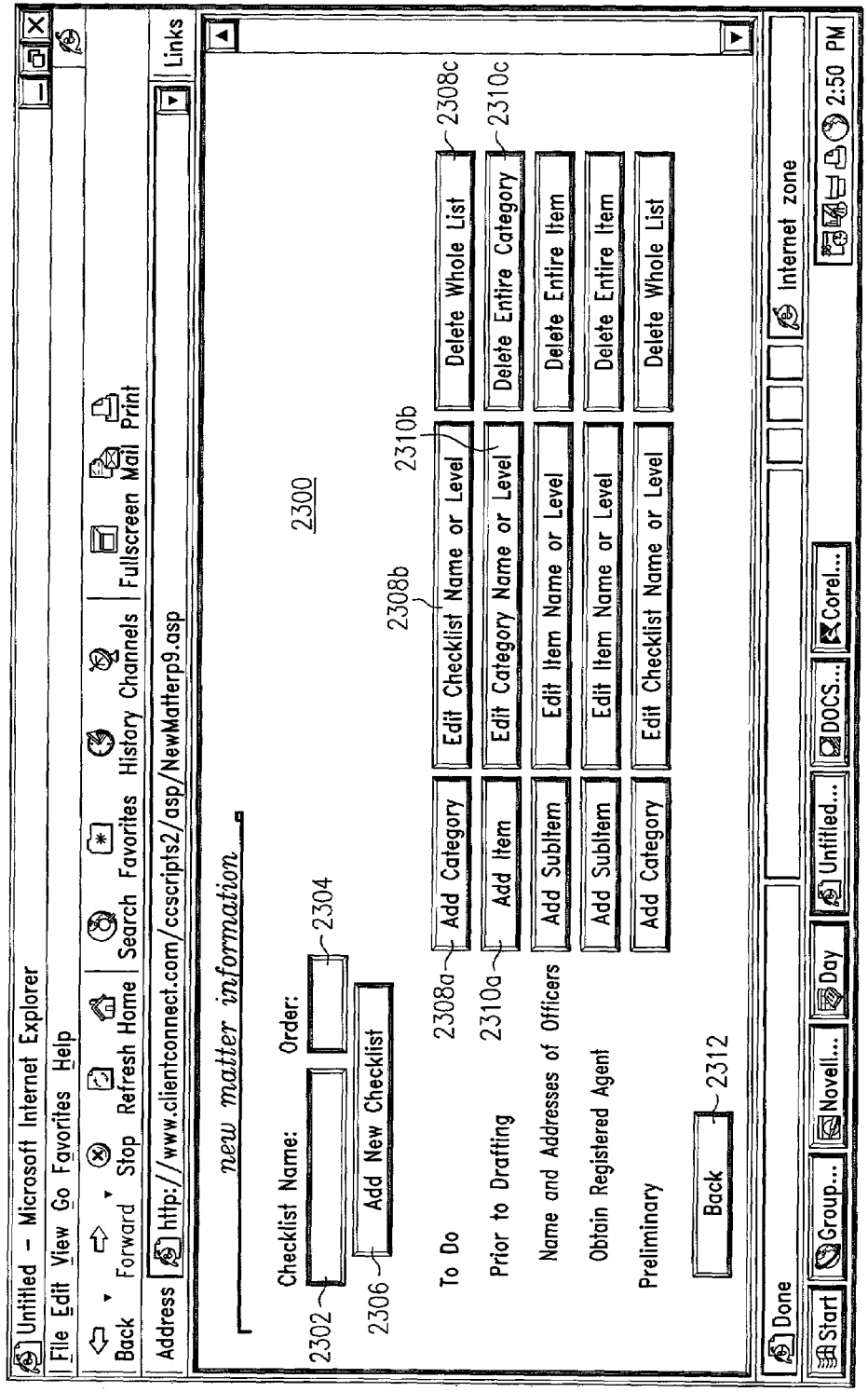

From the screen 2100, clicking on a "Change Checklist" button 2104 results in the display of a "Change Checklists" screen 2250 as shown in FIG. 22b. Clicking on a "Change Checklist Settings" button 2252 results in the display of a "Change Checklists Settings" screen 2254 as shown in FIG. 22c. the Change Checklists Settings screen 2254 can be used to change checklist setting information on a matter level. Referring again to FIG. 22b, clicking on a "Change Checklist Items" button 2258 results in the display of a "Name Checklists" screen 2300, as shown in FIG. 23.

Using the Name Checklists screen 2300, the user can add a new Checklist by entering a name in a field 2302, a number indicating the order in which the new Checklist is to appear in a field 2304, and then clicking on an "Add New Checklist" button 2306. Alternatively, the user can modify an existing Checklist to add a category to a Checklist by clicking on an associated "Add Category" button 2308a, to edit the name or order of a Checklist by clicking on an associated "Edit Checklist Name or Level" button 2308b, or delete a checklist by clicking on an associated "Delete Whole List" button 2308c. Similarly, the user can add a new item under a category by clicking on an associated "Add Item" button 2310a, can edit the name or order of a category by clicking on an associated "Edit Category Name or Level" button 2310b, and delete an entire category by clicking on an associated "Delete Entire Category" button 2310c. It will be recognized that subitems can be added and items can be modified or deleted in a similar fashion as that described above.

Clicking on a "Back" button 2312 returns the user to the screen 2250 (FIG. 22b). Clicking on a "Back" button 2260 returns the user to the screen 2200 (FIG. 22). Similarly, from the screen 2200, clicking on the "Back" button 2202e returns the user to the screen 2100. From the screen 2100, clicking on a "Next" button 2106 results in the display of an "Add User Group" screen 2400 as shown in FIG. 24.

Figure 24:
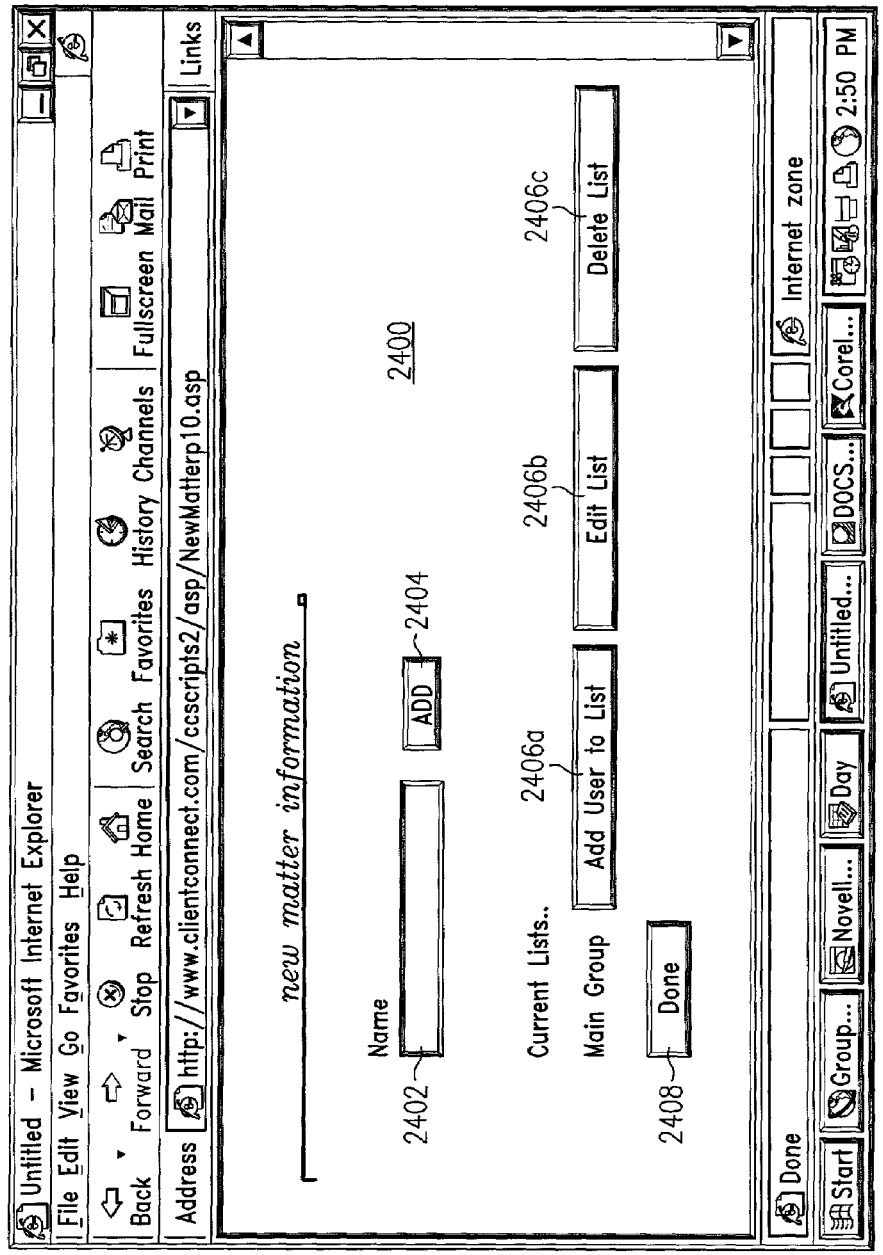

Referring to FIG. 24, a user can add a new user group by entering the name of the new user group in a field 2402 and clicking on an "Add" button 2404. These user groups are used on the front end of the application 12 in connection with the e-mail function, as will be described below. The user can modify an existing group, e.g., "Main Group," to add a new user to the group by clicking on an associated "Add User to List" button 2406a, to edit the group by clicking on an associated "Edit List" button 2406b, or to delete the entire group by clicking on an associated "Delete List" button 2406c.

Figure 25:
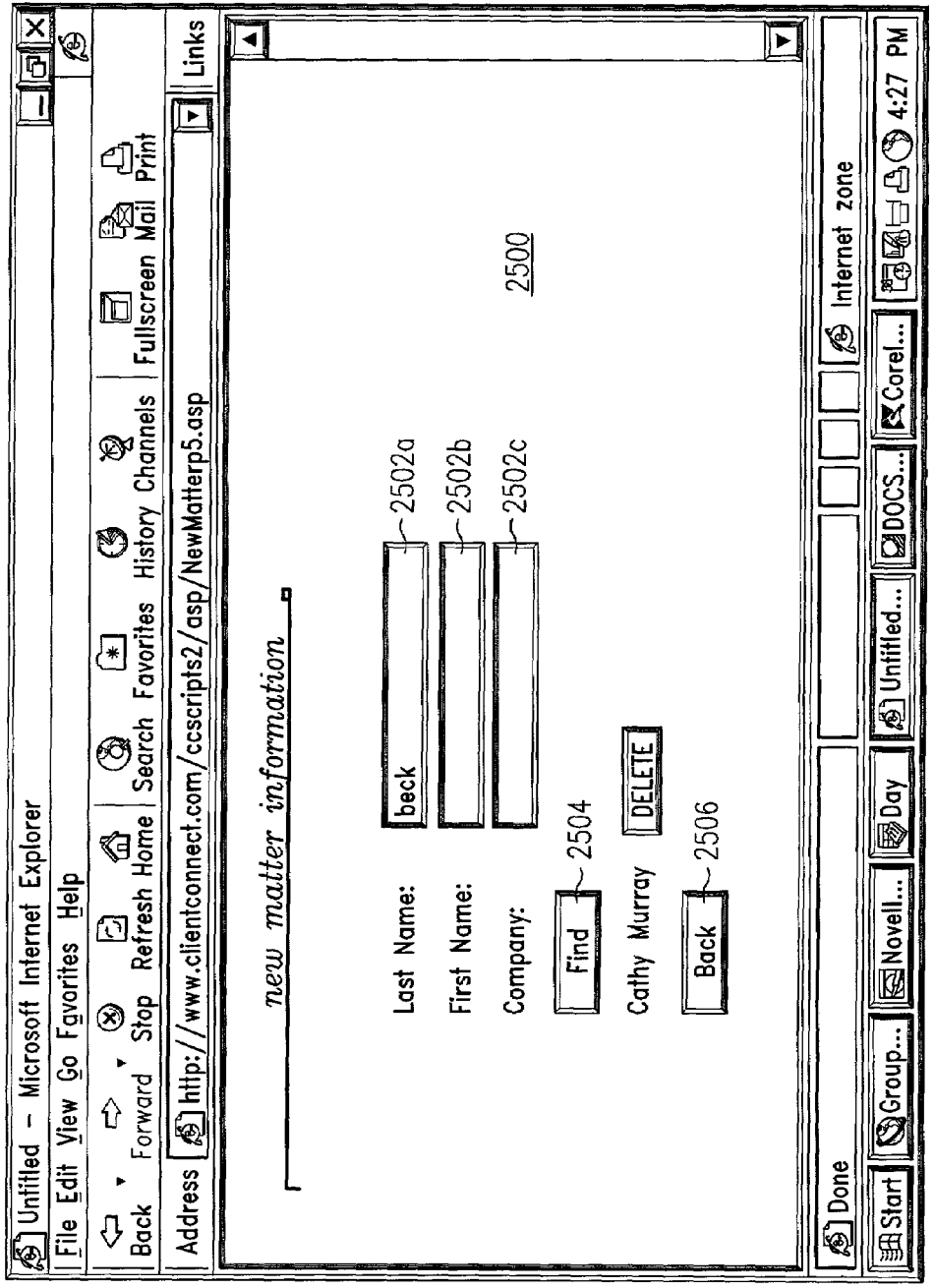
Figure 26:
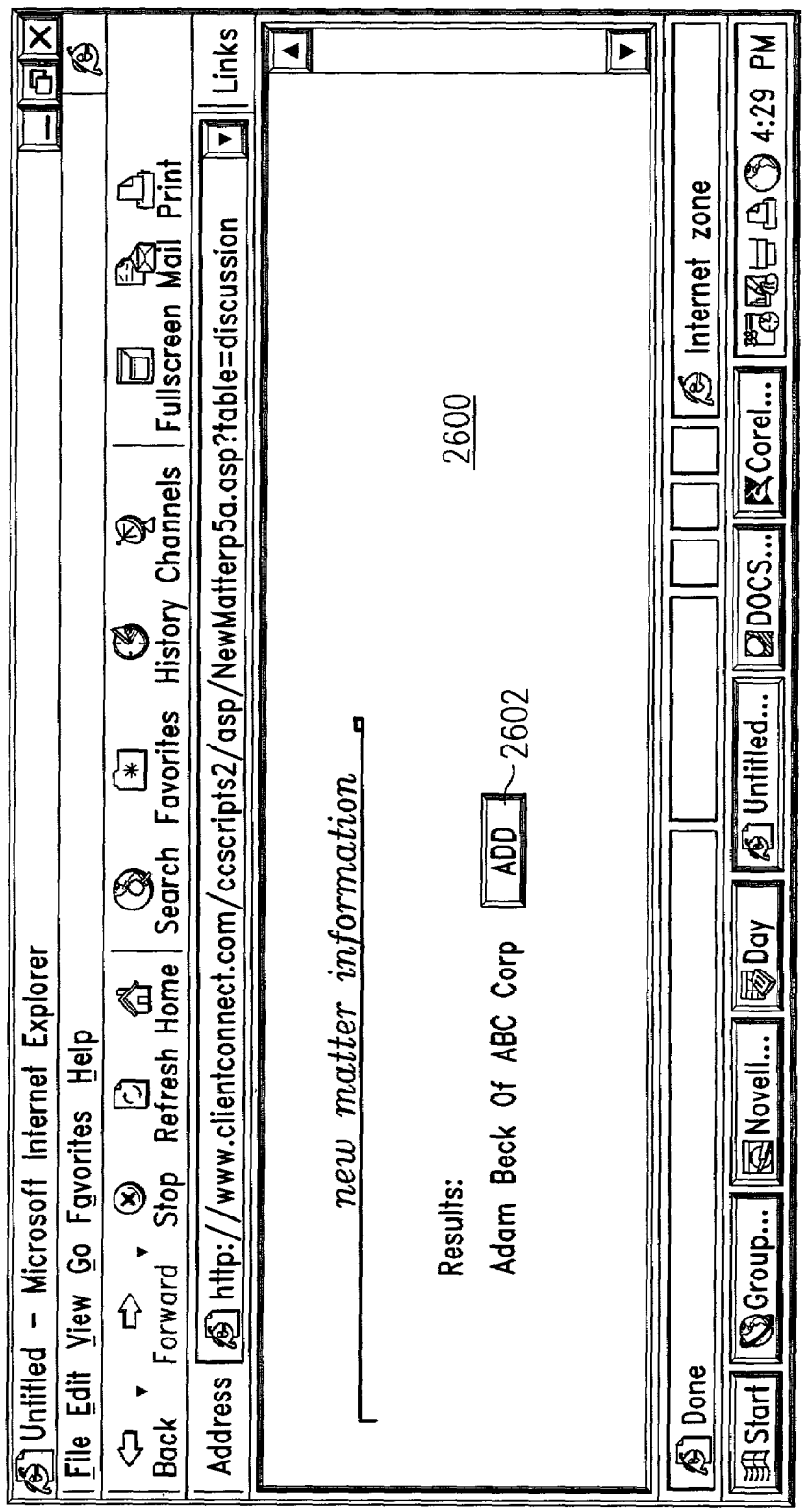

Clicking on the "Add User to List" button 2406a results in the display of a "User Search" screen 2500 as shown in FIG. 25. Using the screen 2500, the user can search for a user to add to the group by entering a portion of identifying information for the user in one or more of fields 2502a, 2502b, 2502c, and then clicking on a "Find" button 2504, resulting in the display of a "Search Results" screen 2600 as shown in FIG. 26 showing the results of the search using the criteria entered on the screen 2500 (FIG. 25). Clicking on an "Add" button 2602 adds the resultant user to the group and returns the user to the screen 2500 (FIG. 25).

From the screen 2500, clicking on a "Back" button 2506 returns the user to the screen 2400 (FIG. 24). Clicking on the Edit List button 2406b associated with a list allows the user to edit the associated user group list. Clicking on the Delete List button 2406c associated with a list deletes the entire user group list. Clicking on a "Done" button 2408 returns the user to the Main Menu screen 400 (FIG. 4).

It should be noted that the designations made using the screens illustrated in FIGS. 18-26 are "matter level" designations and allow the user to modify the Client-Level designations with respect to a particular matter.

Figure 27:
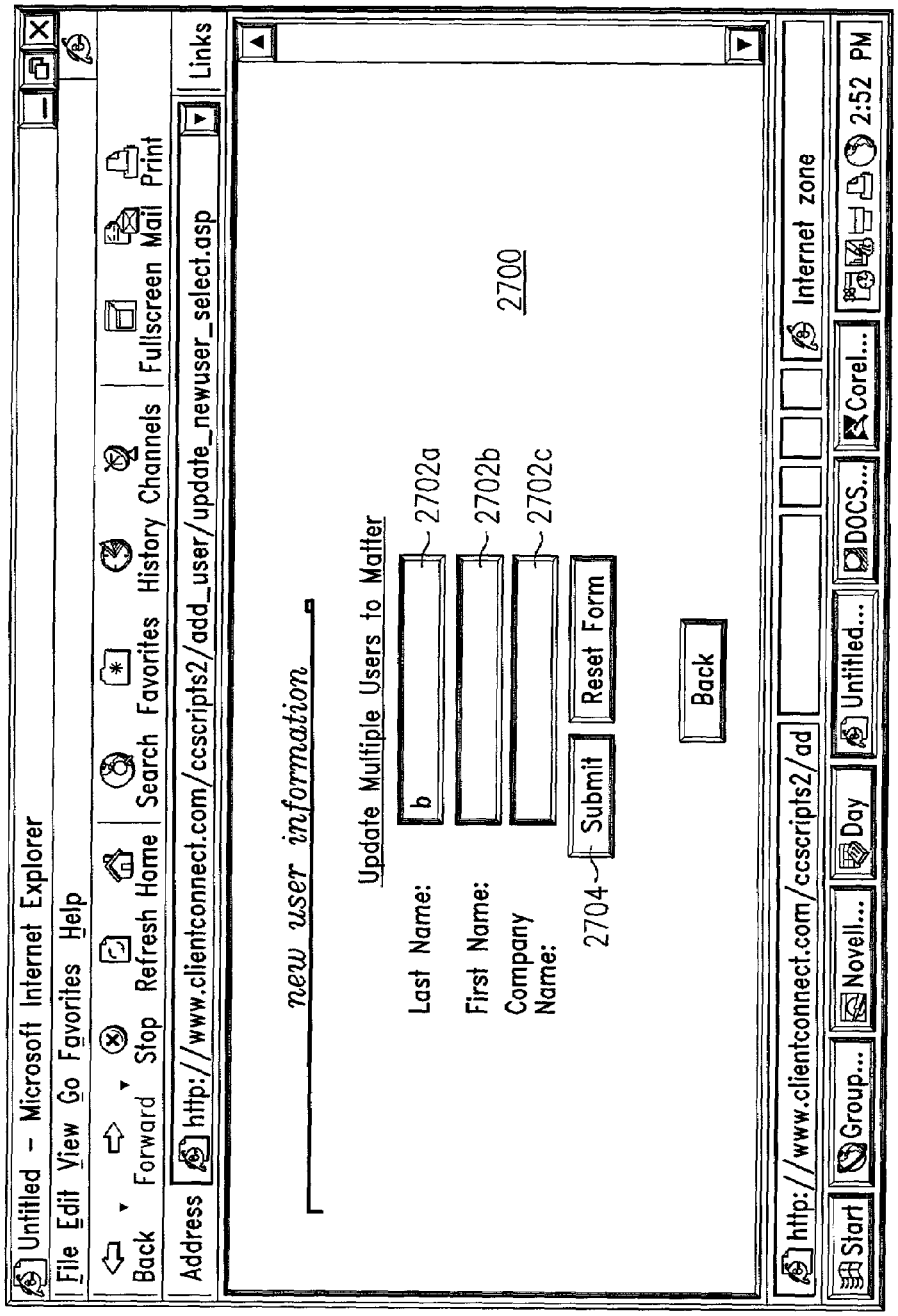
Figure 29:
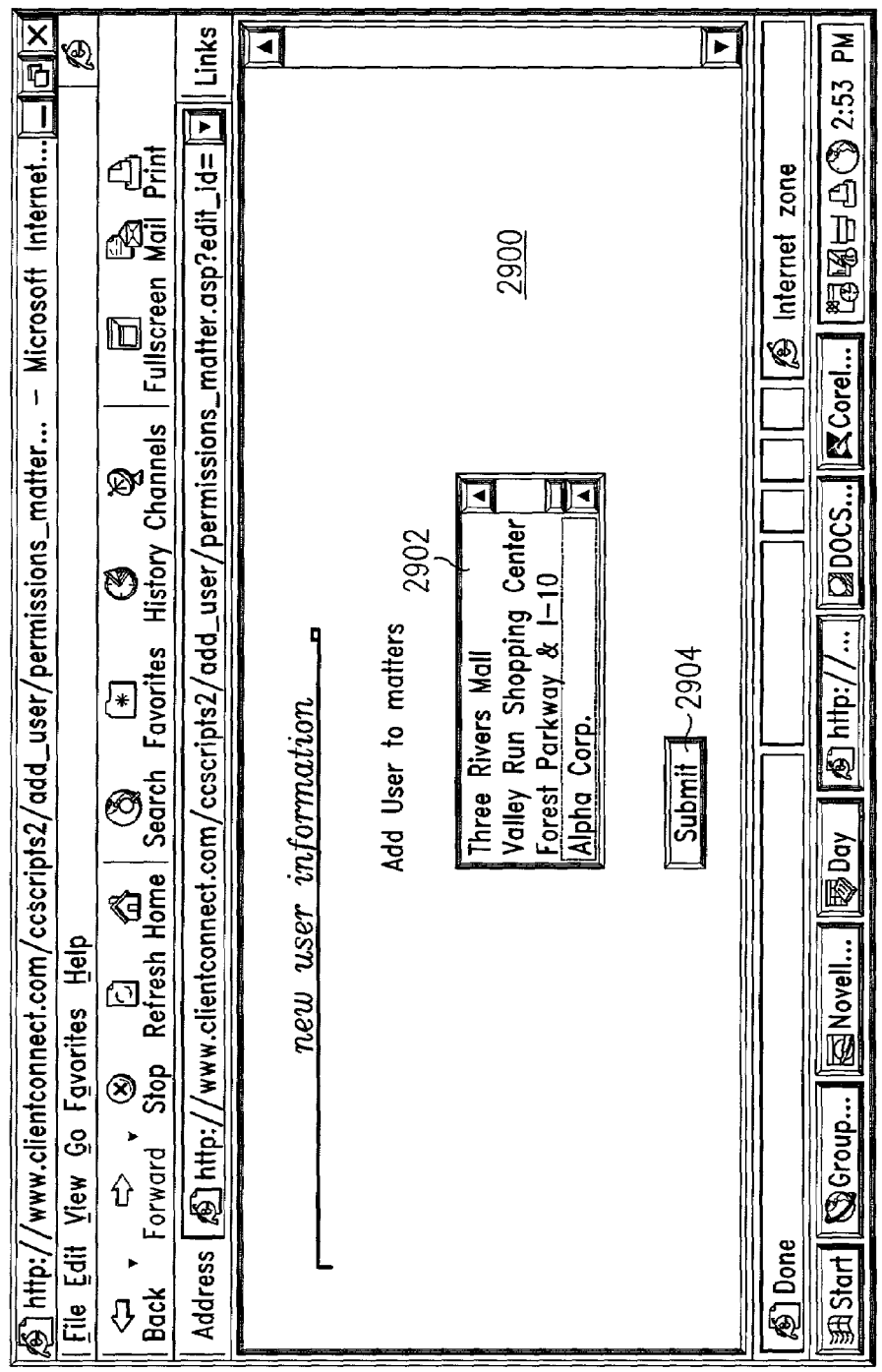
Figure 29A:
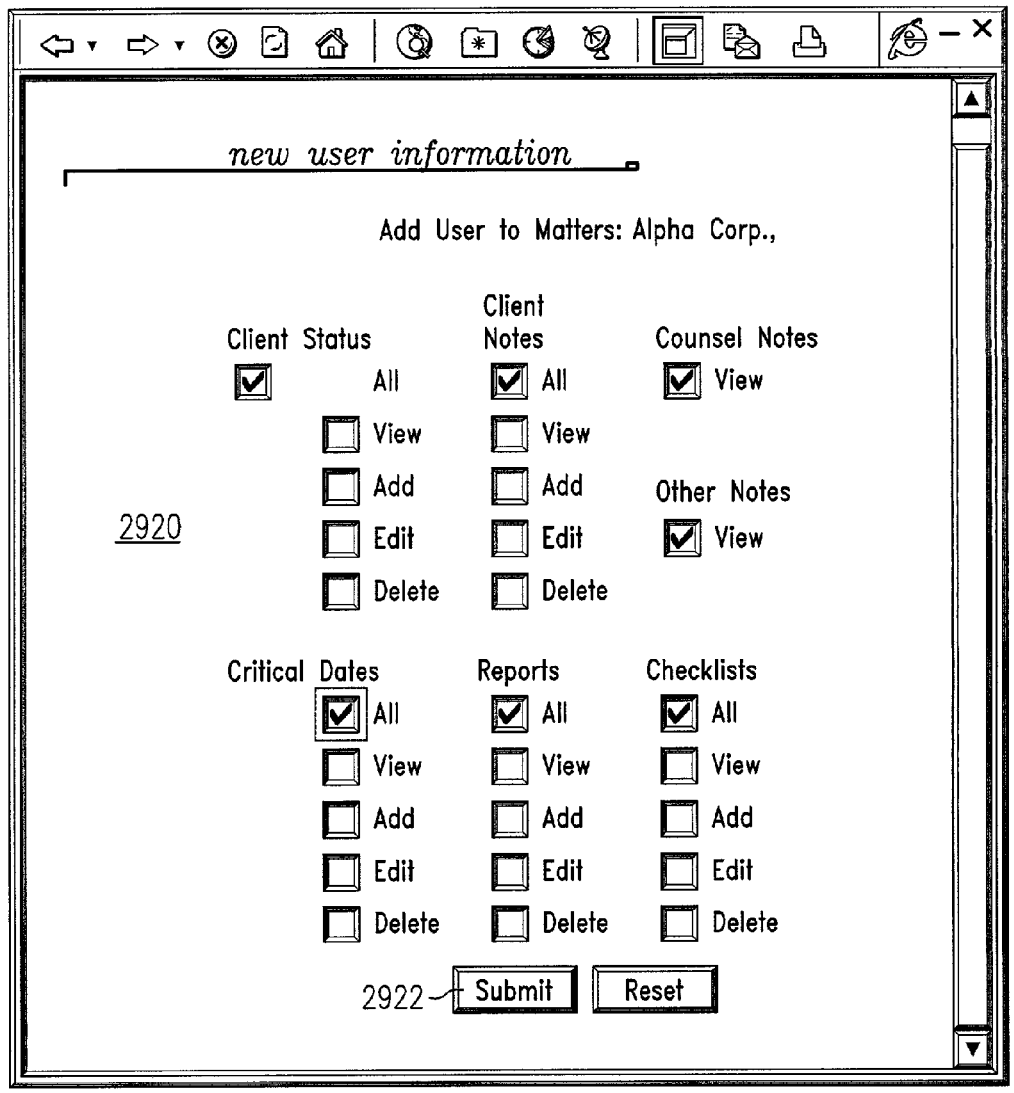
Figure 30:
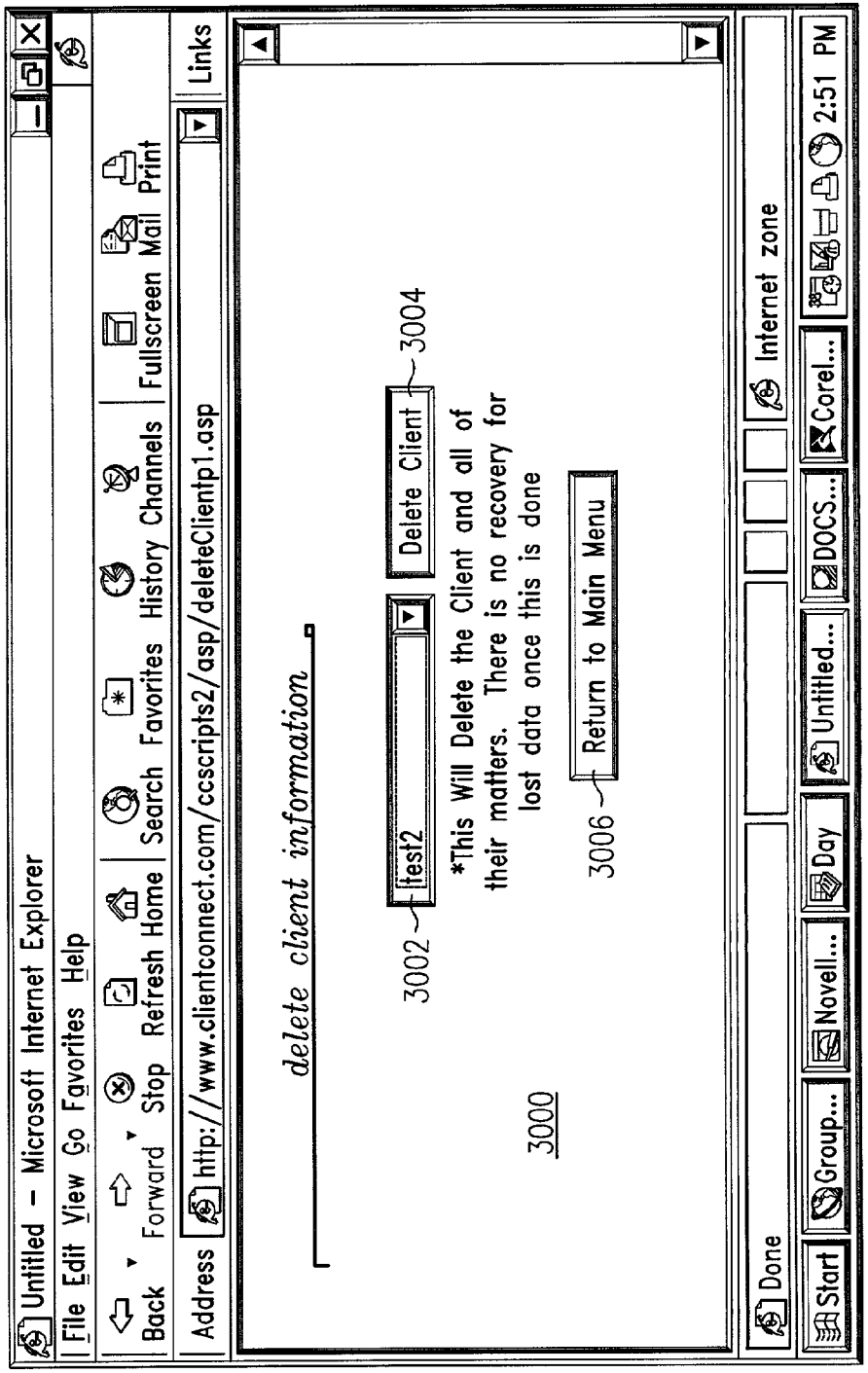

If in step 218, it is determined that the user has not clicked on the New Matter button 416a, in step 222, a determination is made whether the user has clicked on either the Edit/Delete User button 418b or the Roles and Permissions button 418d. If so, execution proceeds to step 224, in which a "Modify User Information" screen 2700, as shown in FIG. 27, is displayed. From the screen 2700, the user enters search criteria in the fields 2702a-2702c and then clicks on a "Submit" button 2704 to submit the criteria and initiate the search. FIG. 28 illustrates a "Search Results" screen 2800 for the criteria shown in FIG. 27. From this screen 2800, the user clicks on the appropriate phrase associated with a selected user to perform the indicated action. For example, clicking on "Permissions" for a user results in the display of an "Add User to Matters" screen 2900, as shown in FIG. 29, from which the user selects from a drop down menu 2902 the appropriate matter and then clicks on a "Submit" button 2904, resulting in the display of a "Specify User Access Levels" screen 2920, as shown in FIG. 29a.

Using the screen 2920, the user selects the various access levels for the selected user and matter by checking the appropriate boxes. For example, as shown in FIG. 29a, for the matter "Alpha Corp.", the selected user can view, add, edit, and delete information with respect to Client Status, Client Notes, Critical Dates, Reports, and Checklists and can view information with respect to Counsel Notes and Other Notes. Access can be restricted by checking only certain ones of "View," "Add," "Edit," and "Delete" for each of the components. Clicking on a "Submit" button 2922 submits the information entered using the screen 2920 and updates the permissions as indicated.

If in step 222, it is determined that the user has not clicked on the Edit/Delete User button 418b or the Roles and Permissions button 418d, execution proceeds to step 226. In step 226, a determination is made whether the user has clicked on the Delete Client button 414d. If so, execution proceeds to step 228, in which a "Delete Client" screen 3000 (FIG. 30) is displayed. Using the screen 3000, the user can select a client using a drop-down menu 3002 and then click on a "Delete Client" button 3004 to delete the client. Clicking on a "Return to Main Menu" button 3006 returns the user to the screen 400 (FIG. 4).

Figure 31:
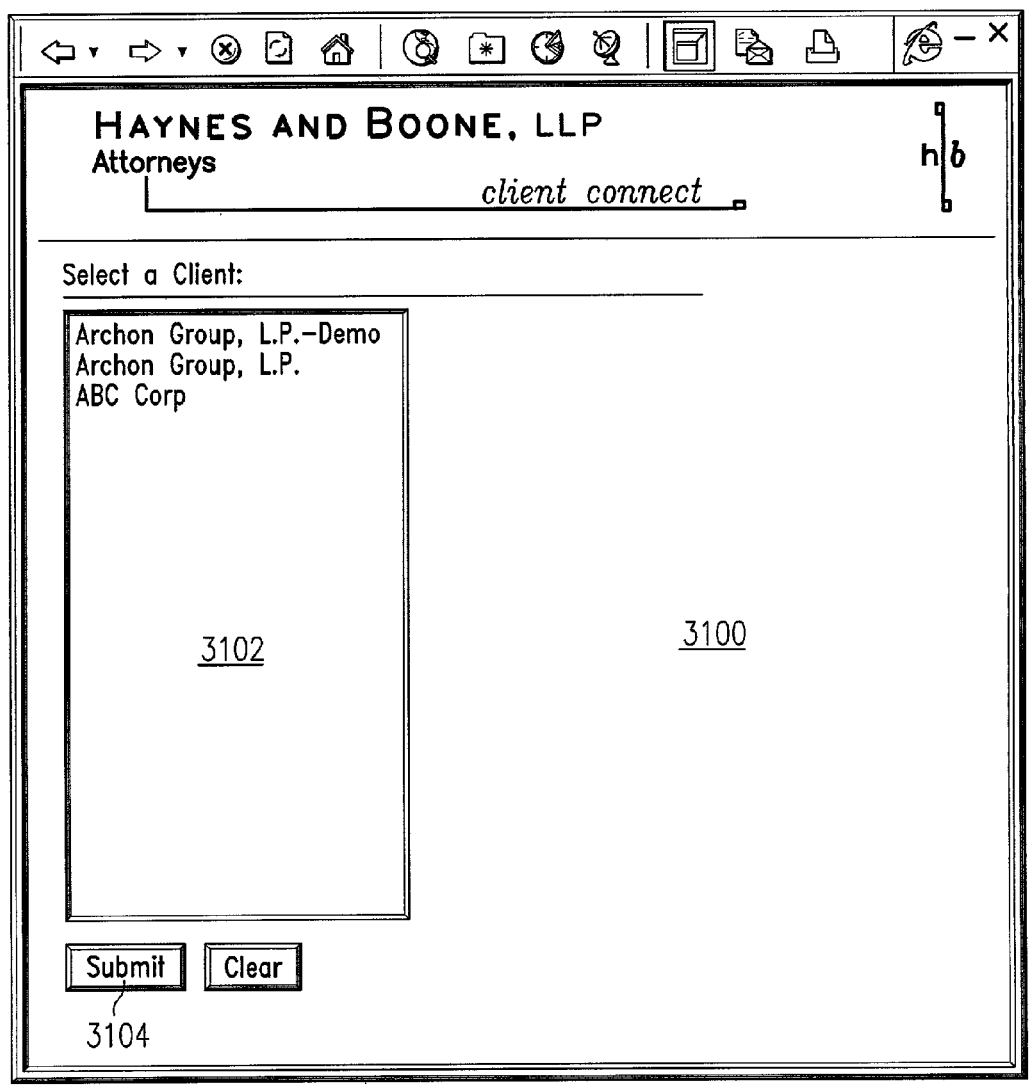
FIG. 31 illustrates a "Select a Client" screen of the application of FIG. 1 or 2.

If in step 226 it is determined that the user has not clicked on the Delete Client button 414d, execution proceeds to step 230, in which a determination is made whether the user has, from the Wizard Main Menu screen 400, clicked on a button 440 designated "Client Connect". If not, execution returns to step 212; otherwise, execution proceeds to step 232, in which a "Select a Client" screen 3100, as shown in FIG. 31, is displayed. Alternatively, a separate web site address and/or log in procedure similar to that described in with reference to FIG. 4 for the Wizard portion can be required for the Client Connect portion of the application described hereinbelow. In any event, using the Select a Client screen 3100, the user selects an appropriate entry from a list 3102 of entries each of which corresponds to a client. It should be recognized that each of the clients of the list 3102 were set up using the New Client Information screen 500 as shown in and described above with reference to FIG. 5. To select a particular entry, e.g., "ABC Corp.", the user highlights the entry and then clicks on a "Submit" button 3104.

Figure 32:
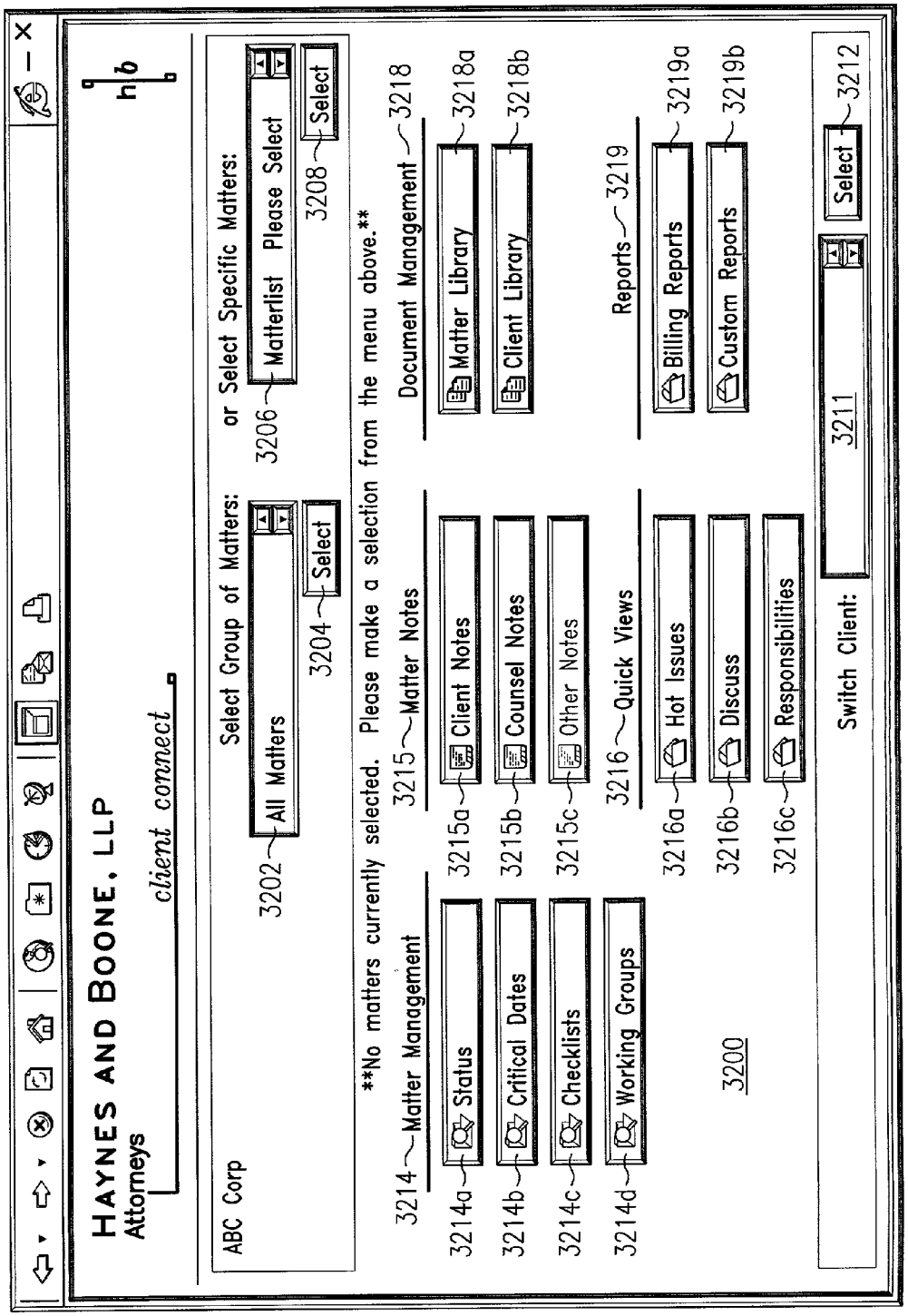
FIG. 32 illustrates a "Main Menu" screen of the application of FIG. 1 or 2.

Once the user has selected a client as explained above with reference to FIG. 31, execution proceeds to step 234, in which a "Front End Main Menu" screen 3200 is displayed, as shown in FIG. 32. At the Main Menu screen 3200, the user is prompted to select one or more matters within the previously selected client. Specifically, the user can select a group of matters by using a drop down menu 3202 to select a group and then clicking on a "Select" button 3204 or can select a specific matter by using a drop down menu 3206 to select a matter and then clicking on a "Select" button 3208. It should be recognized that each of the matters and groups of matters available for selection on the screen 3200 are set up using the Practice Area/Client Work Group Designation Screen 600 (FIG. 6) and the New Matter Designation screen 700 (FIG. 7), respectively, as described above.

If at any time the user determines that he or she would like to select a different client/division combination, rather than returning to the screen 3100, he or she may do so from the Main Menu screen 3200 by using up/down arrows 3210 to display a desired client/division combination in a field 3211 and then clicking on a "Select" button 3212.

Once the user has selected one or more matters, as described above, the user may then access specific types of transaction and matter management information tracked by the application 12 by clicking on one of a plurality of buttons displayed on the Main Menu screen 3200. For ease of location and use, the buttons are divided into several categories, respectively designated "Matter Management" 3214, "Matter Notes" 3215, "Quick Views" 3216, "Document Management" 3218, and "Reports" 3219. The buttons included in the Matter Management category 3214 include "Status" 3214*a*, "Critical Dates" 3214*b*, "Checklists" 3214*c*, and "Working Groups" 3214*d*. The buttons included in the Matter Notes category include "Client Notes" 3215*a*, "Counsel Notes" 3215*b*, and "Other Notes" 3215*c*. The buttons included in the Quick Views category 3216 include "Hot Issues" 3216*a*, "Discuss" 3216*b*, and "Responsibilities" 3216*c*. The buttons included in the Document Management category 3217 include "Matter Library" 3217*a*, and "Client Library" 3217*b*. The buttons included in the Reports category 3218 include "Billing Reports" 3218*a* and "Custom Reports" 3218*b*. Several of the more important functions and features accessible using these buttons will be described below.

It should be noted that the activation of buttons displayed on the screen 3200 is specified using the Select Components screen 800, as described above in connection with FIG. 8.

Figure 33:
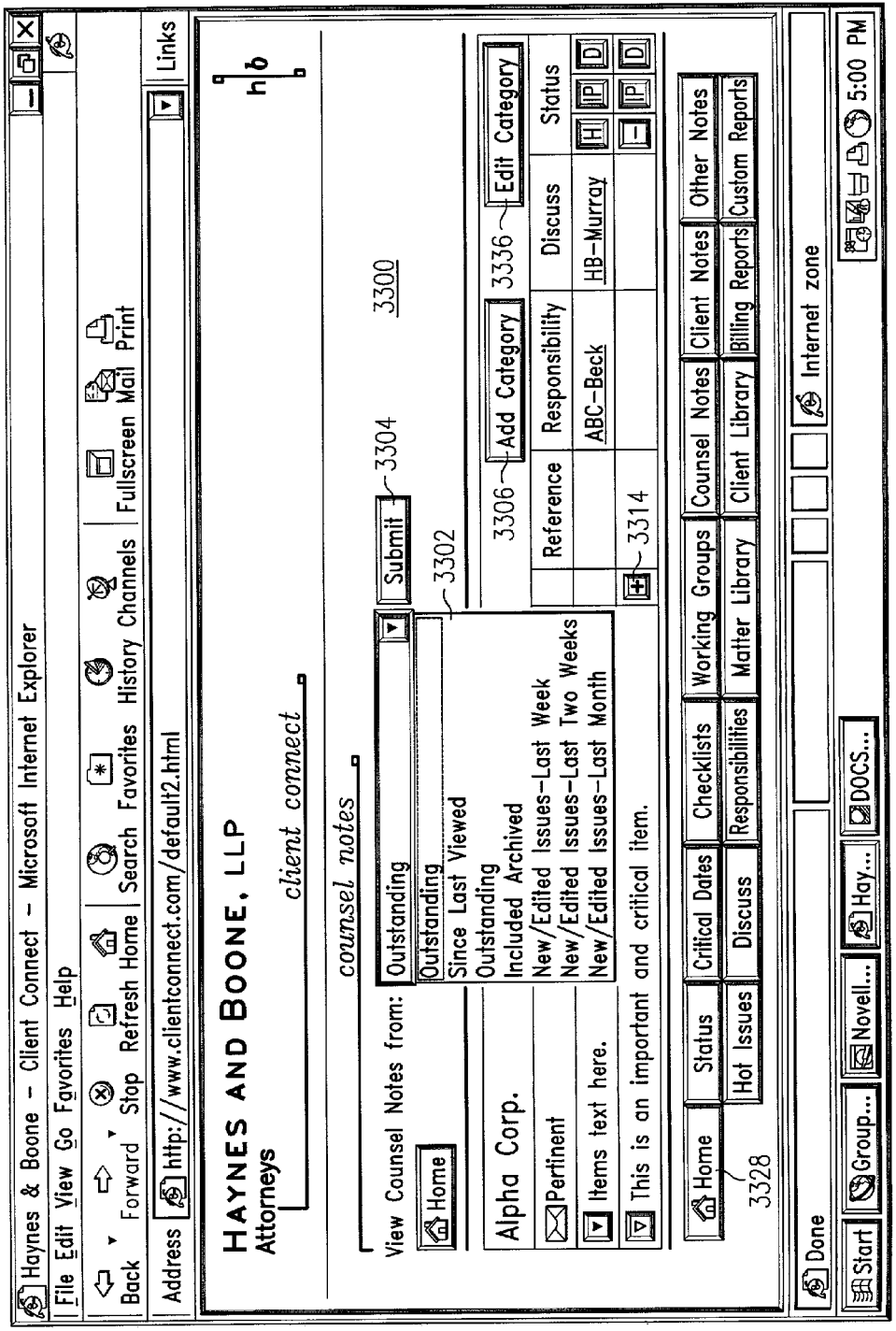

Referring again to FIGS. 2*a*-2*c*, in step 236, a determination is made whether the user has clicked on the Counsel Notes button 3215*b*. If so, execution proceeds to step 238, in which the user is able to add, edit and/or view counsel notes as described below. In particular, the Counsel Notes button 3215*b* provides access to counsel issues entered by any authorized counsel user identifying important legal issues, reminders, or action items, sorted by project or matter. It should be noted that only users designated as "counsel" will be able to modify (i.e., add or edit) counsel notes. As will be described in detail below, each issue or item can be tagged "Hot Issue" or "Discuss With" a specific client user. An exemplary "Counsel Notes" screen 3300 is illustrated in FIG. 33. The user is able to filter the items for which status is requested according to when the item was last edited by selecting a filter from a drop-down menu 3302 and then clicking on a "Submit" button 3304. As shown in FIG. 33, exemplary filters include "Outstanding," "Since Last Viewed," "Included Archived," "New/Edited Issues-Last Week," "New/Edited Issues-Last Two Weeks," and "New/Edited Issues-Last Month." Once a selection is made, the appropriate items will be displayed on the screen 3300.

The Counsel Notes screen 3300 displays the name(s) of the selected matter(s) with corresponding categories and items within those categories displayed thereunder. For example, the matter "Alpha Corp." includes one category "Pertinent".

Figure 33A:
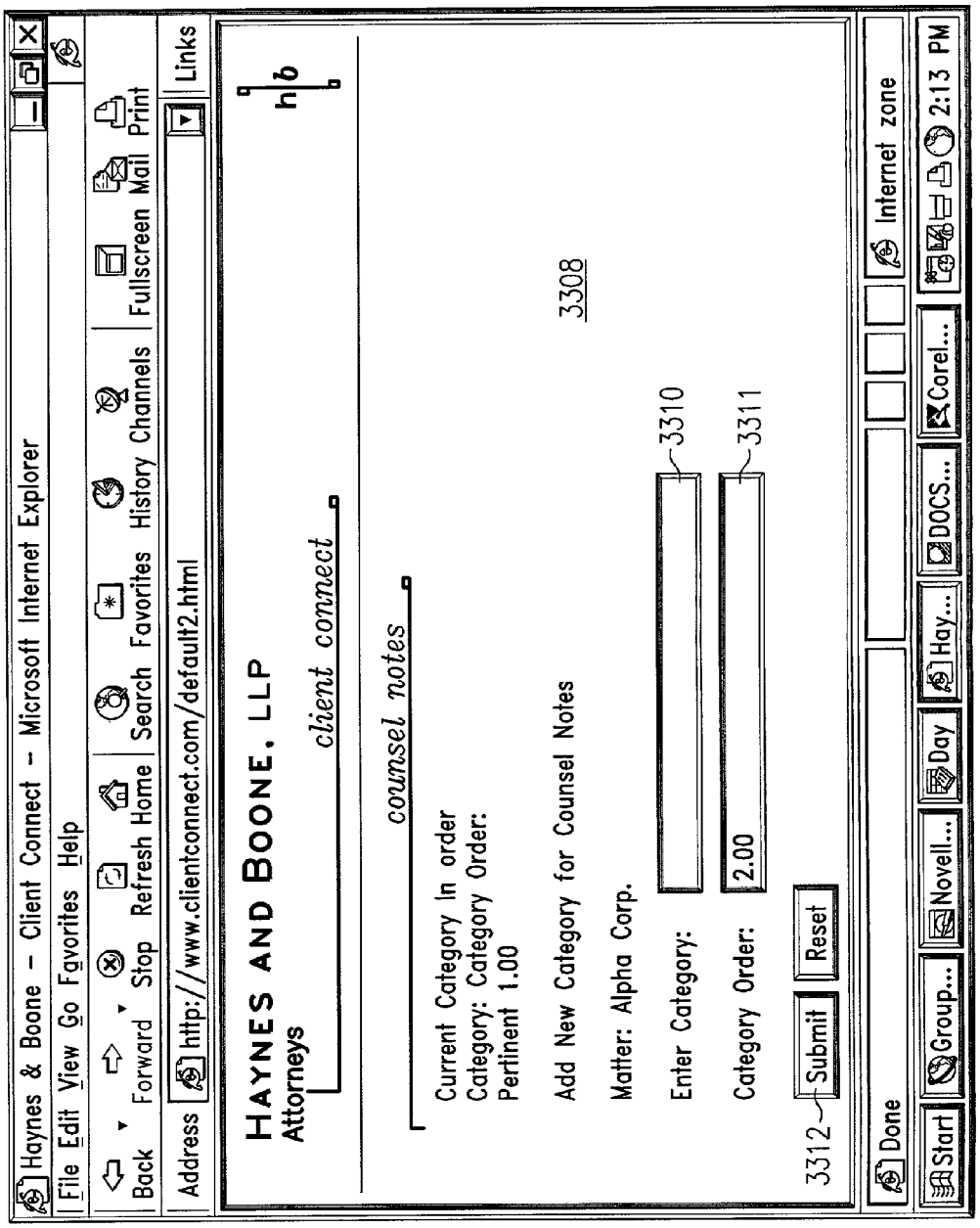
FIG. 33a illustrates an "Add Category" screen of the application of FIG. 1 or 2.

To add a new category to a matter in connection with a component, the user simply clicks on an "Add Category" button 3306 corresponding to the matter in connection with which a category is to be added, resulting in the display of an "Add Category" screen 3308, as shown in FIG. 33*a*. Using this screen, the user fills in the name of the category to be added in a field 3310, fills in the order of the category in a field 3311, and then clicks on a "Submit" button 3312 to add the category and return to the screen 3300.

Figure 33B:
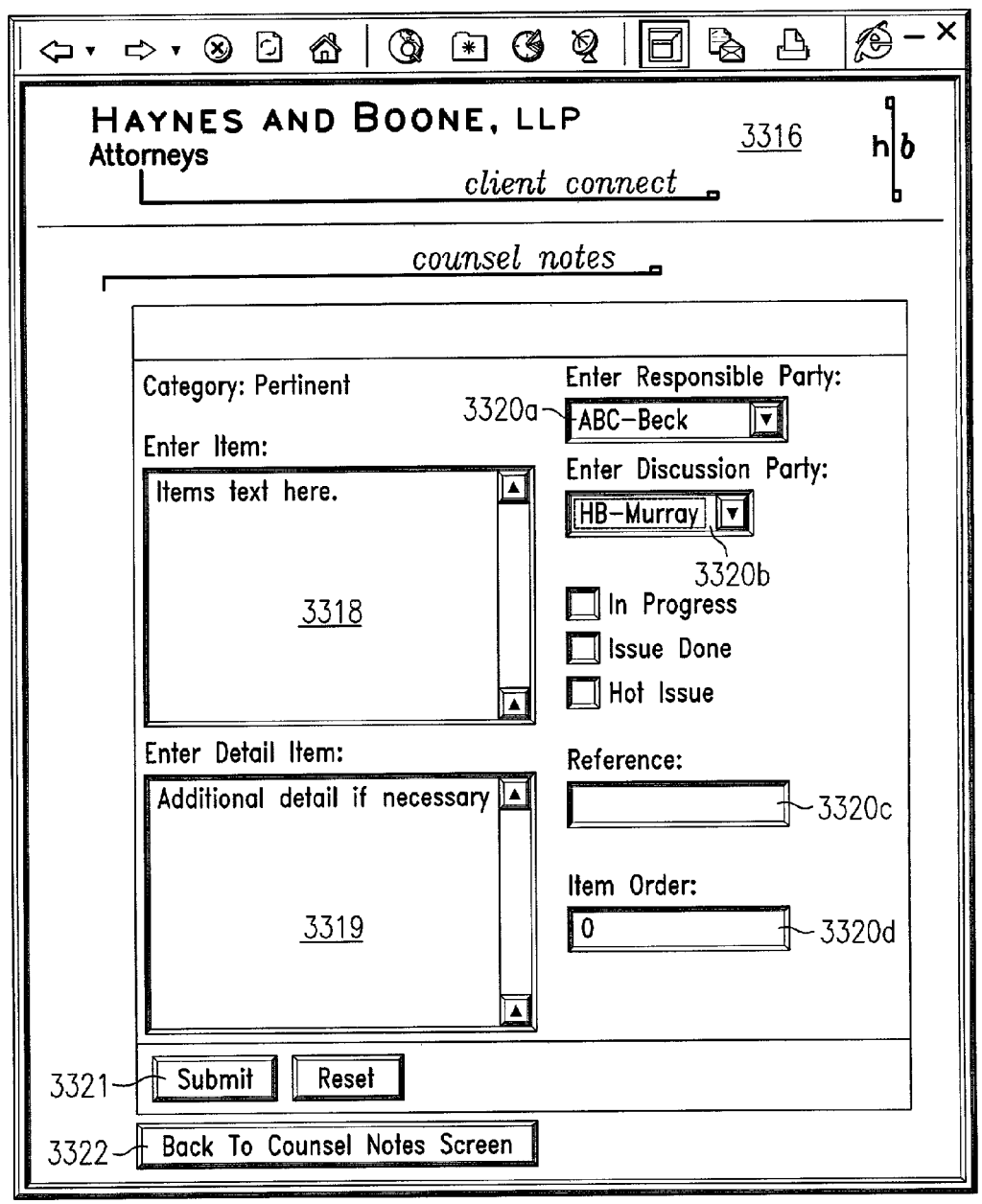
FIG. 33b illustrates an "Add Item" screen of the application of FIG. 1 or 2.

Similarly, to add a new item to a category, the user simply clicks on an "+" button 3314 corresponding to the category in connection with which the item is to be added, resulting in the display of an "Add Item" screen 3316, as shown in FIG. 33*b*. Using this screen 3316, the user enters the name of the item to be added in an "Enter Item" field 3318 and may enter information concerning the item status in an "Enter Item Detail" field 3319. The item can be tagged as "In Progress," "Done," and/or "Hot" by checking respective boxes labeled "In Progress" (3319*a*), "Issue Done" (3319*b*) and/or "Hot Issue" (3319*c*). It should be noted that an item tagged "Done" will not be displayed on the screen 3300 unless the filter "Included Archived" has been selected. A responsible party, discussion party, reference, and order for the item can be entered in respective fields 3320*a*, 3320*b*, 3320*c* and 3320*d*. Once the information has been entered, the user clicks on a "Submit" button 3321 to add the item. To return to the screen 3300, the user click on a "Back To Issues Main Menu" button 3322.

Figure 33C:
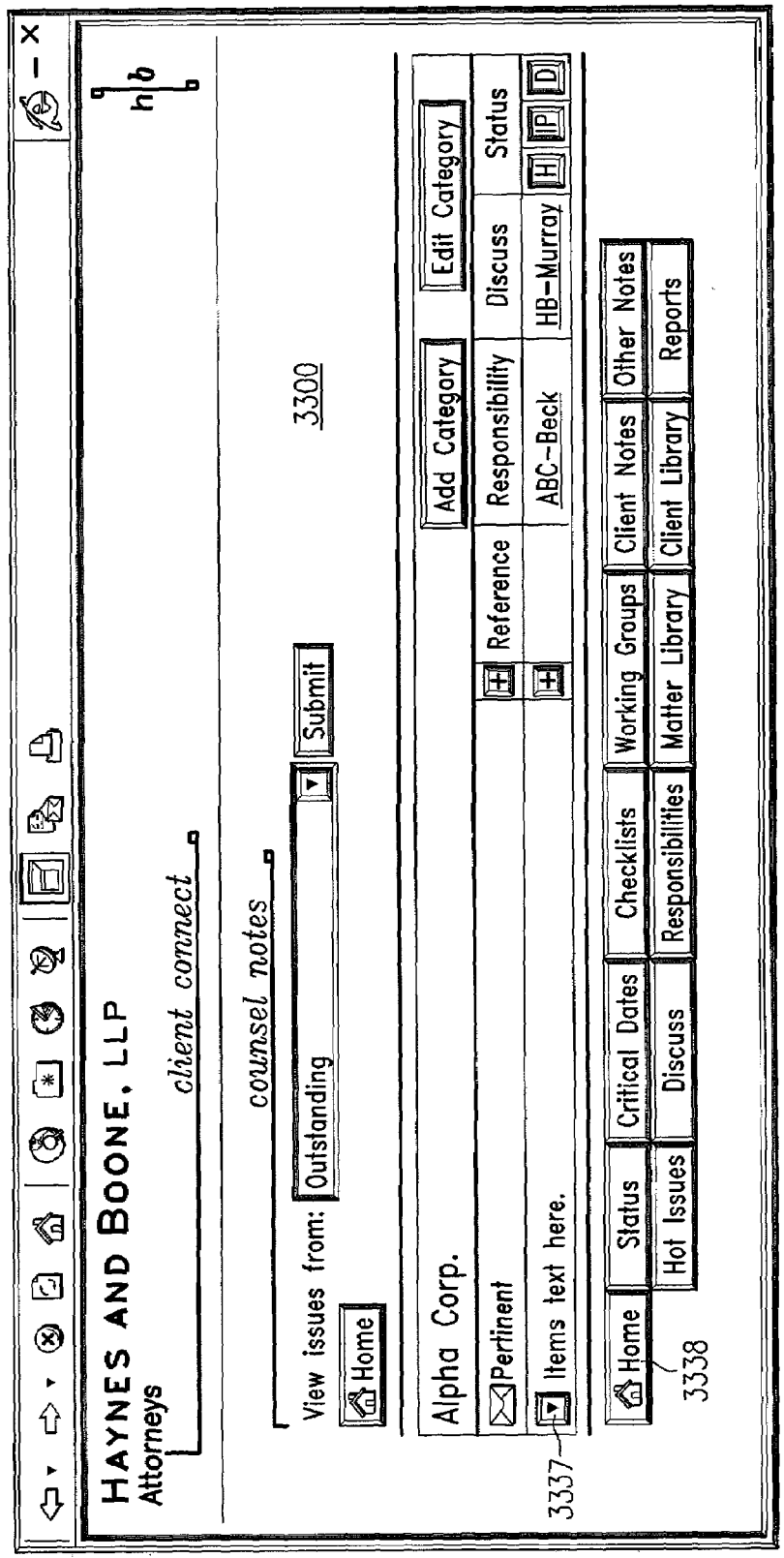
FIG. 33c illustrates the "Client Notes" screen of FIG. 33 after an item has been added as illustrated in FIG. 33b.

FIG. 33*c* illustrates the screen 3300 (FIG. 33) after the item has been added as illustrated in FIG. 33*b*. It should be noted that sub-items are added in much the same way as items; that is, by clicking on a "+" button 3323 of the item in connection with which the sub-item is to be added. It should be noted that the reference and the responsible and discussion parties, if any, will be indicated in the "Reference," "Responsibility" and "Discuss" columns, respectively, for the item. In addition, if the item has been tagged as "In Progress," "Issue Done," or "Hot Issue," a corresponding icon ("IP," "D," or "H," respectively) will be highlighted in the Status column. In addition, an item's "tag" can be changed by clicking on the corresponding icon to toggle it from active (highlighted) to inactive (shaded). For example, an item that had been tagged as "Hot" will have a highlighted "H" icon displayed in connection therewith. If the item is no longer considered "Hot", the user can click on the "H" icon to deactivate the tag with respect to the item. Changing an items status as "In Progress" and "Done" is accomplished in the same fashion.

Figure 33D:
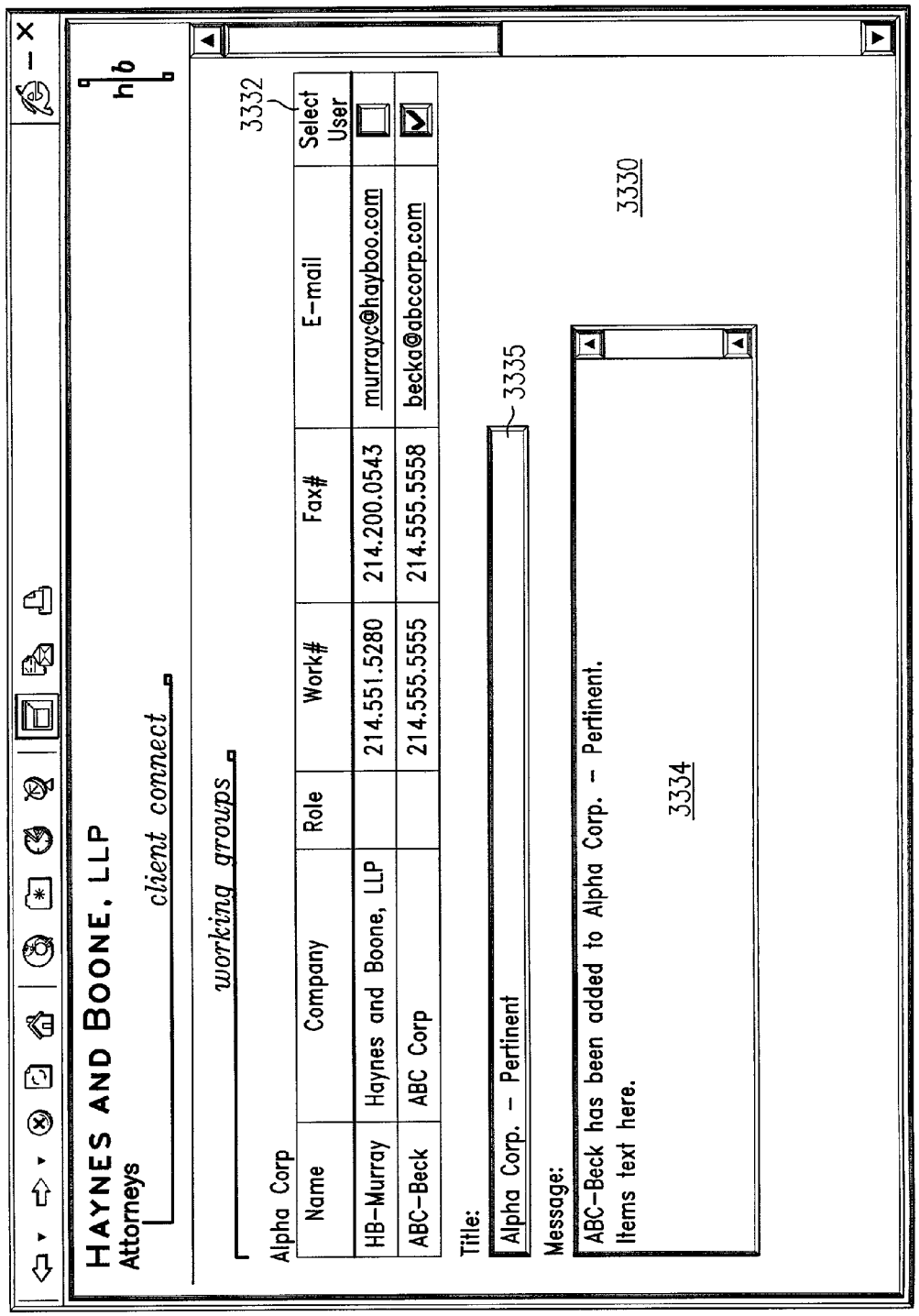

In addition, it should be noted that the name of each category is preceded by a small icon 3328 resembling an envelope. Clicking on this icon automatically takes the user to a "Working Groups E-Mail" screen 3330, as shown in FIG. 33*d*, comprising a list of each responsible party for the category, his or her company affiliation, role, telephone number, fax number, and E-mail address. The user can E-mail any member of a working group directly from the application 12 simply by clicking on a check box for the user in a "Select User" column 3332 and then typing a the message in a "Message" field 3334. The matter and category name is automatically included in a "Title" field 3335 for the E-mail correspondence.

In one embodiment, the E-Mail screen 3330 includes a list of all of the user groups established by the user (Add User Group screen 2400, FIG. 24). The user can then select one of the user groups and send the e-mail to all or selected members of the selected user group.

Referring again to FIG. 33, to edit a category, the user clicks on an "Edit Category" button 3336 and is prompted to select a category to be edited, at which point the Add Category screen 3308 (FIG. 33*a*) for the category is redisplayed and the user can make any desired changes. Items and sub-items may be edited in a similar fashion. Referring to FIG. 33*c*, an icon 3337 is used to indicate to the user whether additional information (i.e., "Item Detail") is available for the item with which the icon 3337 is associated. In particular, if the icon 3337 is a particular color (e.g., blue), the user should be alerted to the fact that there is additional information to that can be accessed by clicking on the icon 3337; otherwise, no additional information is available.

As best shown in FIG. 33*c*, a menu bar 3338 is displayed near the bottom of the screen 3300 and includes a "Home" button 3339 to return the user to the Main Menu screen 3200 and buttons corresponding to each of the buttons 3214*a*-3214*d*, 3215*a*, 3215*c*, 3216*a*-3216*c*, 3217*a*, and 3217*b*, as well as a button 3340 corresponding to the Reports category 3218. It will be noted that a button corresponding to the screen currently being displayed (i.e., the Counsel Notes button 3215*b*) is not displayed. Alternatively, the button may be displayed in a different color.

If in step 236 it is determined that the user has not clicked on the Counsel Notes button 3215b, execution proceeds to step 240, in which a determination is made whether the user has clicked on the Status button 3214a. If so, execution proceeds to step 242, in which the user is able to add, edit, and view status items as described below.

Figure 34:
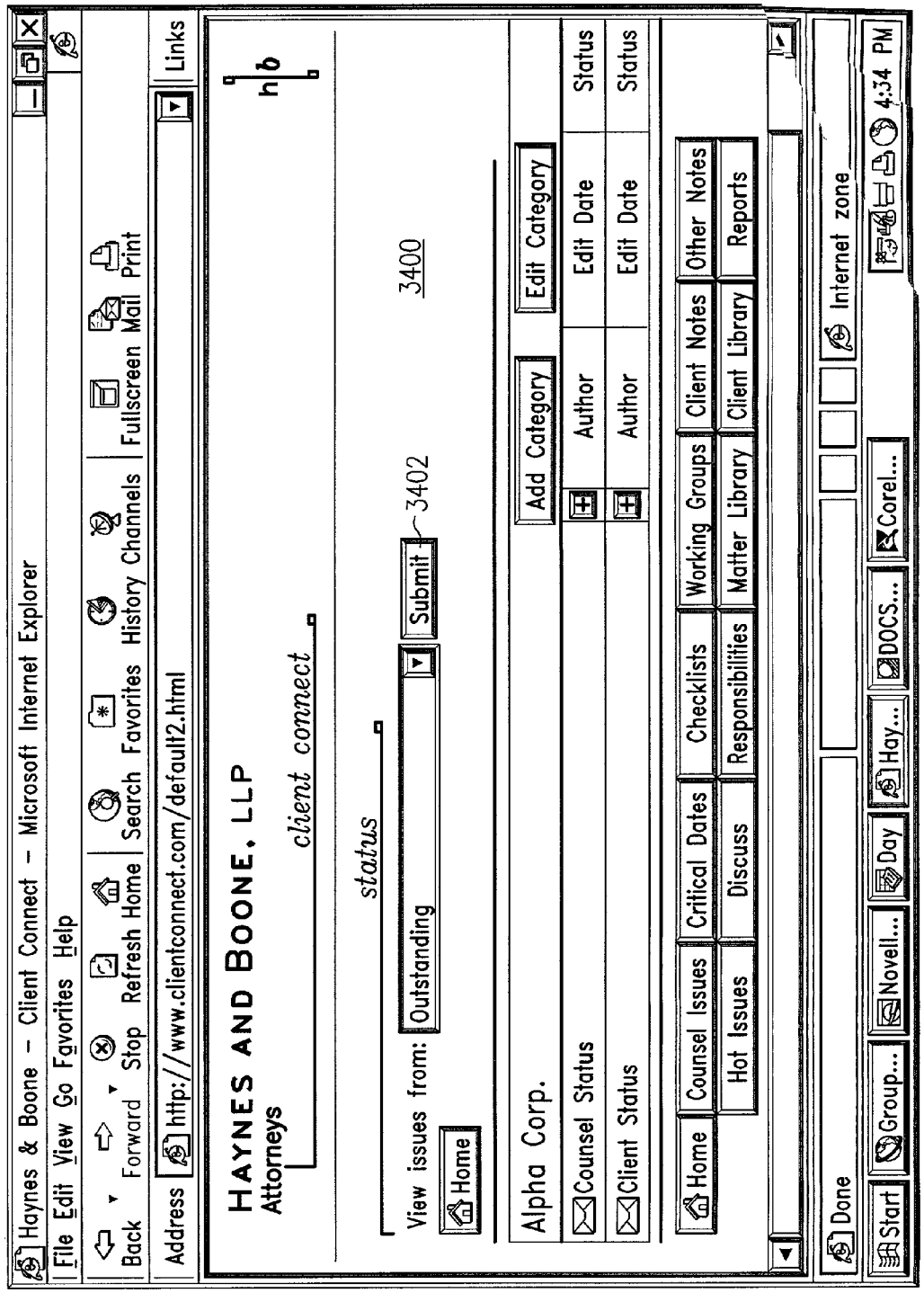
FIG. 34 illustrates a "Status" screen of the application of FIG. 1 or 2.

In particular, referring again to FIG. 32, the Status button 3214a provides access to current client status notes entered by client users and counsels status notes entered by counsel users, displaying the name of the user entering the note and that date of the note, sorted by project or matter. An exemplary "Status" screen 3400 is illustrated in FIG. 34. Again, the user is able to filter the items for which status is requested according to when the item was last edited by selecting a filter from a drop-down menu 3402 and then clicking on a "Submit" button 3404. Once a selection is made, the appropriate items will be displayed on the screen 3400.

The Status screen 3400 displays the name(s) of the selected matter(s) with corresponding categories and items within those categories displayed thereunder. For example, the matter "Alpha Corp." includes two categories "Counsel Status" and "Client Status". Although no items are shown for either of the categories, it should be noted that, for each item, the author of the item, as well as the last edit date and status of the item, are indicated under the headings "Author," "Edit Date," and "Status," respectively, in connection with the item. Categories, items and subitems are added as described above with reference to FIGS. 33a and 33b. Similarly, e-mail messages may be sent from the Status screen 3400 as described above with reference to FIG. 33d.

If in step 240 it is determined that the user has not clicked on the Status button 3214a, execution proceeds to step 244, in which a determination is made whether the user has clicked on the Critical Dates button 3214b. If so, execution proceeds to step 246, in which the user is able to add, edit, and view critical dates items as described below.

Figure 35:
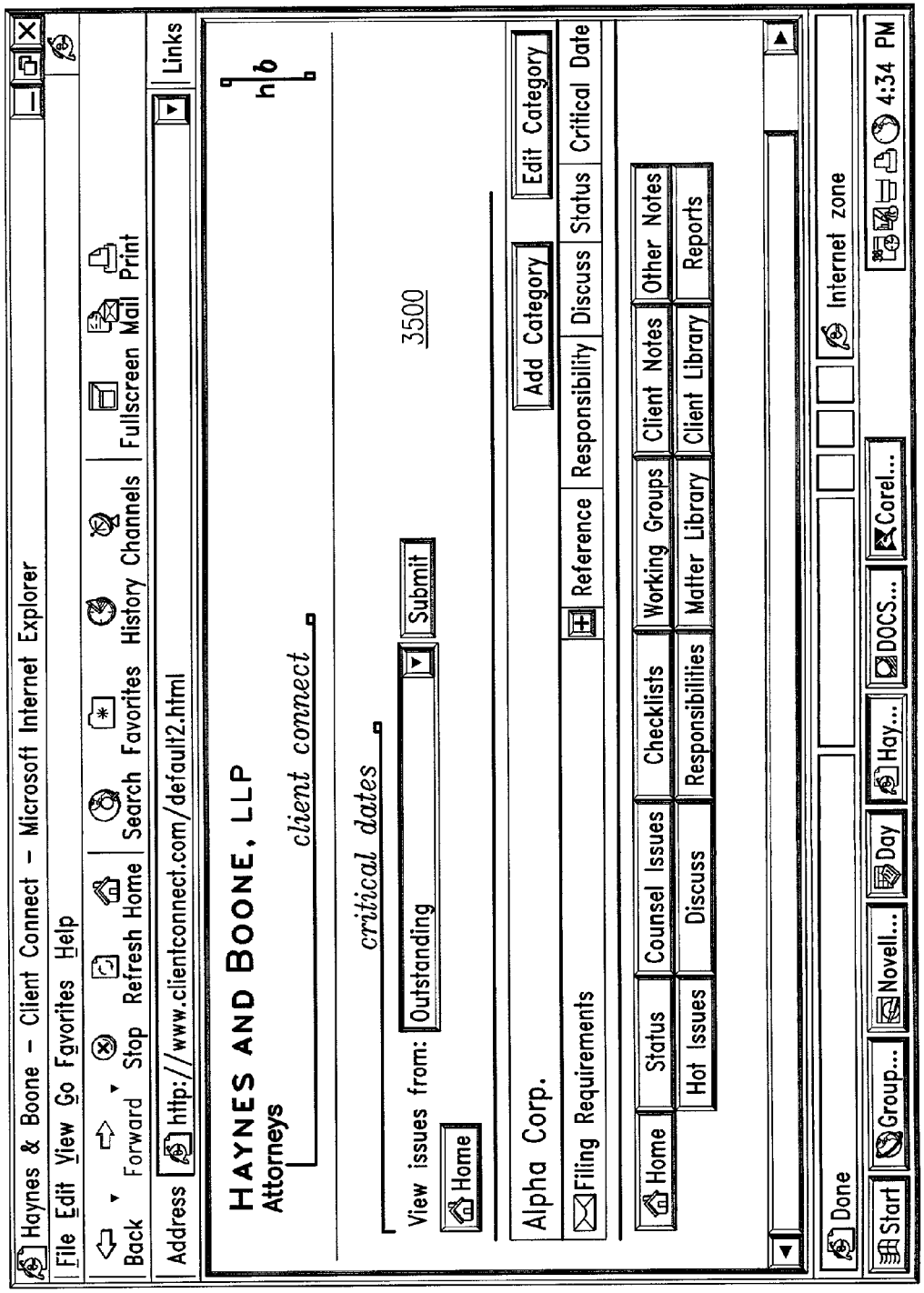
FIG. 35 illustrates a "Critical Dates" screen of the application of FIG. 1 or 2.

Referring again to FIG. 32, the Critical Dates button 3214b provides access to critical dates for projects or matters as identified by client users or counsel users. An exemplary "Critical Dates" screen 3500 is illustrated in FIG. 35. Again, the user is able to filter the items for which status is requested using a drop-down menu 3502 to select a filter and then clicking on a "Submit" button 3504. Once a selection is made, the appropriate items will be displayed on the screen 3500.

The Critical Dates screen 3500 displays the name(s) of the selected matter(s) with corresponding categories and items within those categories displayed thereunder. For example, the matter "Alpha Corp." includes one category "Filing Requirements". Although no items are shown for the category, it should be noted that, for each item, the reference, responsible party, discussion party, status, and critical date, if any, are indicated under the headings "Reference," "Responsibility," "Discuss," "Status," and "Critical Date," respectively, in connection with the item. Categories, items and subitems are added as described above with reference to FIGS. 33a and 33b. Similarly, e-mail messages may be sent from the Critical Dates screen 3500 as described above with reference to FIG. 33d; however, for any Critical Dates item added, an E-mail is automatically generated to the users designated as responsible and discussion parties for the item notifying them of the critical date.

If in step 244 it is determined that the user has not clicked on the Critical Dates button 3214b, execution proceeds to step 248, in which a determination is made whether the user has clicked on the Checklists button 3214c. If so, execution proceeds to step 250, in which the user is able to add, edit, and view checklists as described below.

Referring again to FIG. 32, the Checklists button 3214c provides access to multiple interactive Checklists for each project or matter, customizable for each client's particular business. Examples include due diligence checklists, closing checklists, and leasing checklists. An exemplary "Checklists" screen 3600 is illustrated in FIG. 36. Again, the user is able to filter the items that are requested using a drop-down menu 3602 to select a filter and then clicking on a "Submit" button 3604. Once a selection is made, the appropriate items will be displayed on the screen 3600.

The Checklists screen 3600 displays the name(s) of the selected matter(s) with corresponding categories, or Checklists, and items within those Checklists displayed thereunder. For example, the matter "Alpha Corp." includes two Checklists "To Do" and "Preliminary". It should be noted that the names of the checklists displayed on the screen 3600 are designated using the Name Checklists screen 1100 as shown in and described above with reference to FIG. 11. Similarly, column headings displayed on the screen 3600 are designated using the Name Columns for Checklists screen 1000, as shown in and described above with reference to FIG. 10.

To display the items for a particular Checklist, the user clicks on a "List Items" button 3606 for that item. For example, clicking on the List Items button 3606 for the To Do Checklist results in the display of a "List Items" screen 3620, as shown in FIG. 36a.

Figure 36A:
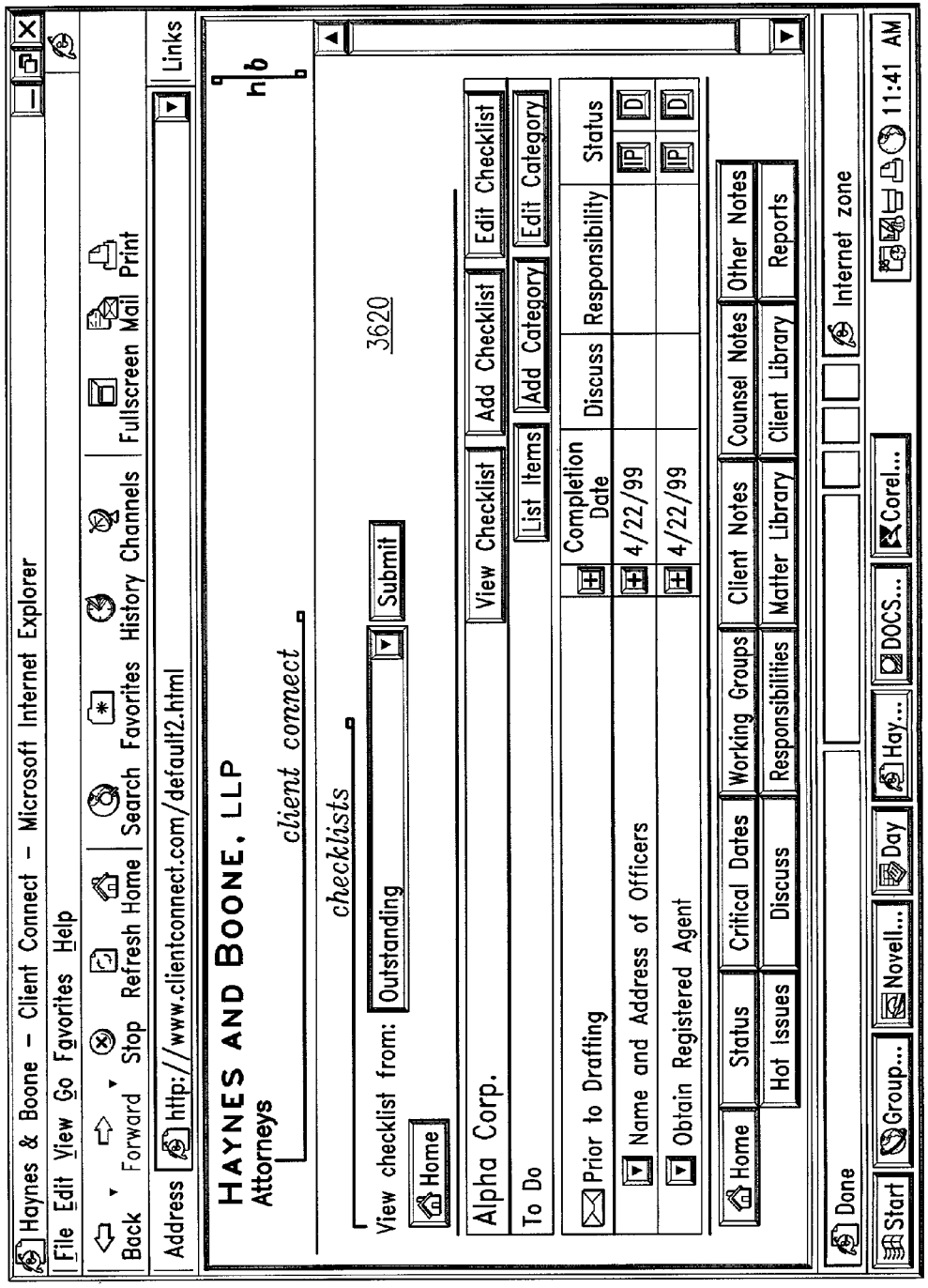
FIG. 36a illustrates a "Checklists-List Items" screen of the application of FIG. 1 or 2.

As shown in FIG. 36a, the To Do Checklist includes one category "Prior to Drafting" and two items "Name and Address of Officers" and "Obtain Registered Agent." For each item, the completion date, discussion party, responsible party, and status of the item, if any, are indicated under the headings "Completion Date," "Discuss," "Responsibility," and "Status," respectively, in connection with the item. Categories, items and subitems are added as described above with reference to FIGS. 33a and 33b. Similarly, e-mail messages may be sent from the screens 3600, 3620, as described above with reference to FIG. 33d.

If in step 248 it is determined that the user has not clicked on the Checklists button 3214c, execution proceeds to step 252, in which a determination is made whether the user has clicked on the Working Groups button 3214d. If so, execution proceeds to step 254, in which the user is able to add, edit, and view working groups as described below.

Figure 37:
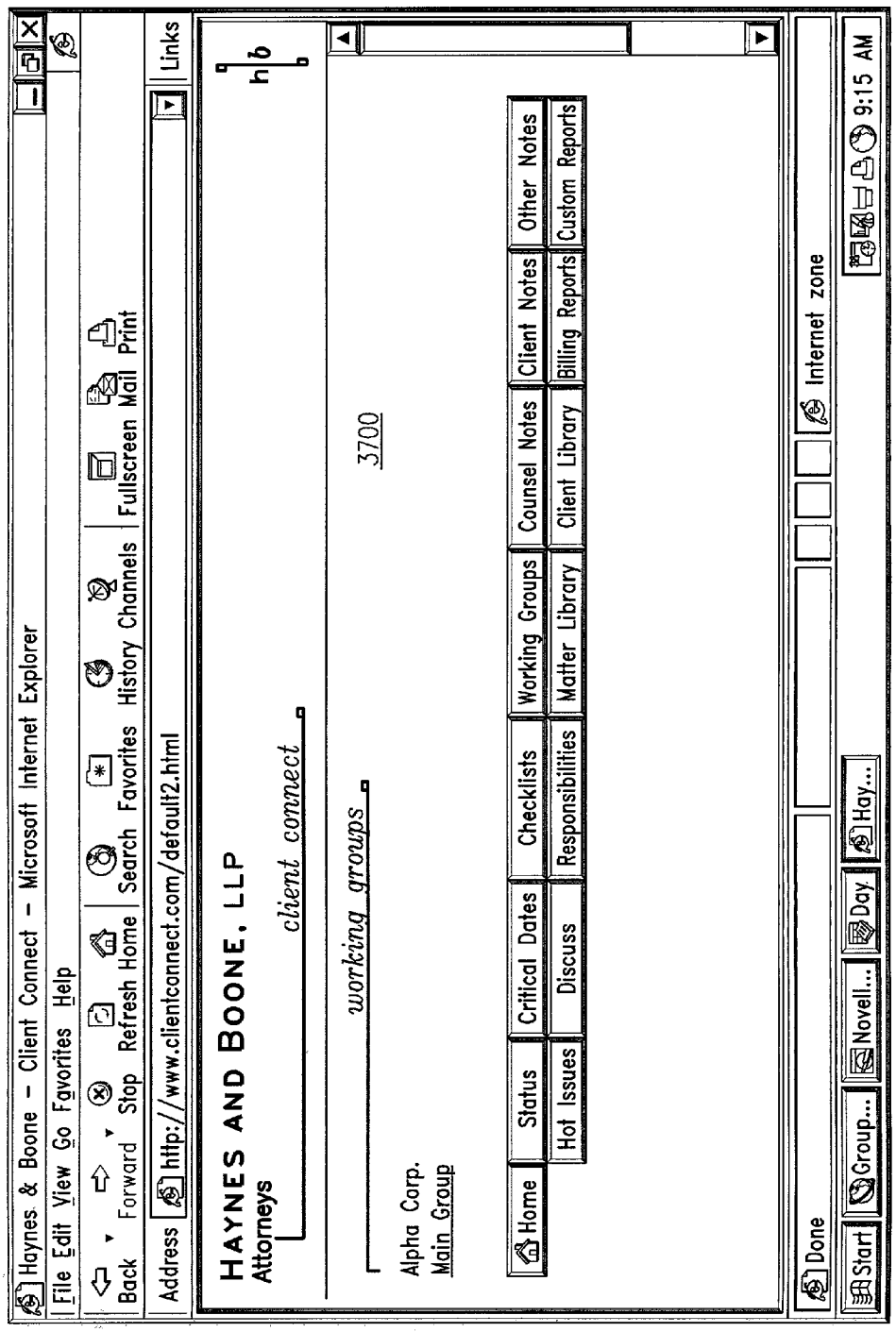
FIGS. 37 and 37a illustrate "Working Groups" screens of the application of FIG. 1 or 2.
Figure 37A:
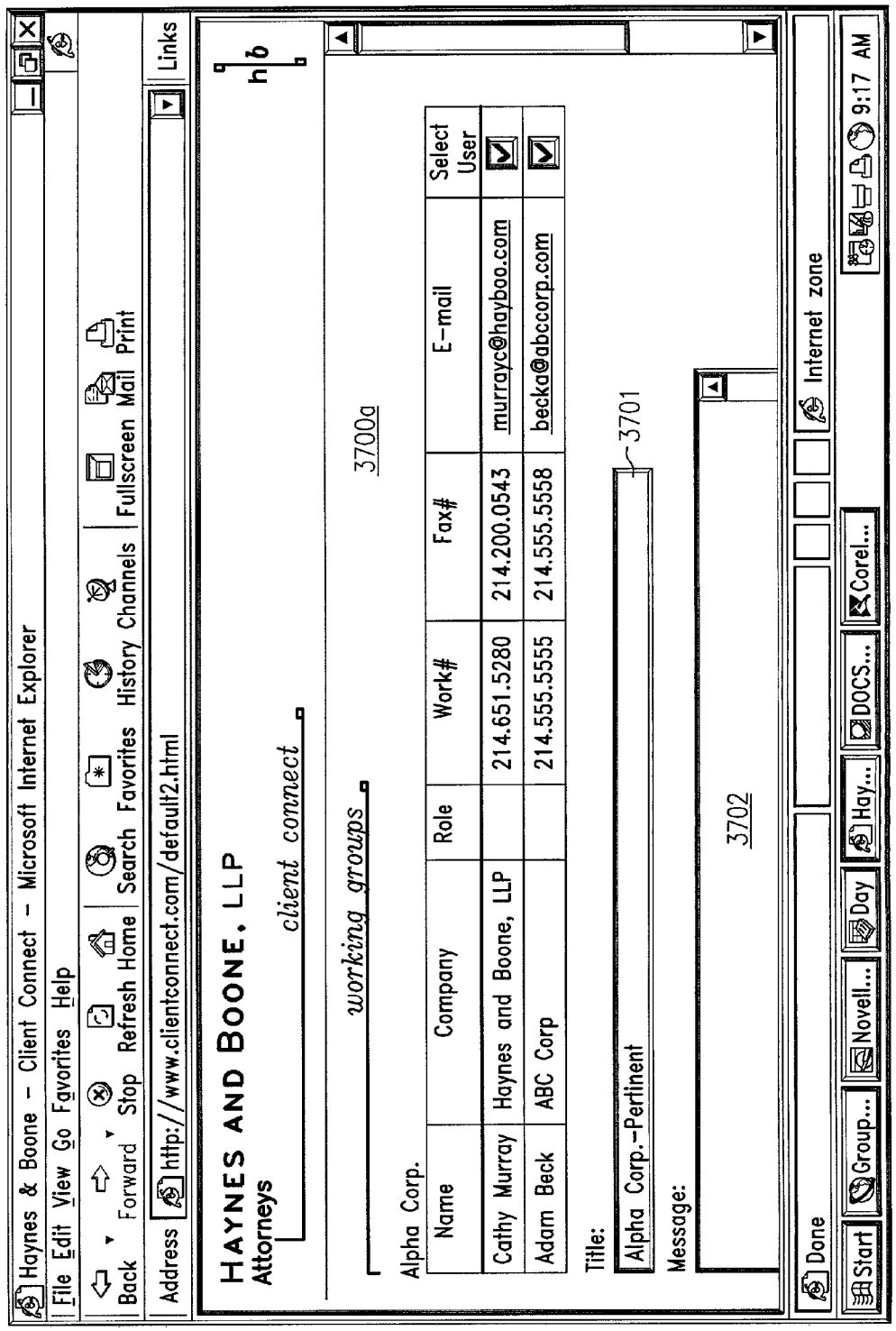

Referring again to FIG. 32, the Working Groups button 3214d results in the display of a Working Groups screen 3700 as shown in FIG. 37, comprising a list of working groups for the selected matter(s). As shown in FIG. 37, the selected matter is "Alpha Corp." and the only working group included under Alpha Corp. is "Main Group." Clicking "Main Group" will result in the display of a screen 3700a as shown in FIG. 37a comprising a list that includes each working group member's company affiliation, address, role, telephone number, fax number, and E-mail address. This is the same list that is displayed when the envelope icon 3328 for a particular matter is clicked on. The screen 3700 is used in a similar fashion as the screen 3330 (FIG. 33d), except that a title field 3701 is automatically filled in with only the name of the matter and the message typed in the message field 3702 will be sent to all users on the list for which a check box under a heading "Select User" has been checked.

It should be noted that the group of users displayed in the Work Group screen 3700 includes the users designated for the matter as described above with reference to FIGS. 12 and 13 and FIGS. 25 and 26.

If in step 252 it is determined that the user has not clicked on the Working Groups button 3214d, execution proceeds to step 256, in which a determination is made whether the user has clicked on the Client Notes button 3215a. If so, execution proceeds to step 258, in which the user is able to add, edit, and view client notes as described below.

Figure 38:
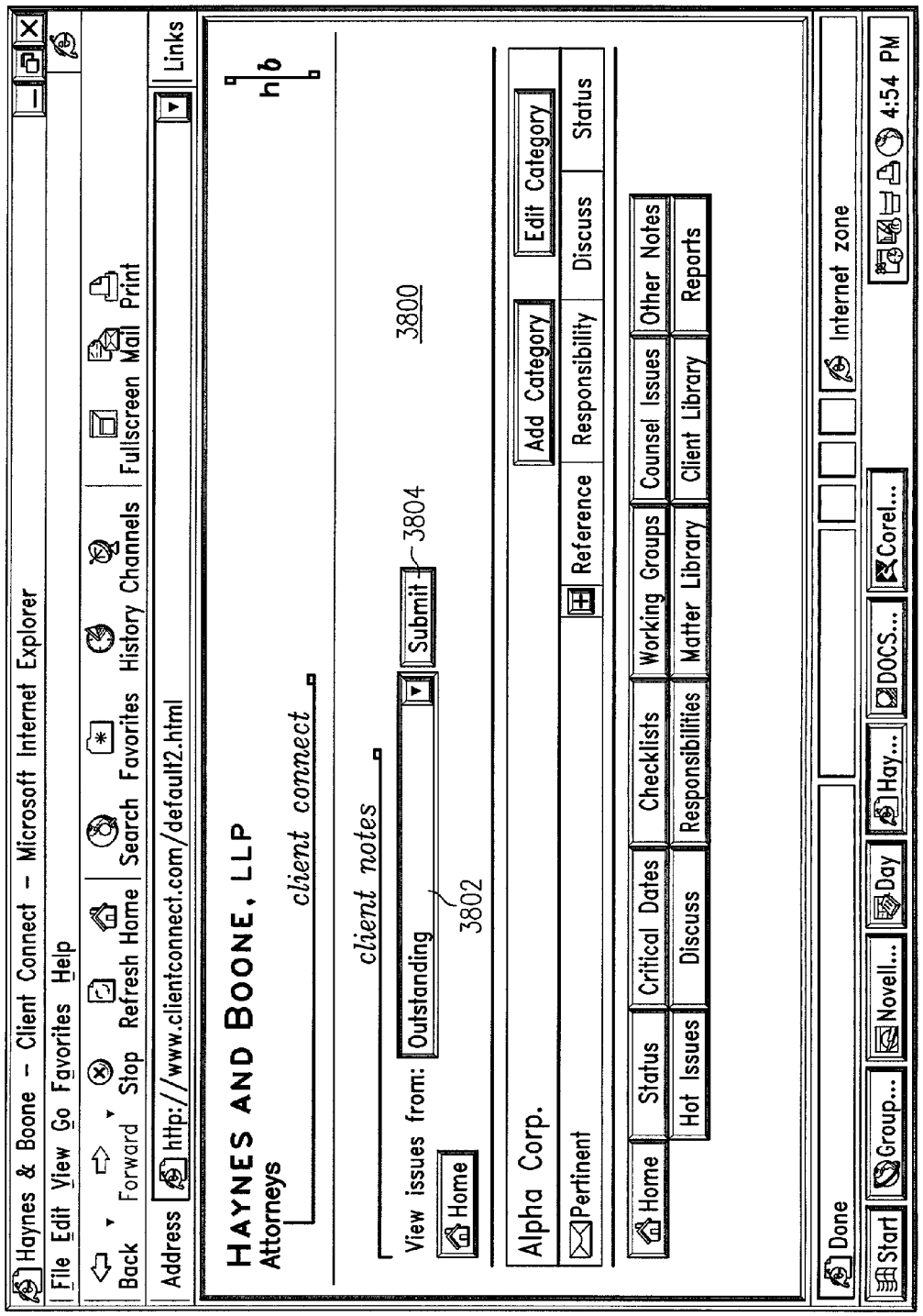
FIG. 38 illustrates a "Client Notes" screen of the application of FIG. 1 or 2.

Referring again to FIG. 32, the Client Notes button 3215a provides access to client notes entered by any authorized client user identifying important business points, reminders, or action items, sorted by project or matter. It should be noted that only users identified as "clients" are able to modify (i.e., add or edit) client notes. As with Counsel Notes, each note can be tagged "Hot Issue" or "Discuss With" a specific client user or counsel user. An exemplary "Client Notes" screen 3800 is illustrated in FIG. 38. Again, the user is able to filter the items for which status is requested using a drop-down menu 3802 to select a filter and then clicking on a "Submit" button 3804. Once a selection is made, the appropriate items will be displayed on the screen 3800.

The Client Notes screen 3800 displays the name(s) of the selected matter(s) with corresponding categories and items within those categories displayed thereunder. For example, the matter "Alpha Corp." includes one category "Pertinent". Although no items are shown for the category, it should be noted that, for each item, the reference, responsible party, discussion party, and status, if any, for the item are indicated under the headings "Reference," "Responsibility," "Discuss," and "Status," respectively, in connection with the item. Categories, items and subitems are added as described above with reference to FIGS. 33a and 33b. Similarly, e-mail messages may be sent from the Critical Dates screen 3500 as described above with reference to FIG. 33d.

It should be noted that the categories displayed on the components screens 3300 (FIG. 33a), 3400 (FIG. 34), 3500 (FIG. 35), and 3800 (FIG. 38) are specified using the Name Categories for Components Screen 900 as shown in and described above with reference to FIG. 9.

If in step 256 it is determined that the user has not clicked on the Client Notes button 3215b, execution proceeds to step 260, in which a determination is made whether the user has clicked on the Hot Issues button 3216a. If so, execution proceeds to step 262, in which the user is able to view items tagged as hot issues as described below.

Figure 39:
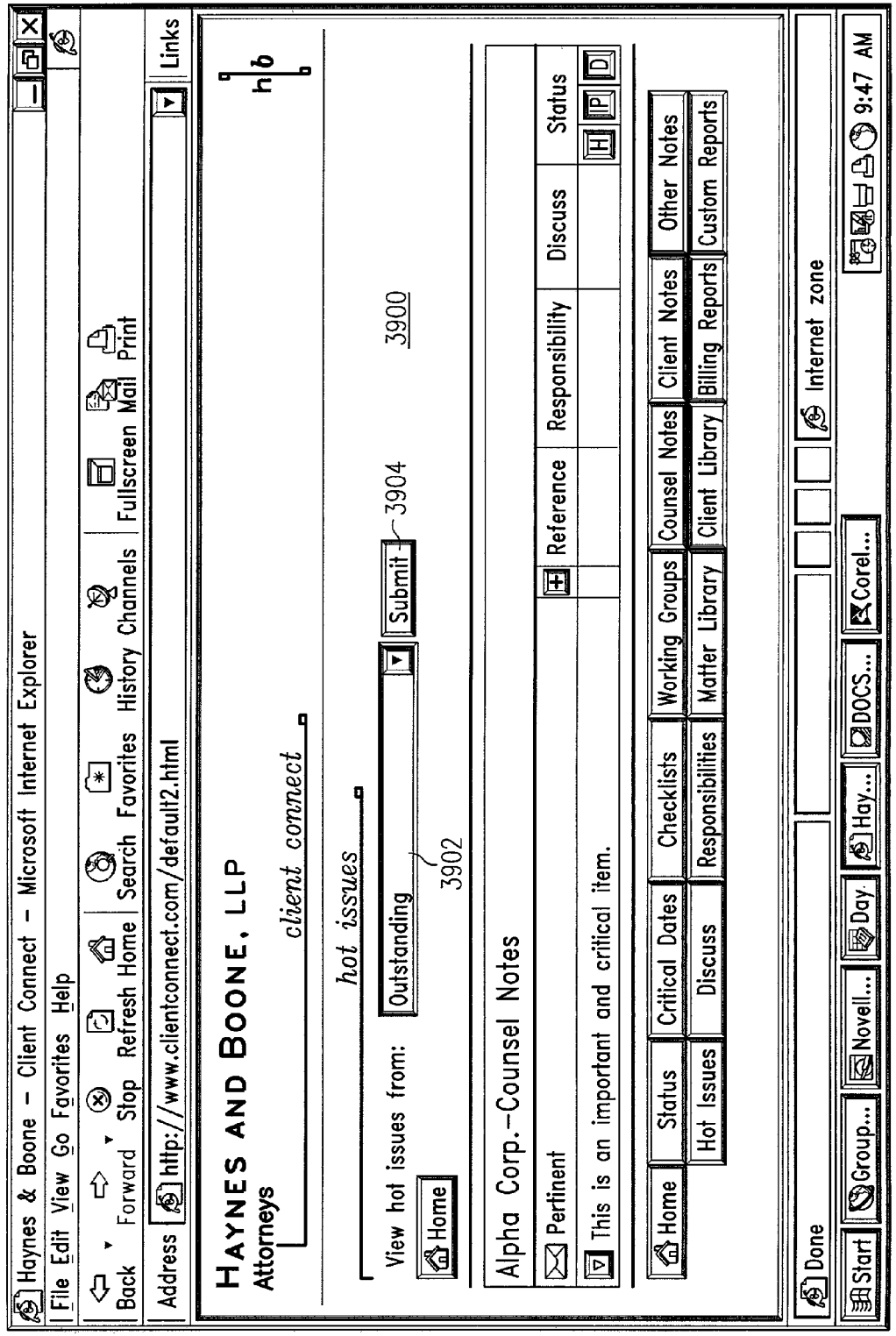
FIG. 39 illustrates a "Hot Issues" screen of the application of FIG. 1 or 2.

In particular, referring again to FIG. 32, clicking on the Hot Issues button 3216a results in the display of a quick view of all currently outstanding items or issues that have been tagged Hot Issues, as described above, by any client user or counsel user, sorted by project or matter. This feature is primarily designed for use by CEOs and other senior managers, business people, and general counsel to quickly view highly significant issues without suffering information overload. An exemplary "Hot Issues" screen 3900 is illustrated in FIG. 39. Again, the user is able to filter the items to be displayed using a drop-down menu 3902 and then clicking on a "Submit" button 3904.

Figure 40:
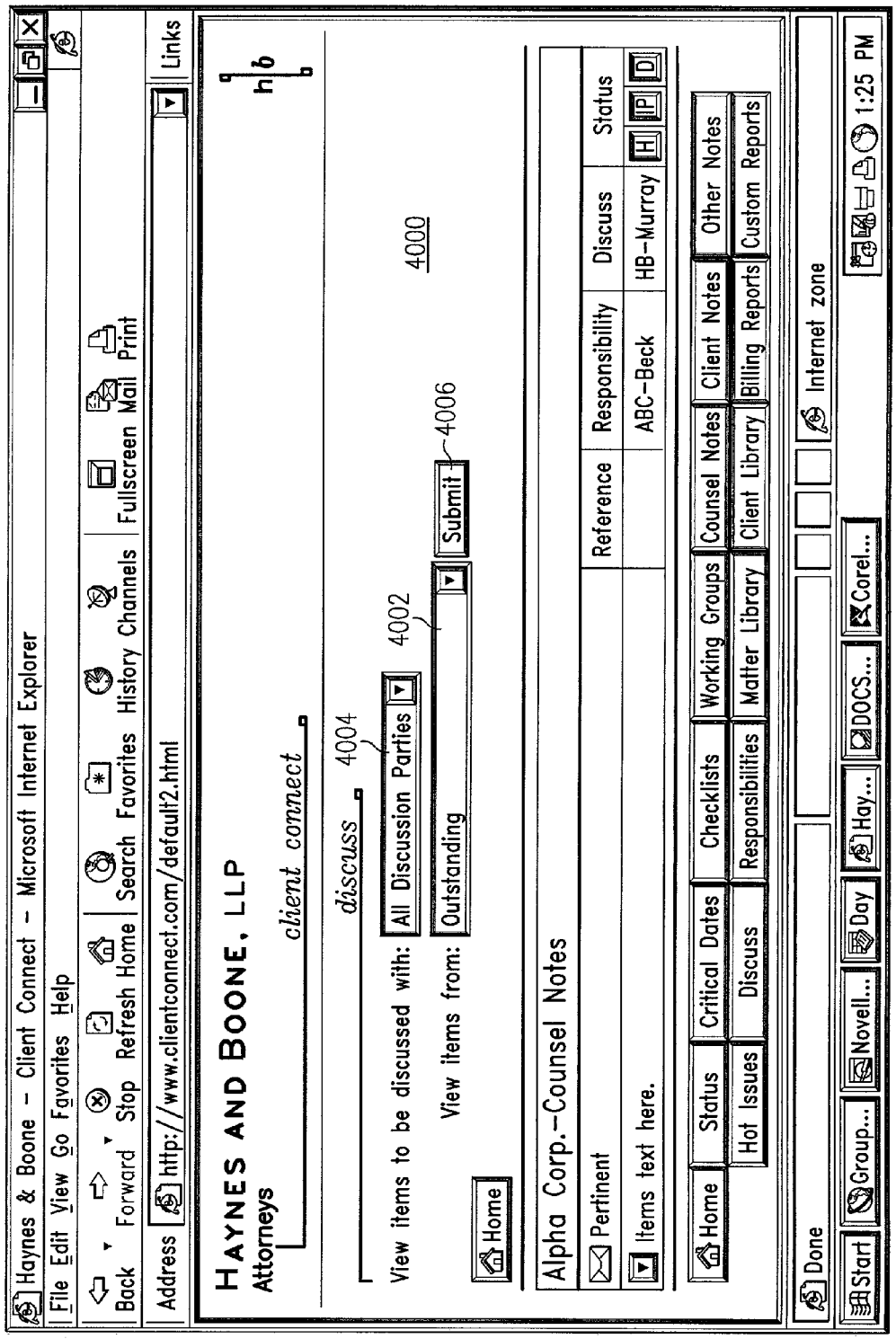
FIG. 40 illustrates a "Discuss" screen of the application of FIG. 1 or 2.

If in step 260 it is determined that the user has not clicked on the Hot Issues button 3216a, execution proceeds to step 264, in which a determination is made whether the user has clicked on the Discuss button 3216b. If so, execution proceeds to step 266, in which the user is able to view items tagged to be discussed with a selected party as described below In particular, referring again to FIG. 32, clicking on the Discuss button 3216b results in the display of a quick view of all currently outstanding items or issues that have been tagged Discuss With a selected user, as described above, by any client user or counsel user, sorted by project or matter. This feature is primarily designed for use by CEOs and other senior managers, business people, and general counsel to quickly view and respond to specific issues tagged for their immediate attention. An exemplary "Discuss" screen 4000 is illustrated in FIG. 40. Again, the user is able to filter the items to be displayed using a drop-down menu 4002. Additionally, the user is able to filter the items to be displayed using a drop-down menu 4002 to select a discussion party for whom items and issues are to be displayed. Once the filters have been selected from the menus 4002 and 4004, a "Submit" button 4006 is clicked to activate the filters. The Discuss screen 4000 is designed to allow the user to view issues and items that have been tagged for discussion with him or her by selecting another user's name from the drop-down menu 4004.

If in step 264 it is determined that the user has not clicked on the Discuss button 3216b, execution proceeds to step 268, in which a determination is made whether the user has clicked on the Responsibilities button 3216c. If so, execution proceeds to step 270, in which the user is able to view items for which a selected party has responsibility as described below.

Figure 41:
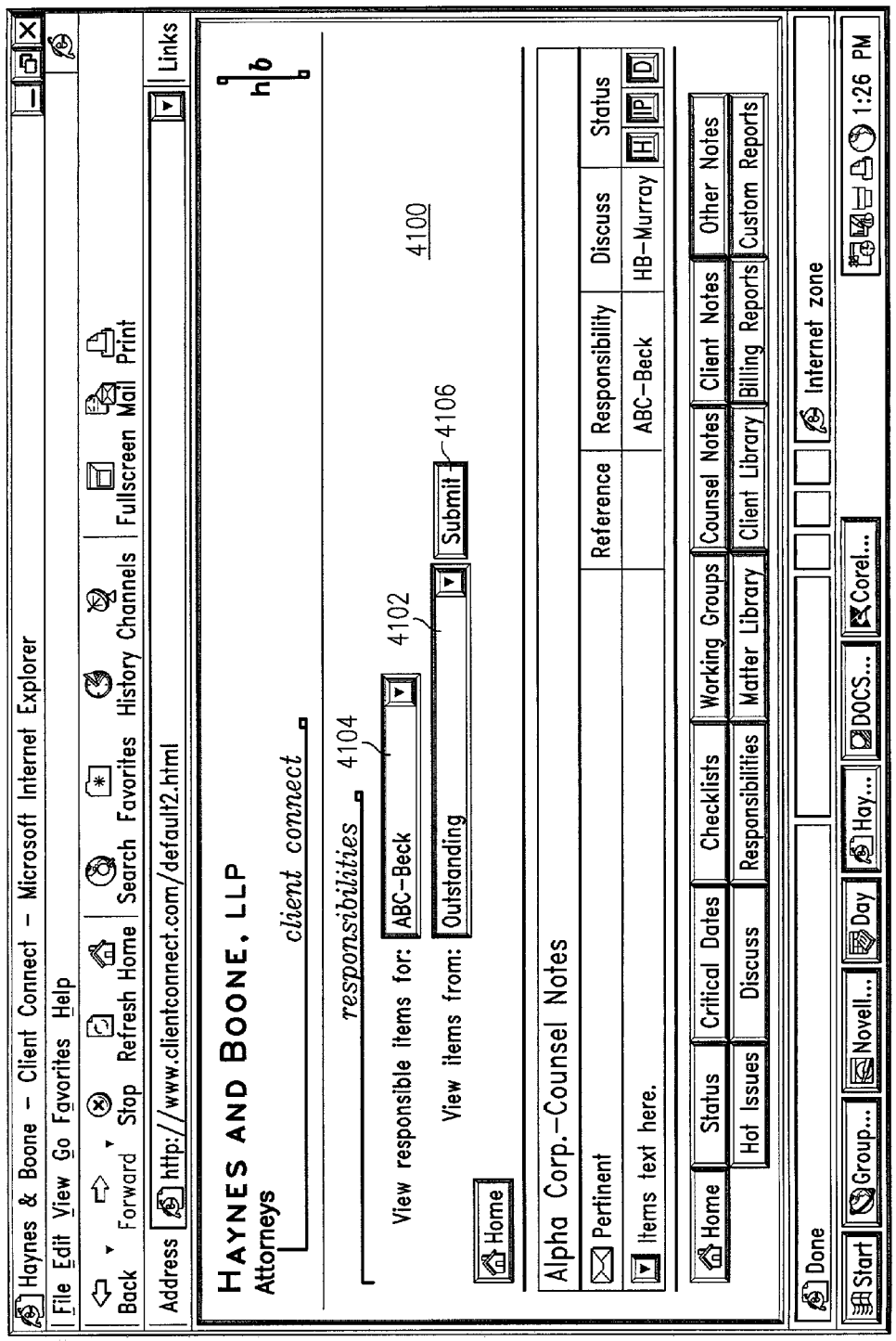
FIG. 41 illustrates a "Responsibilities" screen of the application of FIG. 1 or 2.

In particular, referring again to FIG. 32, clicking on the Responsibilities button 3216c results in the display of a quick view of all currently outstanding items or issues for which a selected user has responsibility. An exemplary "Responsibilities" screen 4100 is illustrated in FIG. 41. Again, the user is able to filter the items to be displayed using a drop-down menu 4102. Additionally, the user is able to filter the items/issues to be displayed using a drop-down menu 4104 to select a responsible party for whom items/issues are to be displayed. Once the filters are selected from the menus 4102, 4104, a "Submit" button 4106 is clicked on to activate the filters. In particular, the Responsibilities screen 4100 is designed to allow the user to view the items/issues that have been tagged as being his or her responsibility by default or by selecting another user's name from the drop-down menu 4104.

Clicking on one of the Reports buttons 3219a (FIG. 32), 3219b (FIG. 32), or 3340 (FIG. 33) results in the display of various reports, including billing reports, matter reports, and other user-definable reports.

If in step 268 it is determined that the user has not clicked on the Responsibilities button 3216c, execution proceeds to step 272, in which a determination is made whether the user has clicked on the Matter Library button 3218a. If so, execution proceeds to step 274, in which the user is able to view, add, and/or edit documents and document profiles, as described below.

Figure 42:
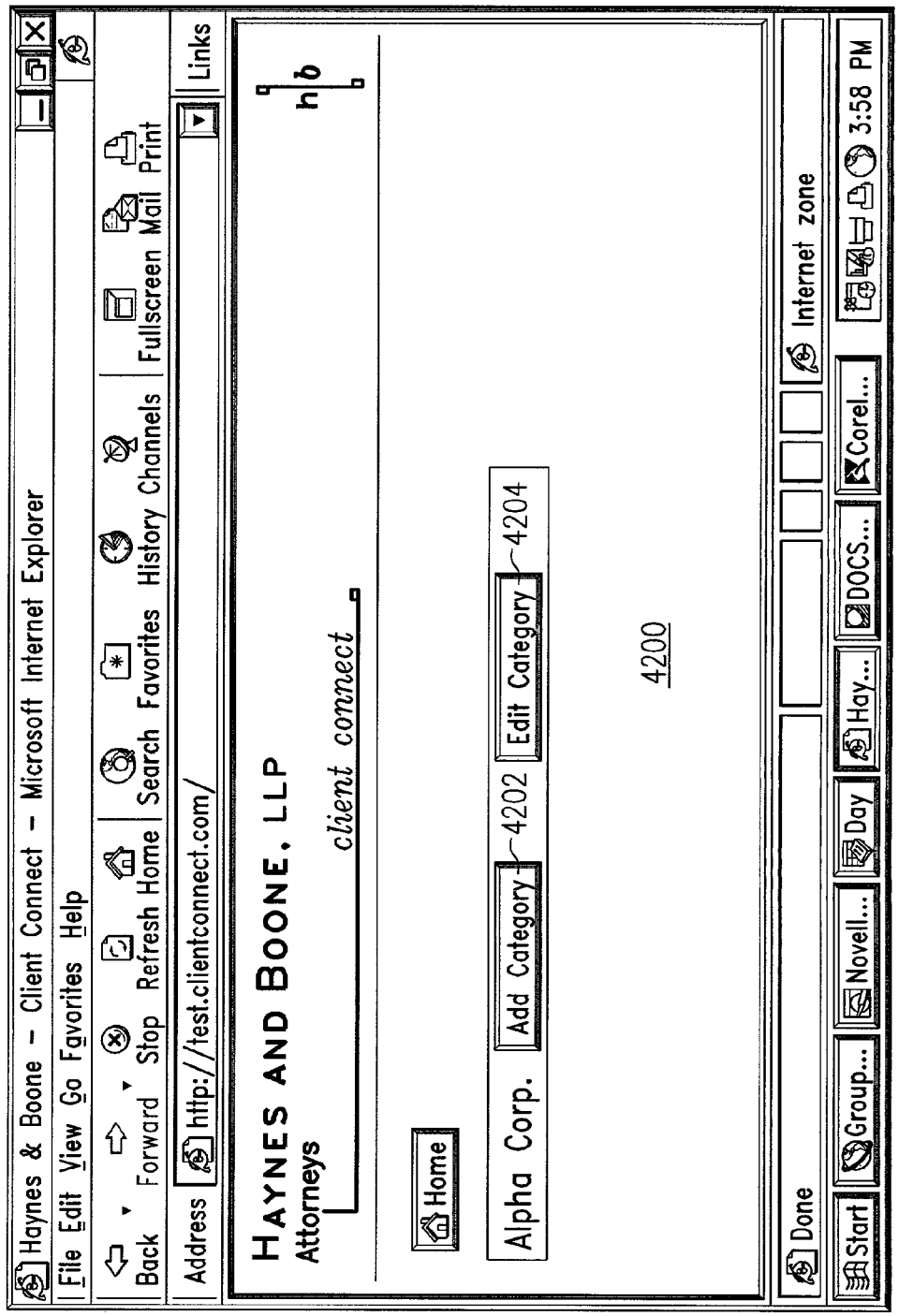
FIG. 42 illustrates a "Matter Library" screen of the application of FIG. 1 or 2.
Figure 42A:
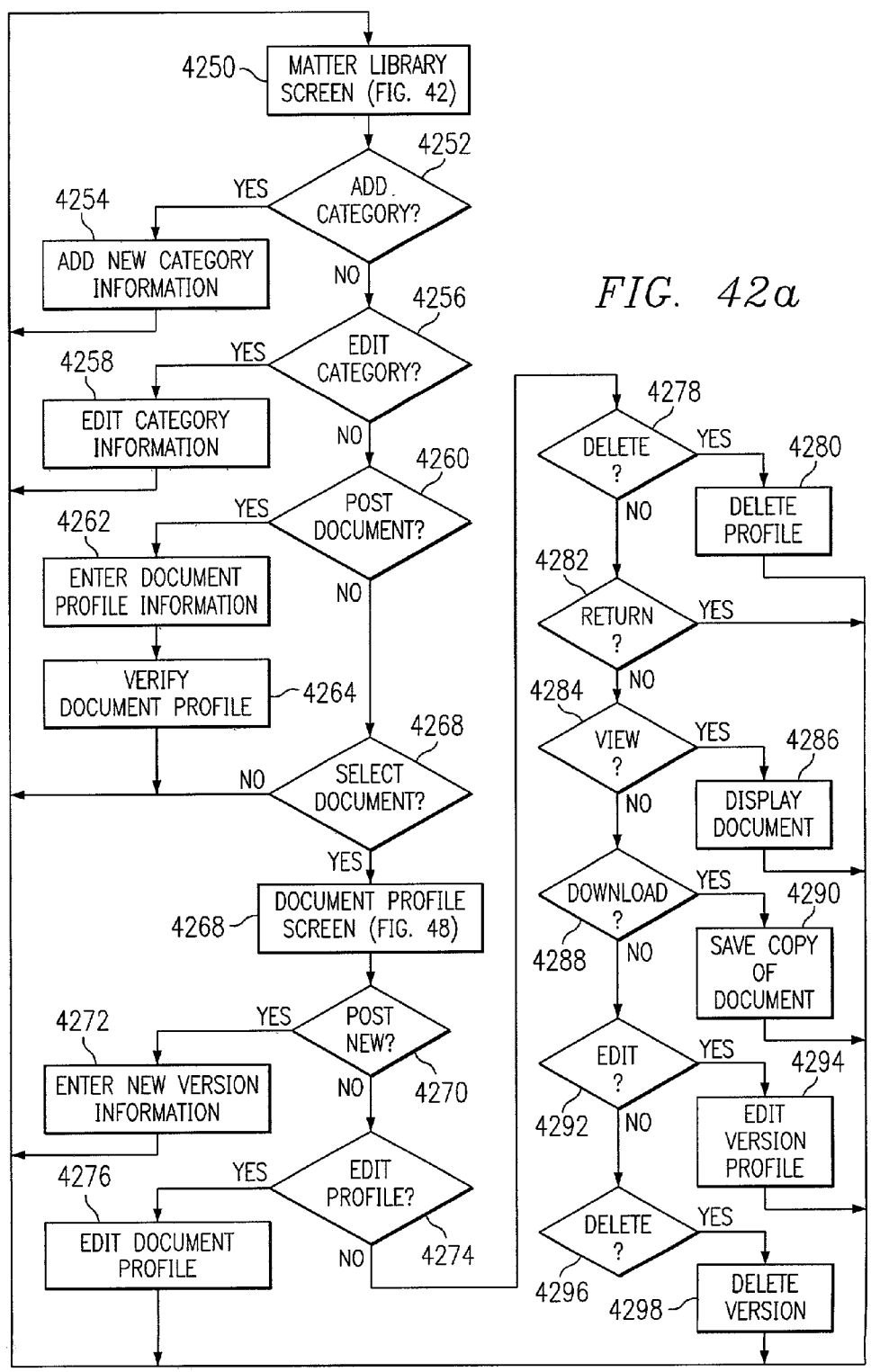

In particular, referring again to FIG. 32, clicking on the Matter Library button 3218a results in the display of a "Matter Library" screen 4200, as illustrated in FIG. 42. The Matter Library function is designed to deal with documents pertaining to a specific matter. FIG. 42a illustrates a flowchart of the operation of the Matter Library function. In step 4250, the Matter Library screen 4200 is displayed, as previously indicated. As shown in FIG. 42, the Matter Library screen 4200 indicates the matter, in this case "Alpha Corp." and enables a user to add or edit categories to the matter by clicking on an "Add Category" and "Edit Category" buttons 4202, 4204, respectively. Categories are added in the same manner as described above with reference to FIGS. 33-35 and 38. Categories enable a user to group and organize different types of documents together; exemplary categories include "Documents," "Drafts," "Correspondence," etc.

Figure 43:
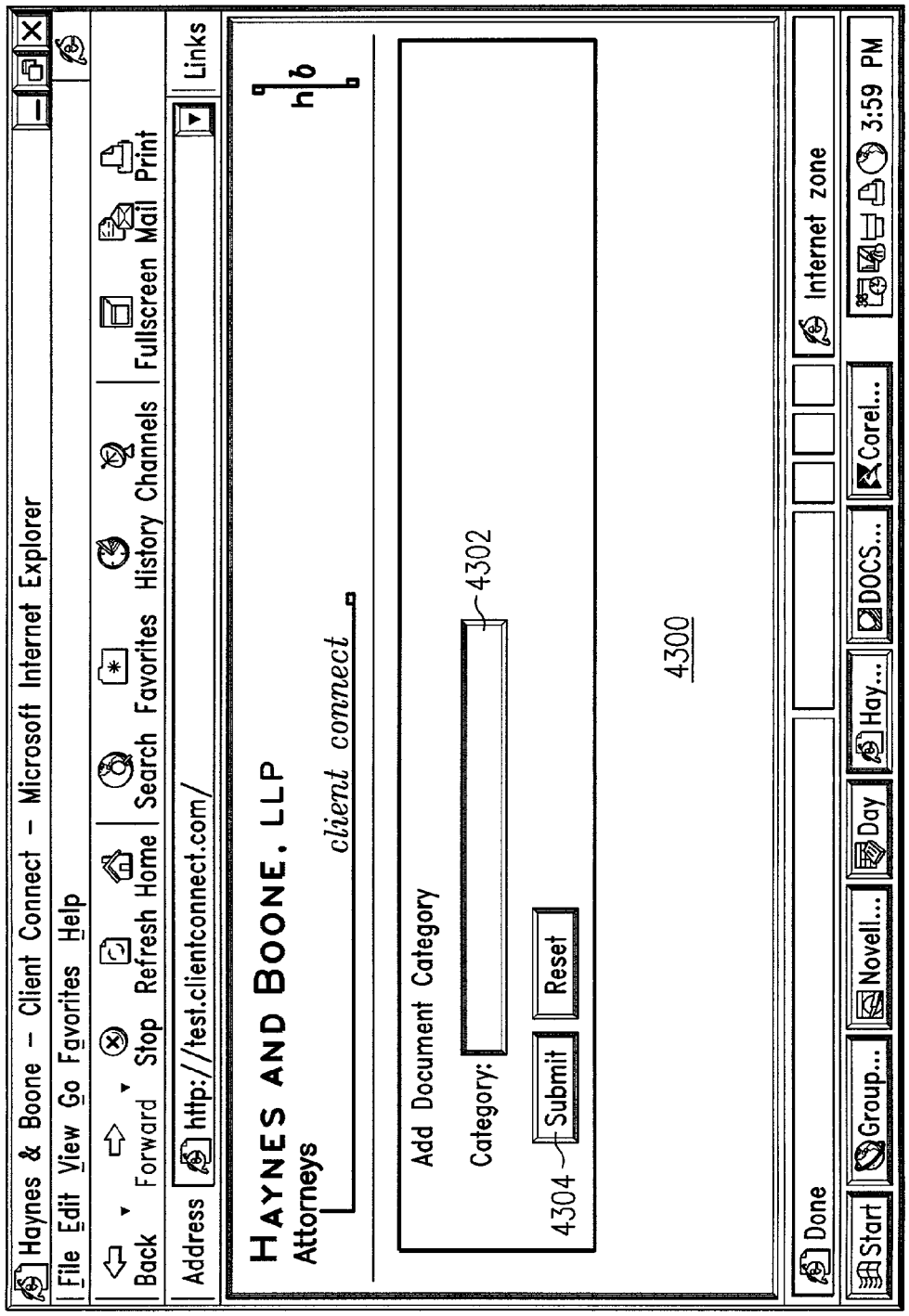
FIG. 43 illustrates a "Add Category" screen of the application of FIG. 1 or 2.

In step 4252, a determination is made whether the user has clicked on the Add Category button 4202. If so, execution proceeds to step 4254, in which an "Add Category" screen 4300, as illustrated in FIG. 43, is displayed. Categories can be named anything that is logical to the user for the specific matter. Categories are added by entering the category name in a "Category" field 4302 and then clicking on or otherwise selecting a "Submit" button 4304.

Figure 44:
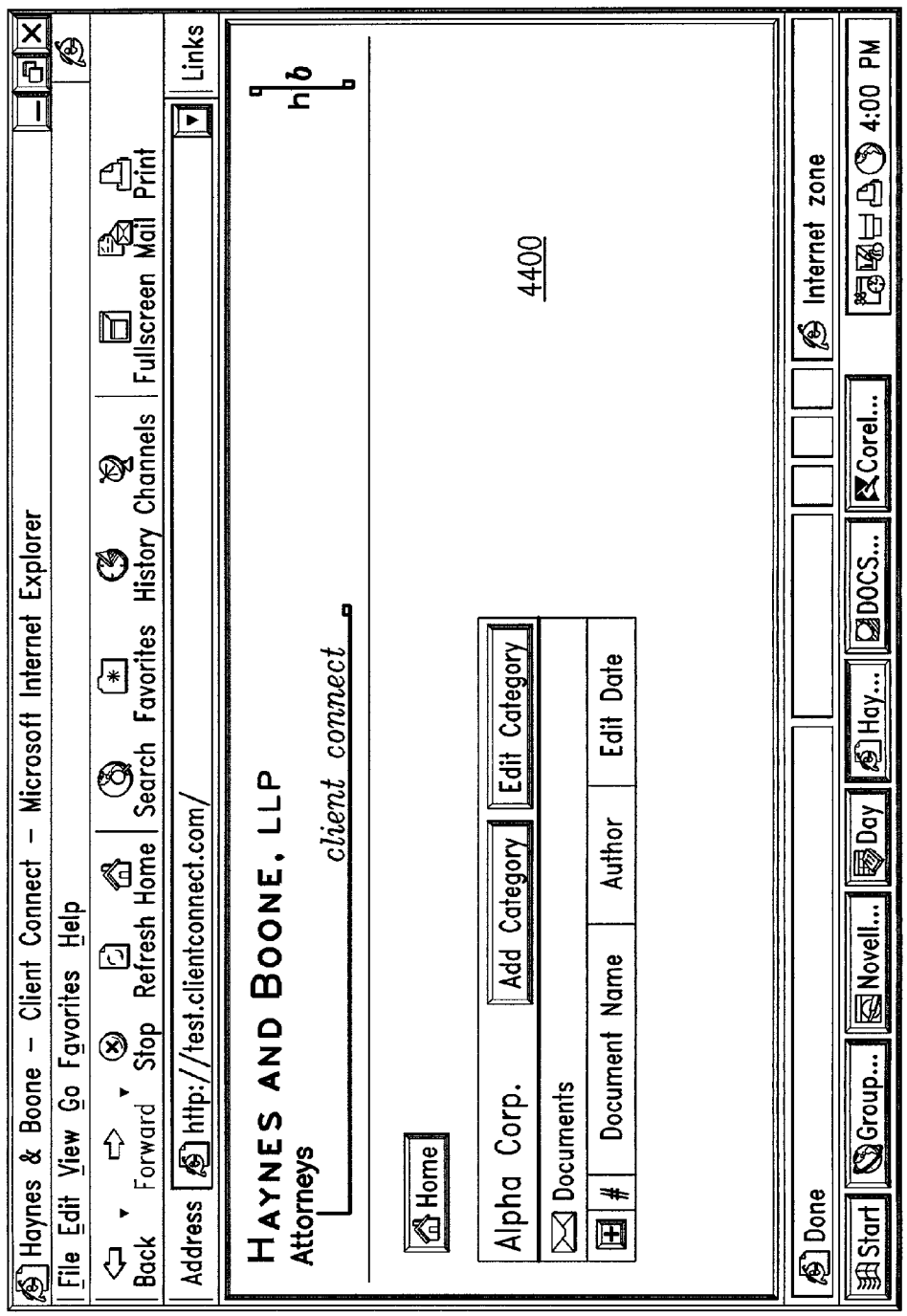
FIG. 44 illustrates the Matter Library screen of FIG. 42 after a category has been added.

FIG. 44 illustrates the Matter Library screen 4200 after a category "Documents" has been added. If in step 4252 it is determined that the user has not clicked on the Add Category button, execution proceeds to step 4256, in which a determination is made whether the user has clicked on the Edit Category button 4204 (FIG. 42). If so, execution proceeds to step 4258, in which a screen similar to the Add Category screen 4300 is displayed and the user is promoted to edit the information for the category.

Figure 45A:
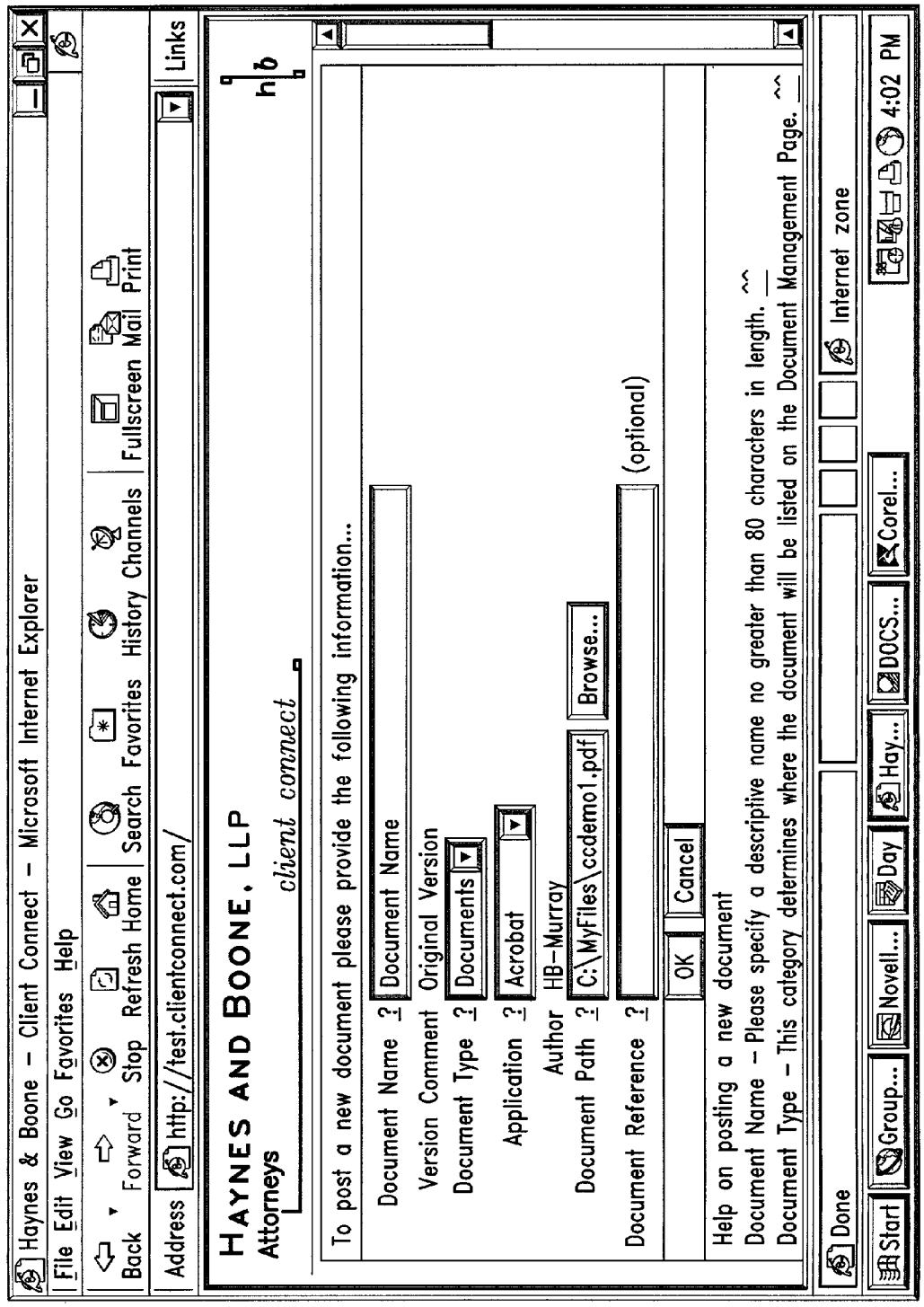
FIG. 45a illustrates the Document Profile screen of FIG. 45 after it has been completed.

If in step 4256 it is determined that the user has not clicked on the Edit Category button, execution proceeds to step 4260, in which a determination is made whether the user has clicked on a "+" icon 4400 to post a document to the associated category. If so, a "Document Profile" screen 4500, as illustrated in FIG. 45, is displayed in step 4262. Using the Document Profile screen 4500, the user specifies the name of the document in a "Document Name" field 4502, selects a document type (i.e., category) using a drop-down menu 4504, selects the application in which the document is being posted (e.g., Acrobat, Excel, PowerPoint, etc.) using a drop-down menu 4506, specifies a document path in a "Document Path" field 4508, and enters an optional document reference in a "Document Reference" field 4510. If no information is entered in the Document Reference field 4510, the information from the Document Path field 4508 will be entered in the Document Reference field 4510. Once all of the document profile information has been provided, clicking on an "OK" button 4512 submits the information. FIG. 45a illustrates a completed profile.

Figure 46:
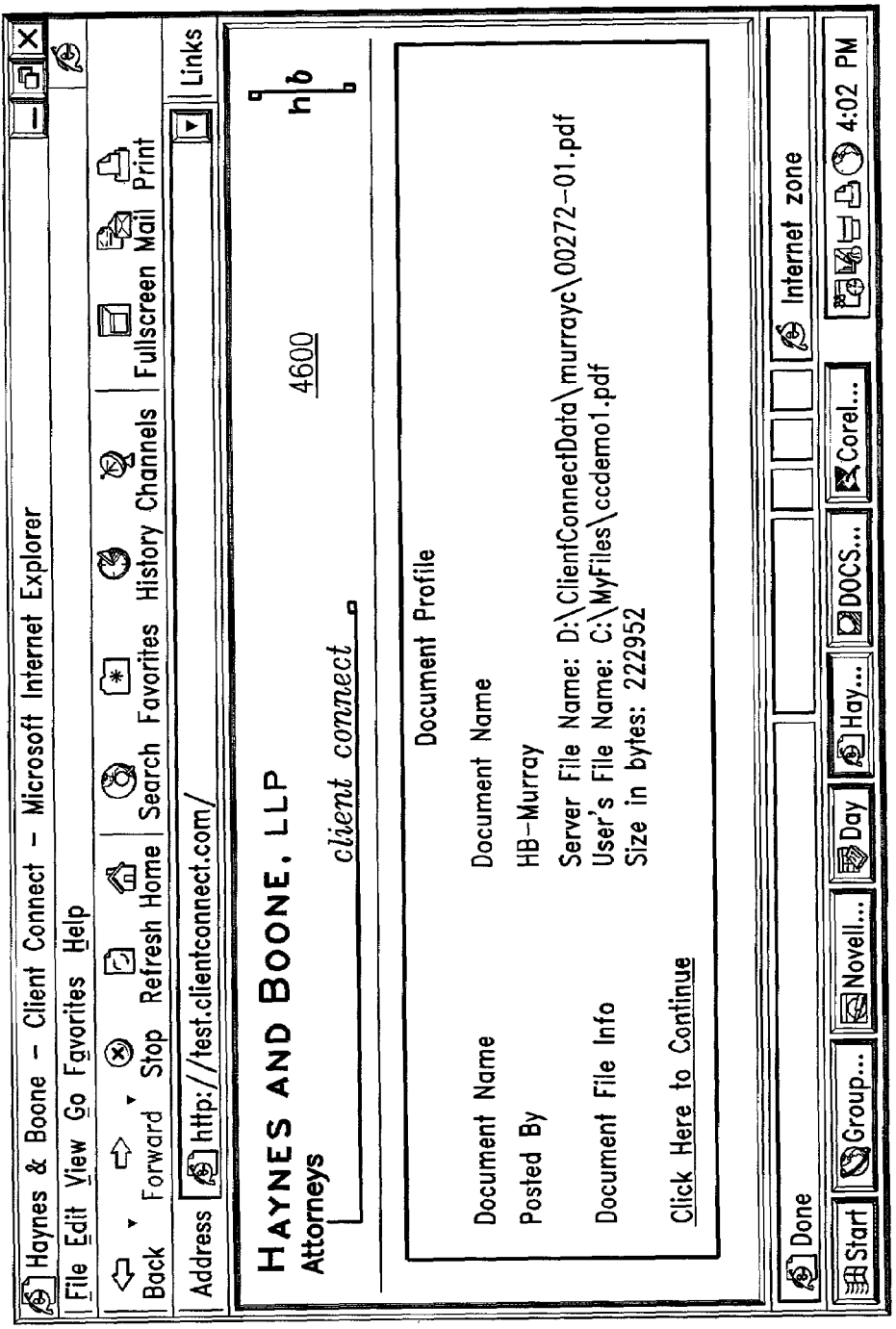
FIG. 46 illustrates a "Document Profile Verification" screen of the application of FIG. 1 or 2.
Figure 47:
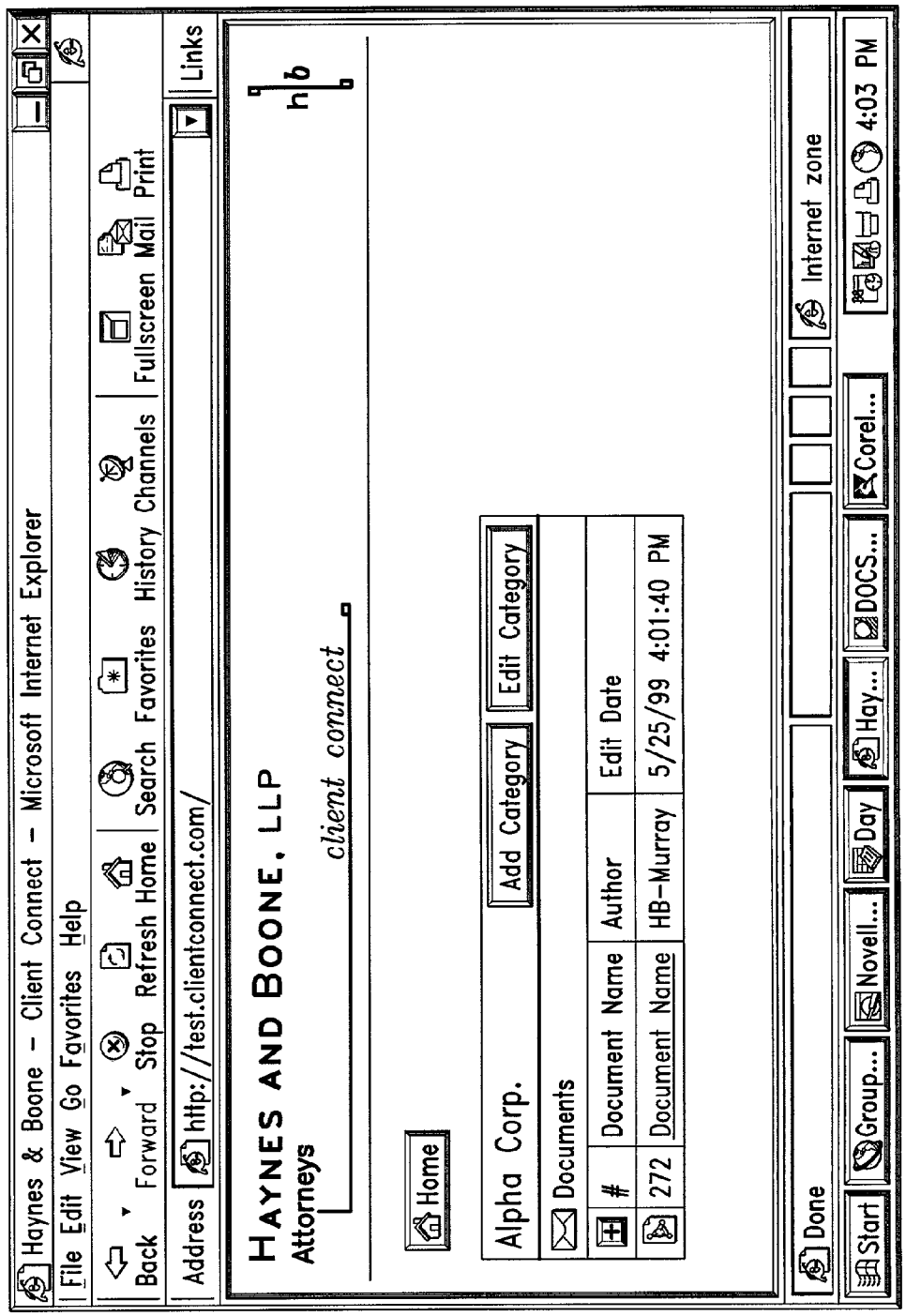
FIG. 47 illustrates the Matter Library screen after a document has been posted to a category thereof.

After a document has been successfully posted, as described with reference to FIG. 45, in step 4264 (FIG. 42), a "Document Profile Verification" screen 4600, as illustrated in FIG. 46, will be displayed. This screen 4600 enables the user to verify the document profile information entered using the screen 4500 (FIG. 45). Clicking on a "Click Here to Continue" link 4602 results in an E-mail to all users notifying them of the posting of a document and the matter to which it was posted. As shown in FIG. 47, the Matter Library screen now includes the posted document. In particular, the name of the document entered using the screen 4500 is displayed under a "Document Name" heading, the author is displayed under an "Author" heading, and the date the document was last posted displayed under an "Edit Date" heading. In addition, an icon 4700 indicates the application to which the document was posted (e.g., Acrobat, PowerPoint, Excel, etc.), and a number displayed under a "#" heading indicates the document number. Documents are numbered sequentially and stored by author. In this case, the document "Document Name" is document number 272.

If in step 4260 it is determined that the user has not clicked on the +icon 4400 to post a document, execution proceeds to step 4266, in which a determination is made whether the user has clicked on a document name. If so, in step 4268, a "Document Profile" screen 4800 (FIG. 48) for the document is displayed. Clicking on a "Post New Version" link 4802 (FIG. 42a, step 4270) enables any user that has rights to post a new version of a document under that matter (FIG. 42a, step 4272). Clicking on an "Edit Profile" link 4804 (FIG. 42a, step 4274) enables the author of the document to edit the document profile information for the document (FIG. 42a, step 4276). Clicking on a "Delete" link 4806 (FIG. 42a, step 4278) enables the author of the document to delete the document as posted, as well as the profile for the document (FIG. 42a, step 4280). Finally, clicking on a "Return" link 4808 (FIG. 42a, step 4282) returns the user to the Matter Library screen 4200 (FIG. 42a, step 4250).

Figure 48:
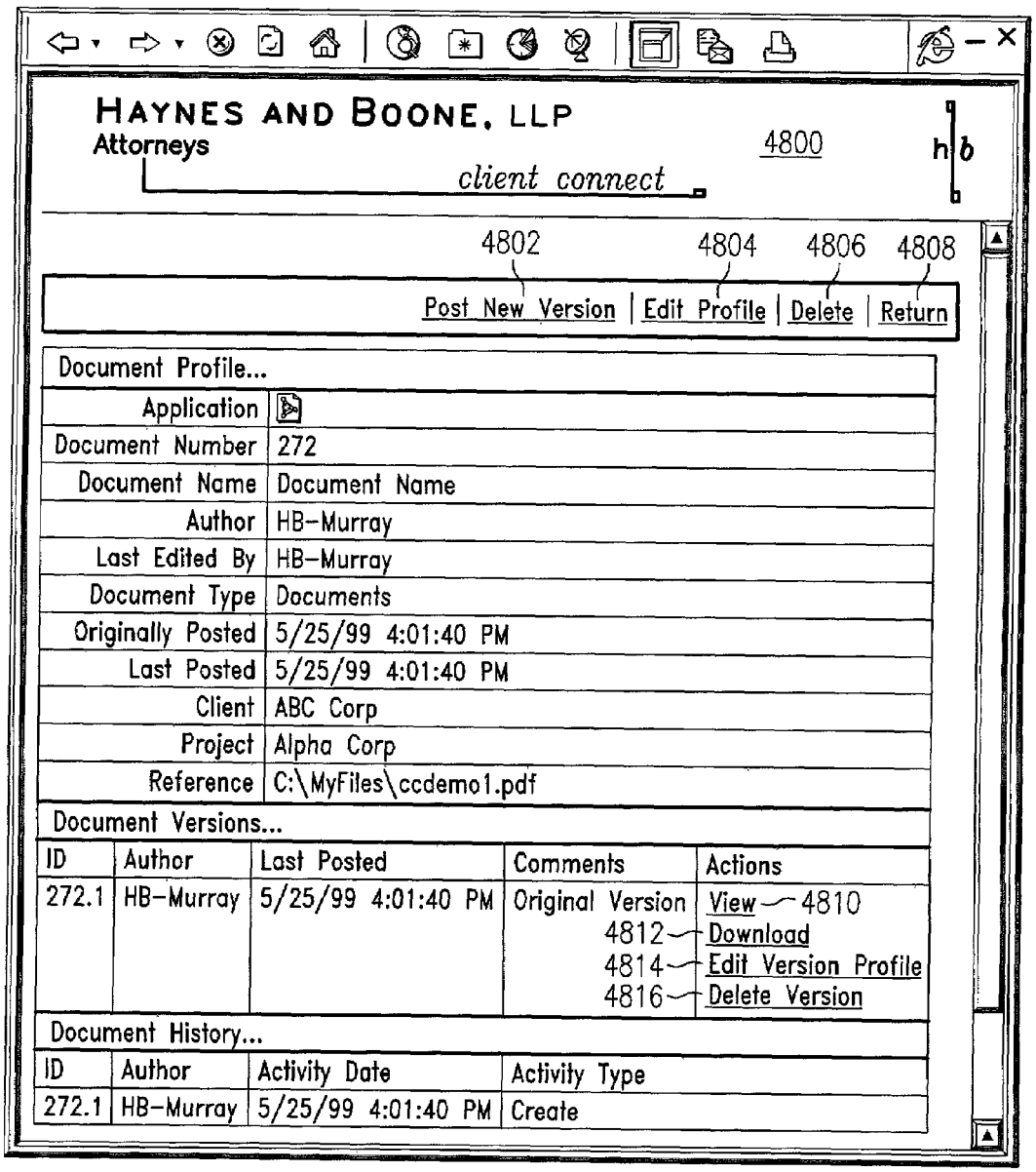
FIG. 48 illustrates a "Document Profile" screen of the application of FIG. 1 or 2.
Figure 49:
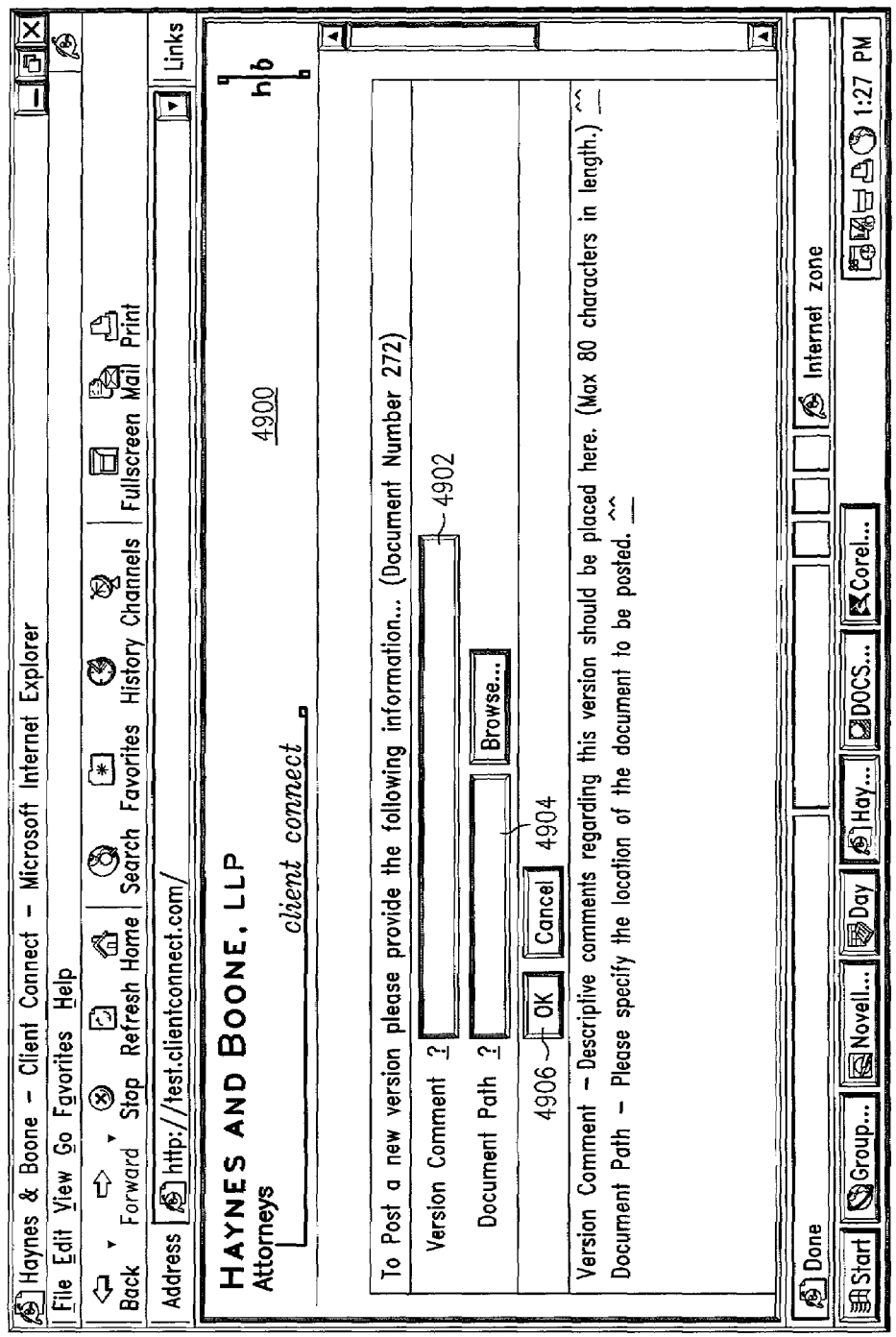
FIG. 49 illustrates a "Post New Version" screen of the application of FIG. 1 or 2.
Figure 50:
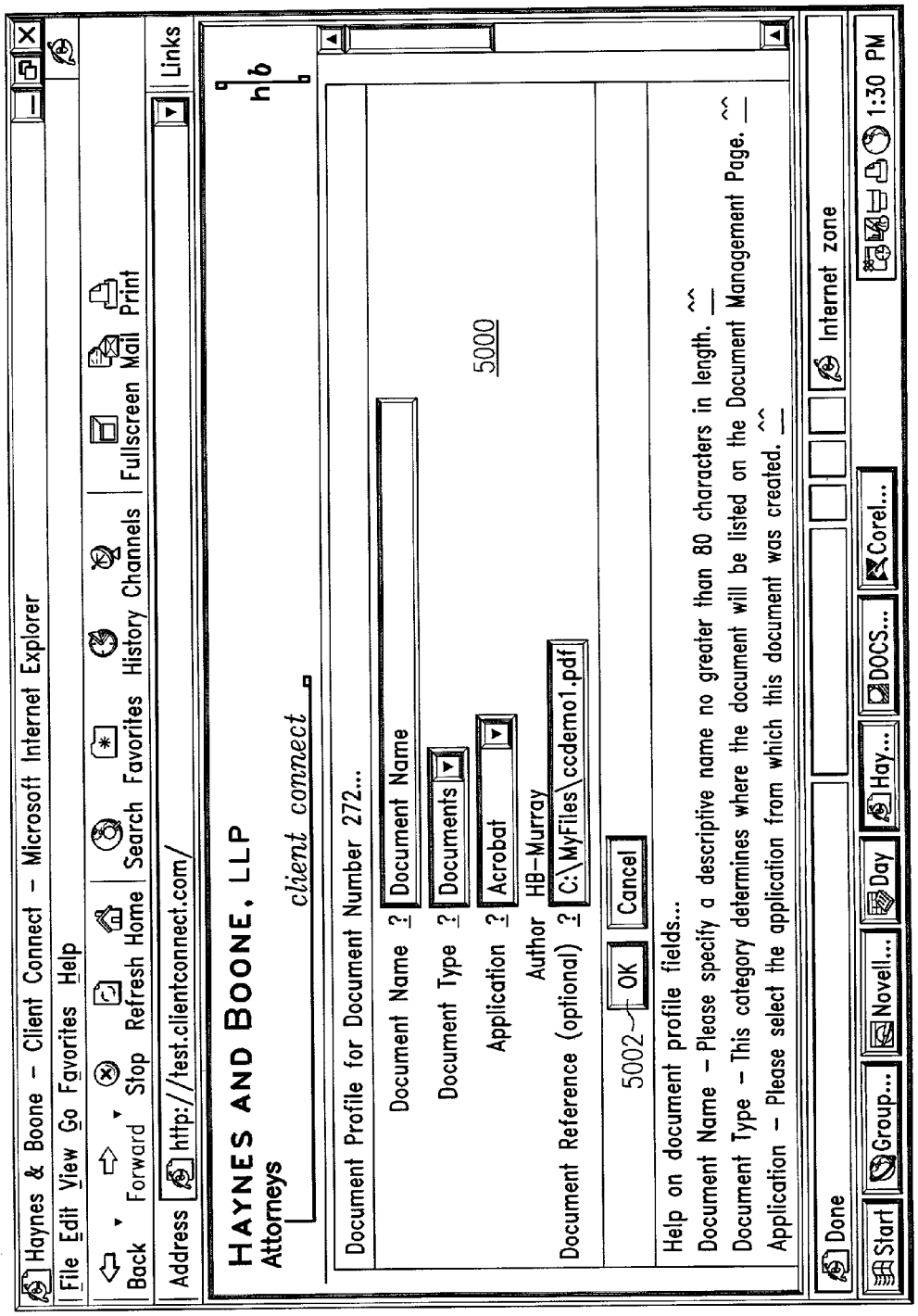
FIG. 50 illustrates a "Edit Profile" screen of the application of FIG. 1 or 2.
Figure 51:
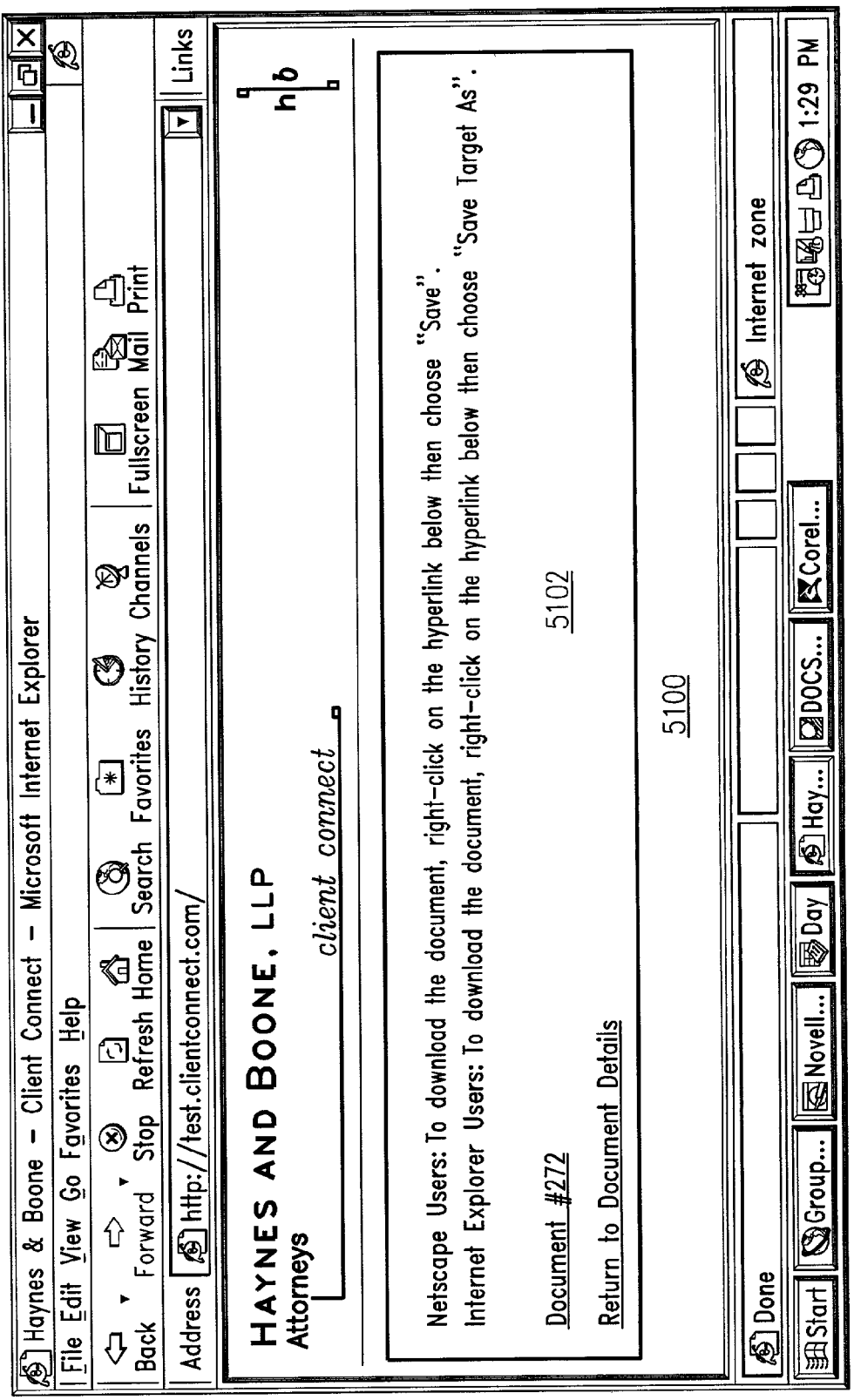
FIG. 51 illustrates a "Download" screen of the application of FIG. 1 or 2.
Figure 52:
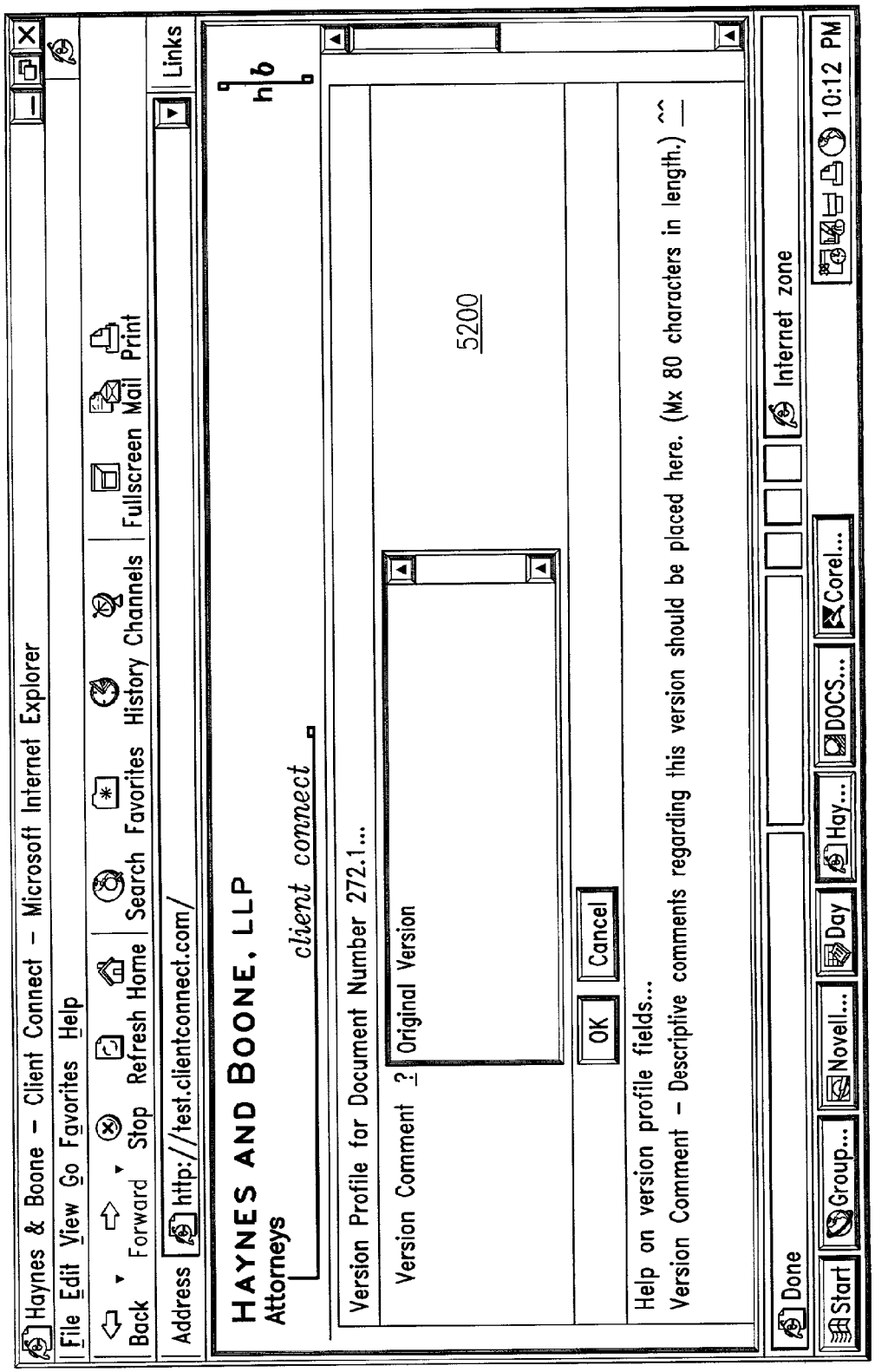
FIG. 52 illustrates a "Edit Version Profile" screen of the application of FIG. 1 or 2.

As shown in FIG. 48, a "Document Profile" portion of the screen 4800 displays information for the document as entered by the author at the time of posting. The Document Profile information can be edited by clicking on the Edit Profile link 4804. A "Document Versions" portion of the screen 4800 displays a row of information for each document version posted. Clicking on a "View" link 4810 (FIG. 42a, step 4284) opens the appropriate application and document (FIG. 42a, step 4286). All users with rights within a matter can view a document posted under that matter. Clicking on a "Download" link 4812 (FIG. 42a, step 4288) results in the user being prompted to indicate a location to which a copy of the document should be saved (FIG. 42a, step 4290), such as the user's hard drive or a network drive. Once the document is saved, it can be opened in the appropriate application and the user can then make changes or add annotations as necessary. All users with rights within a matter can download a document posted under that matter. Clicking on an "Edit Version Profile" link 4814 (FIG. 42a, step 4292) allows the user to change version comments (FIG. 42a, step 4294). Only the author of the specific venison of the document can edit the profile thereof. Finally, clicking on a "Delete Version" link 4816 (FIG. 42a, step 4296) allows the author of the specific version to delete that version (FIG. 42a, step 4298).

A "Document History" portion of the screen 4800 reflects each and every action that has been take with respect to the subject document, such as views, download, postings of new versions, and editing of profiles.

Clicking on a "Post New Version" link 4802 results in the display of a "Post New Version" screen 4900 (FIG. 49) for the document with which the user is able to post a new version of the document. To post a new version of the document, the user enters a version comment in a "Version Comment" field 4902 and a document path in a "Document Path" field 4904 and then clicks on or otherwise selects an "OK" button 4906 to submit the information and return to the screen 4800 (FIG. 48).

Clicking on the Edit Profile link 4804 (FIG. 48) results in the display of an "Edit Profile" screen 5000 (FIG. 50), with which the user can edit the various items of information contained in the profile for the document, is displayed. Once the user is finished editing the profile information, clicking on an "OK" button 5002 submits the information and returns the user to the screen 4800 (FIG. 48)

Clicking on the Download link 4812 results in the display of a "Download" screen 5100 (FIG. 51), from which the user is able to download the current version of the document as instructed in a window 5102.

Referring again to FIG. 48, clicking on the Edit Version Profile screen 4814 results in the display of an "Edit Version Profile" screen 5200 (FIG. 52), with which the user can edit the profile of the current version of the document. Clicking on an "OK" button 5202 submits the information and returns the user to the screen 4800 (FIG. 48).

Figure 53:
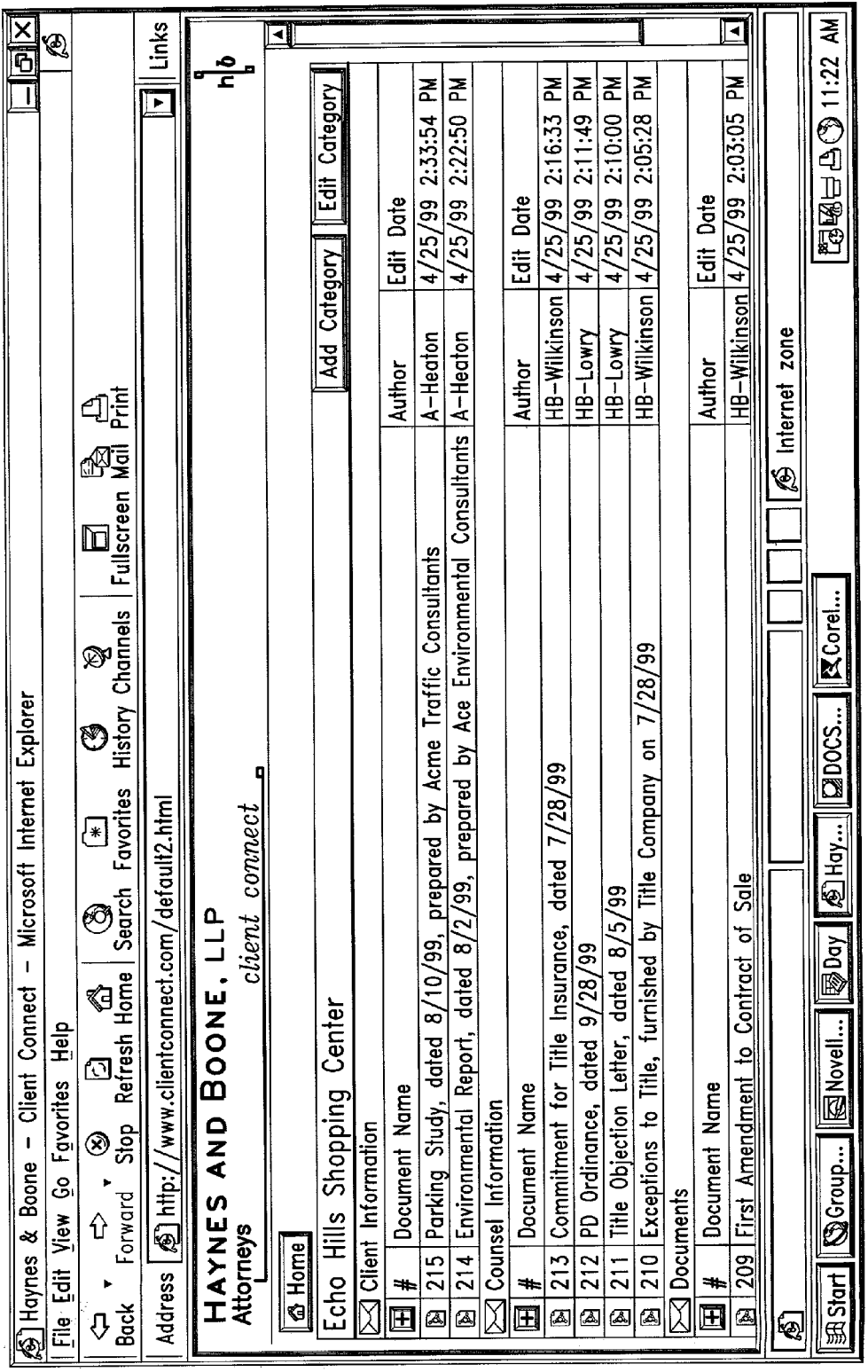
FIG. 53 illustrates the Matter Library screen of FIG. 42 after multiple documents have been posted to multiple categories thereof.

FIG. 53 illustrates a Matter Library screen to which multiple documents have been posted in multiple categories.

FIG. 54 illustrates a Document Profile screen when the user that is logged on is not the author of the subject document. As can be seen from FIG. 54, a user only has the following options with respect to documents with respect to which he or she is not the author: Post New Version, View, and Download.

As described above, the document management features of the application 12 are designed such that relevant drafts, documents, or other information generated by counsel or client users is easily posted within the application for convenient access when needed by client users or counsel users. A flexible annotating tool enables highlighting of key information to draw the attention of users to specific issues and questions demanding their attention. As a result, the document management features encourage interactive collaboration among client and counsel users. In particular, client or counsel users can use the document management features to post drafts, documents, and/or other information generated by clients or counsel users, which are accessible to any authorized user from an computer having an Internet connection. In addition, the application 12 includes extensive annotating features, including text highlighting and text and voice annotations designed to direct the attention of a client user to the specific relevant portion(s) of a draft or document that requires their attention.

The following are some examples of how specific types of users might advantageously use the application 12:

Senior Managers and General Counsel
1. View "Hot Issues" identified by client users and counsel users, sorted by project.
2. View issues tagged "Discuss With" by client users and counsel users to be discussed with specific senior manager/general counsel and respond by E-mail directly from the application 12.
3. View relevant portions of drafts of key documents annotated with voice and text comments and return voice or text comments.

Business People
1. Enter "Client Notes" identifying important business points for other client users and counsel users to be aware of.
2. View "Status," "Client Notes," "Client Issues," and/or "Critical Dates," as identified by client users and counsel users, sorted by project.
3. View issues tagged "Hot Issues" or "Discuss With" the particular deal person.
4. Respond to items or issues noted in any view by E-mail directly from the application 12.
5. View relevant portions of drafts of key documents annotated with voice and text comments and return voice or text comments.

Support Staff
1. Enter updates in client-specific checklists for all projects.
2. View "Status," "Client Notes," "Client Issues," and/or "Critical Dates" as identified by client users and counsel users, sorted by project.
3. Respond to items or issues noted in any view by E-mail directly from the application 12.
4. View relevant portions of drafts of key documents annotated with voice and text comments and return voice or text comments.

Password-Authorized Personnel
1. View "Status," "Client Notes," "Client Issues," and/or "Critical Dates" as identified by client users and counsel users, sorted by project.
2. Tag issue or note in any view "Hot Issue".
3. Tag issue or note in any view "Discuss With" and identify specific client user or counsel user with whom issue or note is to be discussed.
4. Respond to items or issues noted in any view by E-mail directly from application.

At this point, several unique features of the application of the present invention will be reiterated. First, a unique, convenient E-mail feature enables users to respond quickly to any note or issue without leaving the application 12. The E-mail feature automatically generates the context, or subject, of the response, embedding the project or matter name and category of note or issue to instantly inform the recipient of the context of the response.

In addition, information categories and some column headings in each view for each project or matter are customizable to permit the application 12 to be adapted to any particular client's needs. Moreover, special, easy-to-use filters, such as "New/Edited Issues-Last Week" or "New/Edited Issues-Last Two Weeks," are available for each view to permit client user to view only certain information, such as information added or edited during the specified time period. Another filter, "Since Last Viewed," allows the user to view only those items that have been added since the user last viewed information in connection with the matter. Convenient "tags" may be used to more precisely communicate status or urgency of any note, issue, or action item. Examples of such tags include "In Progress" or "Done" to indicate status; "Hot Issue" to indicate importance and/or urgency; "Discussion Party" to indicate who specifically issue or note needs to be discussed with; and "Responsible Party" to indicate who specifically is responsible for the particular issue or action required. Finally, a special tool, in the form of a colored icon 3337, is used to alert users to "drill down" for more detailed information.

Figure 3A:
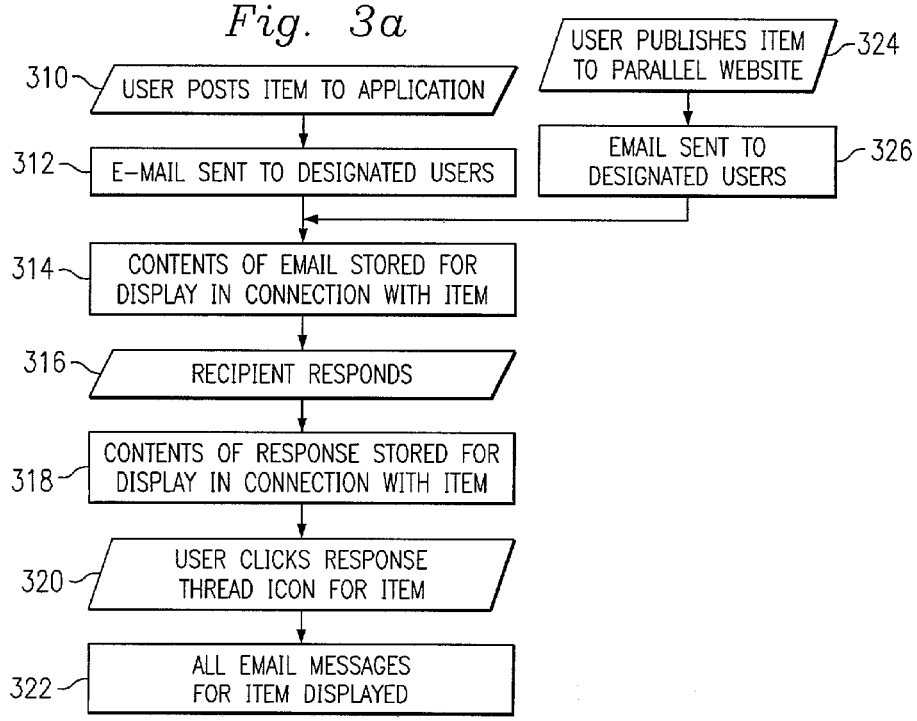
FIG. 3a illustrates a flowchart of an overview of the operation of an alternative embodiment of the present invention.

An alternative embodiment is illustrated in FIG. 3*a* and the remaining figures and described hereinbelow. FIG. 3*a* is a flowchart of an overview of the operation of the alternative embodiment illustrating some of the novel features thereof; the remaining figures illustrate the operation of the alternative embodiment in greater detail. In the flowchart of FIG. 3*a*, parallelograms are used to represent actions taken by a user, while rectangles are used to represent actions taken by the application. In step 310, a user posts an item to the application. In step 312, an E-mail is sent to designated users notifying those users that the item has been posted. In step 314, the contents of the E-mail are stored for subsequent display in connection with the posted item. In step 316, one of the recipients of the E-mail sent in step 312 may respond thereto. In step 318, the E-mail response is also stored for subsequent display in connection with the posted item. In step 322, responsive to a user's clicking on a designated icon, defined hereinbelow as a "response thread icon," (step 320), all E-mail messages sent in connection with the posted item, such as those referred to in steps 312 and 316, are displayed with the item.

In step 326, responsive to a user's publishing an item, typically a document (step 324), the item is posted to a separate website referred to herein as ccDocs. In step 328, an E-mail notification containing a hyperlink to the published document is sent to designated users. Execution then proceeds to step 314. Additional and supplemental features of the alternative embodiment, as well as details of the features described with reference to FIG. 3*a*, will be described below.

Figure 55:
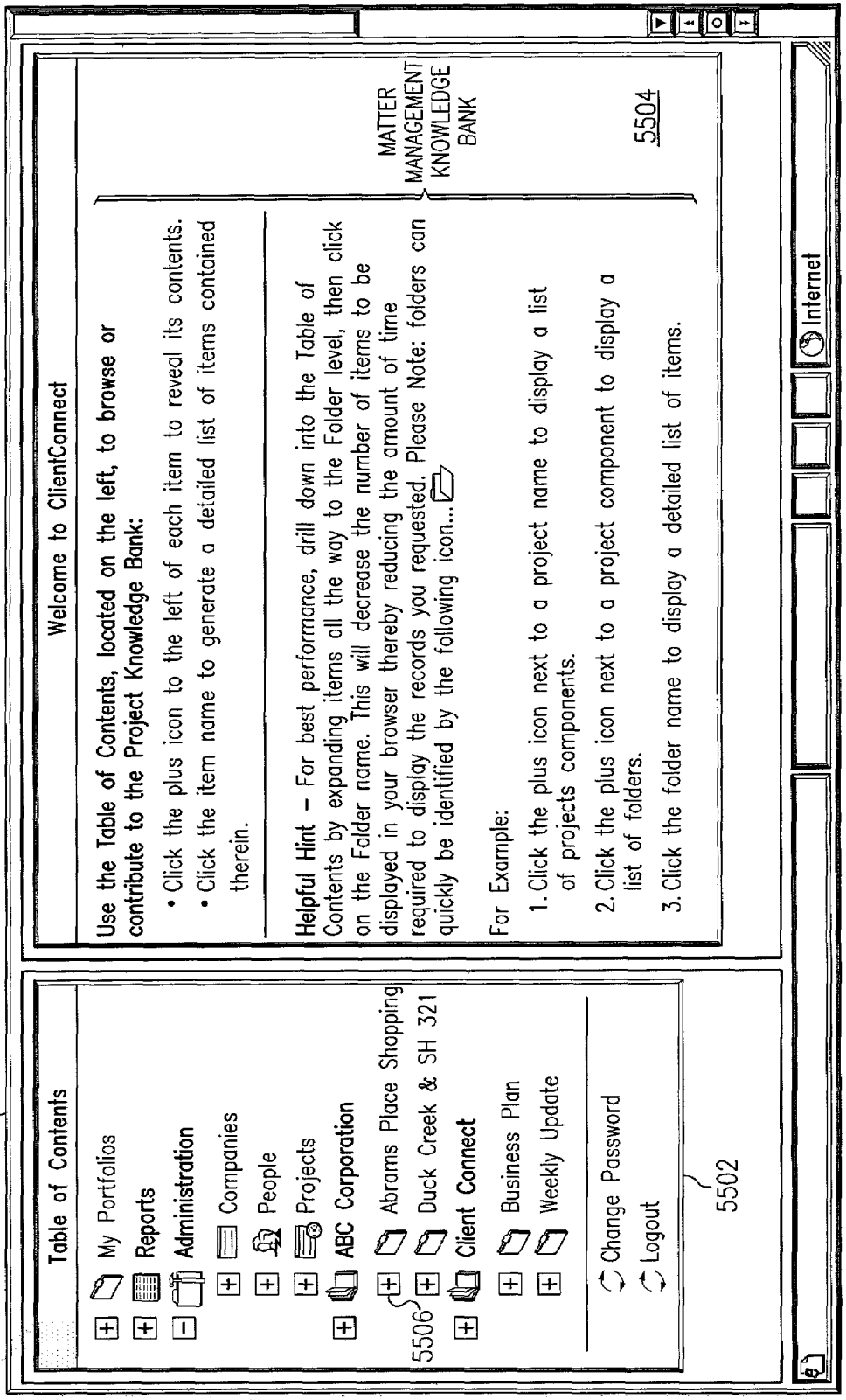
FIGS. 55 and 55A illustrate a Main screen of an alternative embodiment of the application of FIGS. 1 and 1A.
Figure 55A:
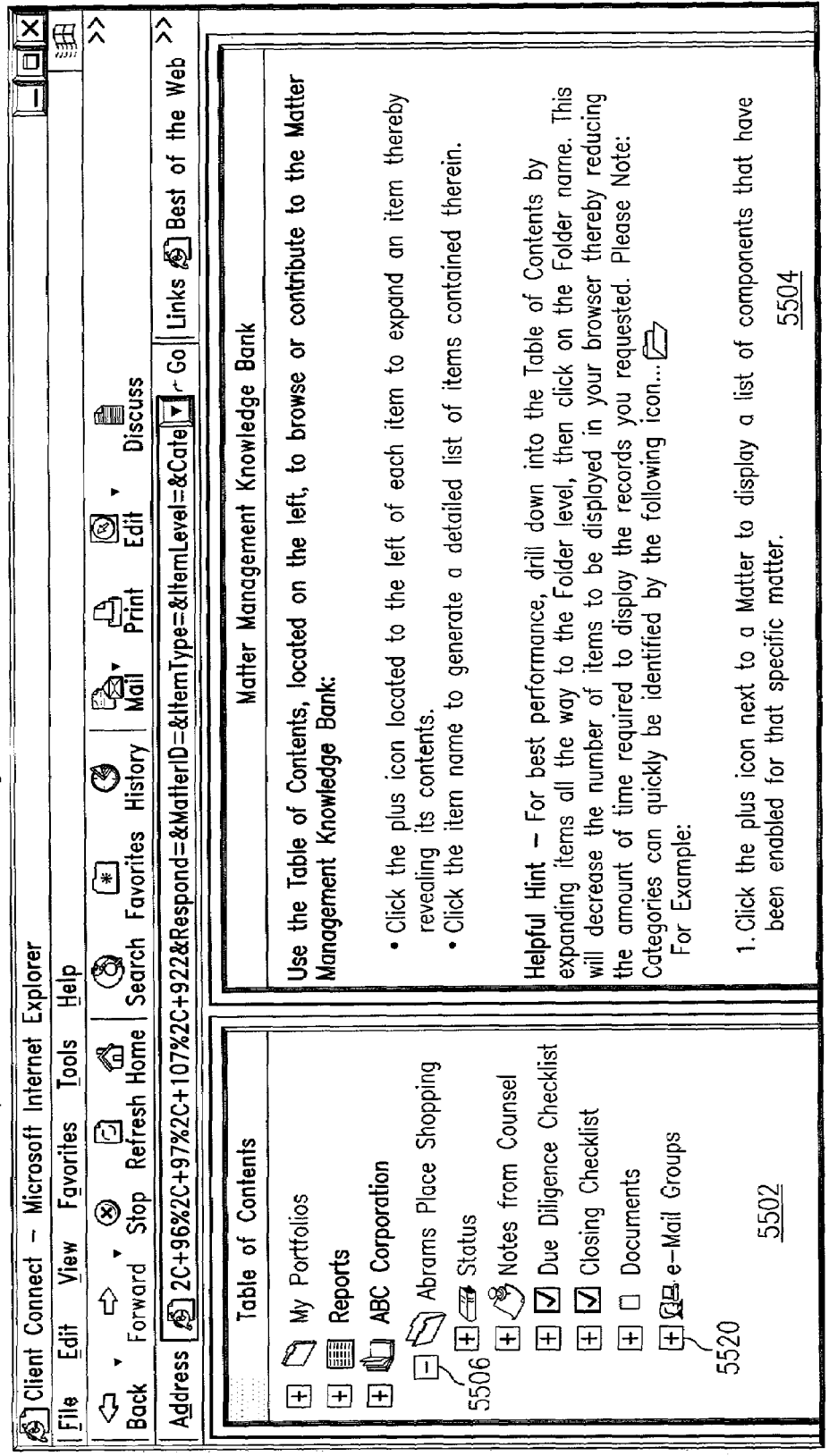

Referring now to FIG. 55, once the user logs into the web site comprising the application 12, a screen 5500 is displayed. As shown in FIG. 55, the screen 5500 includes on one side a Table of Contents 5502 and on the other side, a Matter Management Knowledge Bank ("MMKB") 5504. The MMKB 5504 provides instructions for navigating the application 12 using the Table of Contents 5502. For example, clicking on an expand button for a particular company (e.g., "ABC Corporation") results in the display of all projects (e.g., "Abrams Place Shopping" and "Duck Creek & SH 321") for that company. Similarly, as illustrated in FIG. 55A, clicking on an expand button 5506 for a particular project (e.g., "Abrams Place Shopping") results in the display of all components (e.g., "Status," "Notes from Counsel," "Due Diligence Checklist," "Closing Checklist," "Documents," "E-mail Groups," etc.) for the project.

Similar to the embodiment illustrated and described above, the alternative embodiment includes an easy-to-use, innovative document management tool that allows for the electronic storage of documents and paperwork on a project-by-project basis. Documents created and saved using various types of applications may be posted to a document library of the application 12. Examples of the types of applications include Corel WordPerfect, Microsoft Word, Excel, and PowerPoint, and Adobe Acrobat. As will be described hereinbelow, documents for a specific project are stored within folders and may be posted, viewed, printed, deleted, and published.

Figure 56:
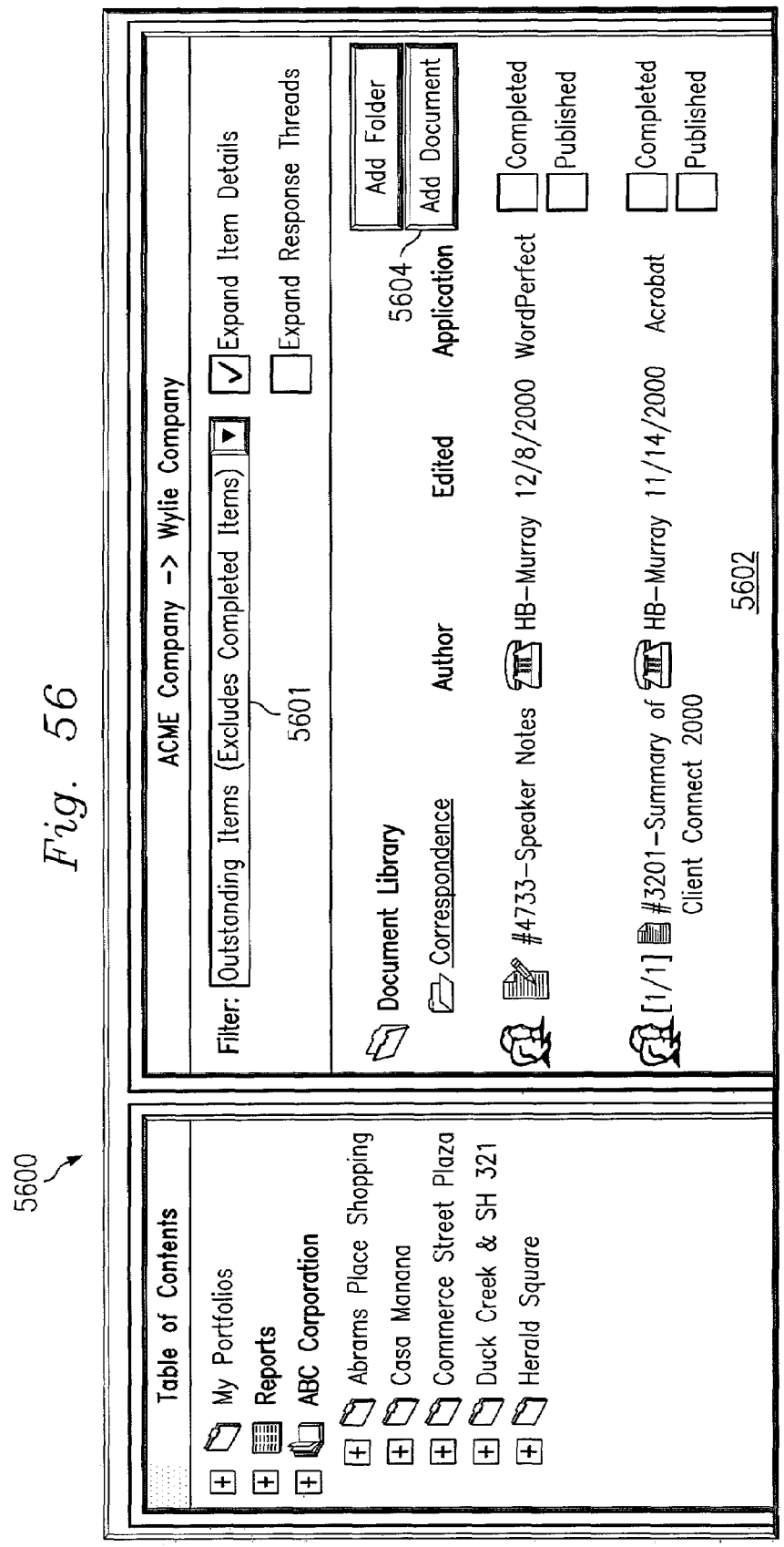
FIGS. 56-63 illustrate various screens of the alternative embodiment of the application of FIGS. 1 and 1A for managing documents.
Figure 57:
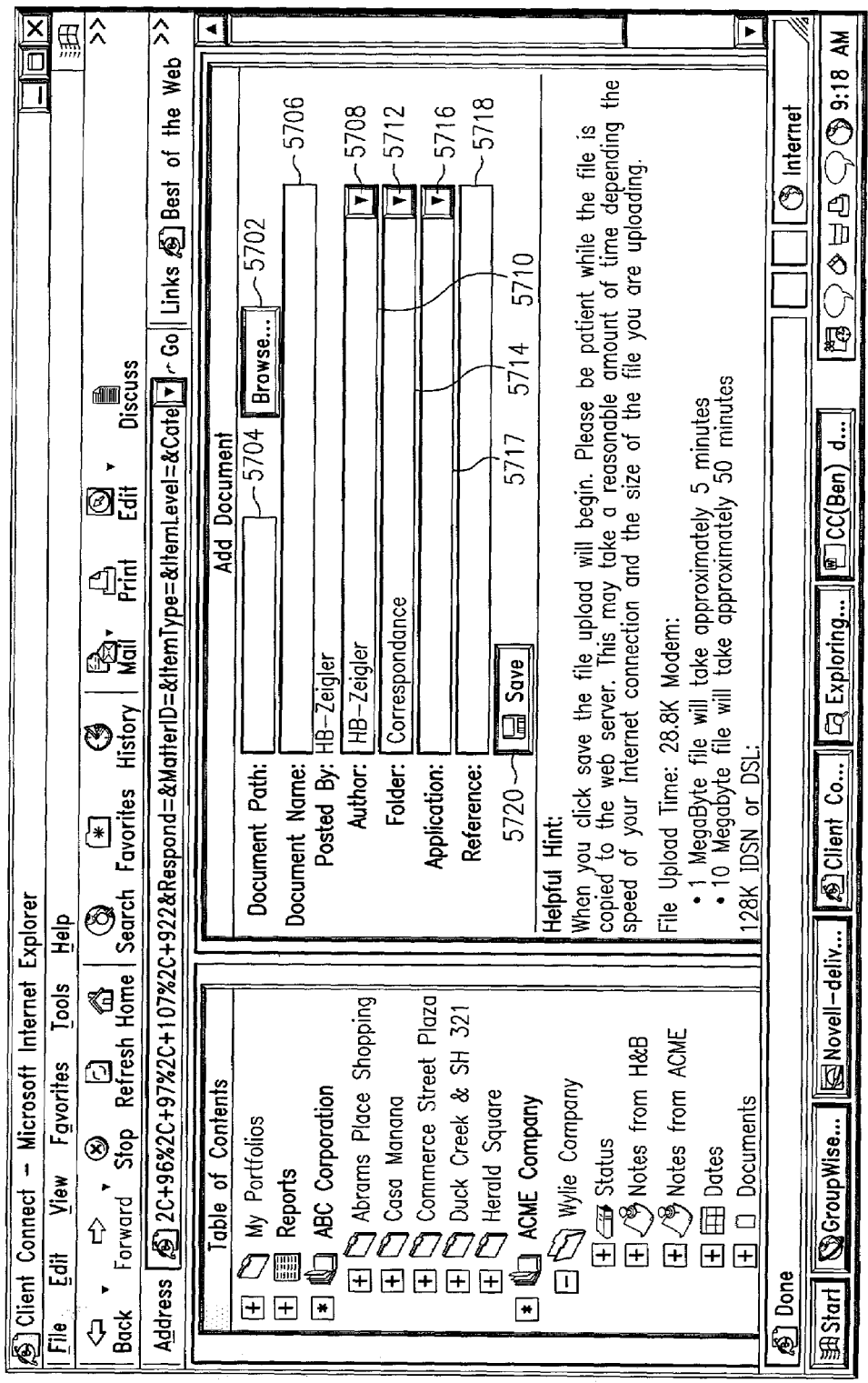

The following is an explanation of how to post a document to a specific project using the alternative embodiment. From the screen 5500, clicking on a project name in the Table of Contents 5502 or expanding a project folder to display the component "Documents" and then clicking on a Document Library option or clicking on Documents in the Table of Contents 5502 results in the display of any folders and documents created within the document library for the selected project, as illustrated a Documents screen 5600 shown in FIG. 56. It will be recognized that the identity of the documents displayed will depend on the current filter that is being applied, which is displayed in and selected using a Filter field 5601. From the Documents screen 5600, the user simply locates a folder 5602 in which the document is to be posted (e.g., "Correspondence") and clicks an Add Documents button 5604 to the right of the folder. This results in the display of an Add Document screen 5700, illustrated in FIG. 57.

Using the Add Document screen 5700, the user clicks on a Browse button 5702 next to a Document Path field 5704 to locate the document to post. Next, the user selects the document in a Windows dialog box (not shown) and clicks it open. Finally, the user types a name for the document in a Document Name field 5706. Clicking on a drop-down menu arrow 5708 next to an Author field 5710 enables the user to select an author of the document. Clicking on a drop-down menu arrow 5712 next to a Folder field 5714 enables the user to select a folder in which to post the document. It should be noted that the folder name will default to the folder in which the Add Document command was chosen. Clicking on a drop-down menu arrow 5716 next to an Application field 5717 will enable the user to select the application in which the document was created and/or saved. As mentioned above, exemplary applications include Corel WordPerfect, Microsoft Word, Excel, and PowerPoint, and Adobe Acrobat. Any additional information regarding the document optionally may be entered in a Reference field 5718.

Figure 58:
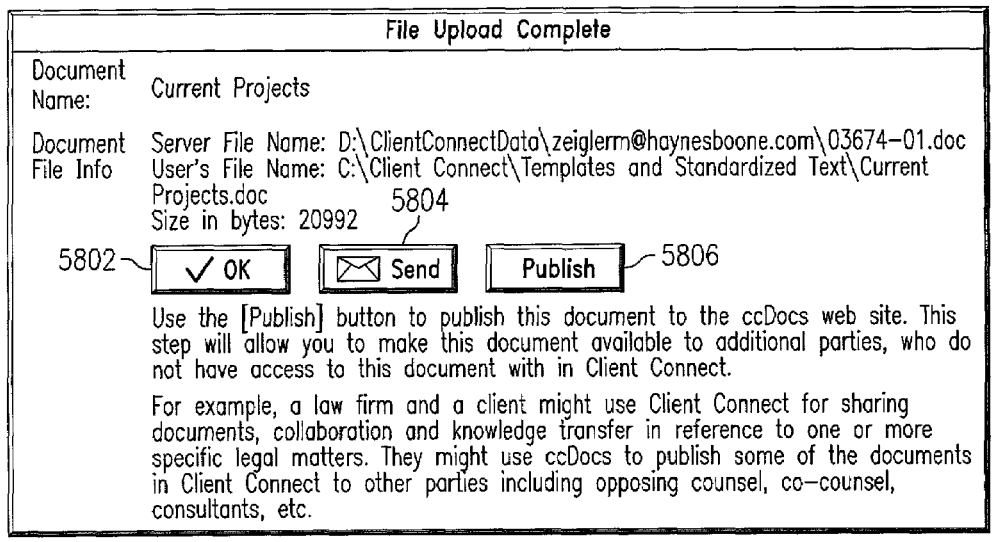

Clicking on a Save button 5720 results in the display of a File Upload Complete dialog box 5800, illustrated in FIG. 58. The File Upload Complete dialog box 5800 displays information regarding the document, as well as several options. Clicking an OK button 5802 results in the document being posted to the document library. Clicking on a Send button 5804 results in the user's having the option to send an E-mail to other users notifying them that the document has been posted and is available. Clicking on a Publish button 5806 results in the user's having the option to publish the document to a parallel website, referred to as "ccDocs," which will be described in greater detail below.

Figure 59:
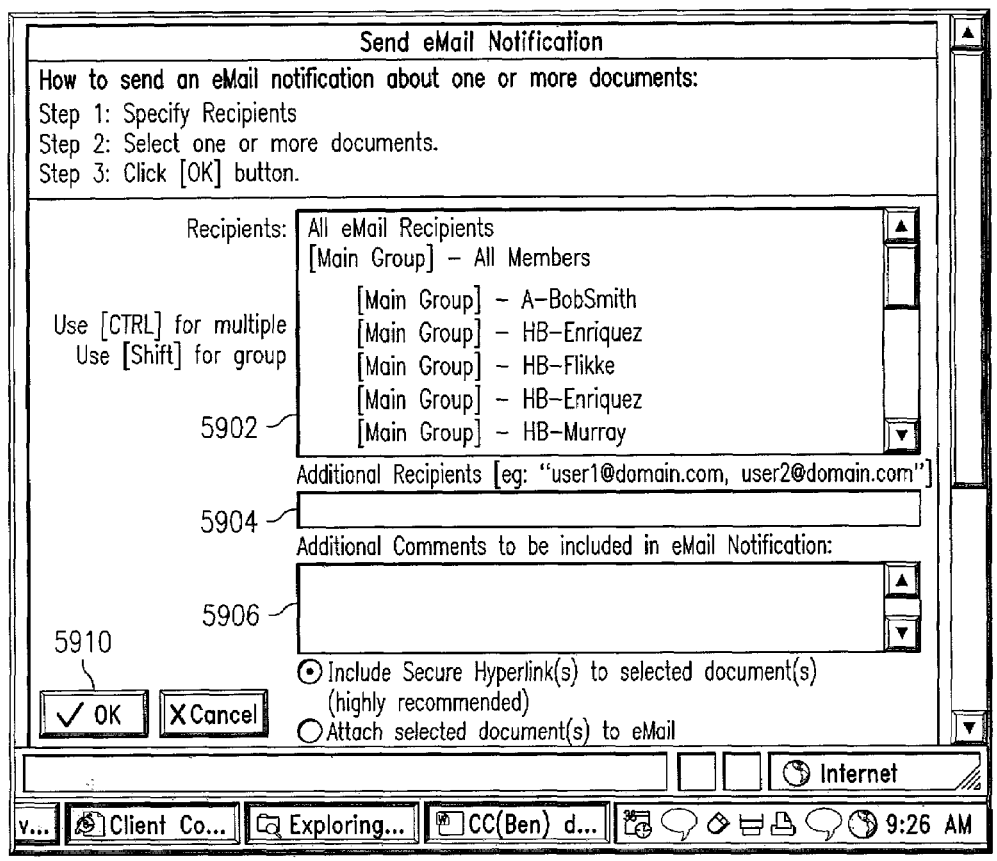

The following is an explanation of how to send an E-mail notification while posting a document. In particular, while posting a document, a user has the option to send an E-mail notification to other users notifying them that the document has been posted and is available for their user. Referring again to FIG. 58, once the document has been posted, as described above, the File Upload Complete screen 5800 will be displayed. From the File Upload Complete screen 5800, the user clicks on a Send button 5802, which results in the display of a Send E-mail Notification dialog box 5900, as illustrated in FIG. 59. The user then selects one or more users to receive the E-mail notification from a Recipients box 59 02. More than one user may be selected using the Ctrl/Shift keys on the keyboard. Additionally, entire groups of users may be selected. Additional users may be entered in an Additional Recipients field 5904. Additional comments to appear in the E-mail may be entered in an Additional Comments field 5906. A checkmark is placed in a check box next to each additional document to be included in the E-mail notification. Clicking on an OK button 5910 results in the E-mail notification being sent to all designated recipients.

Figure 60:
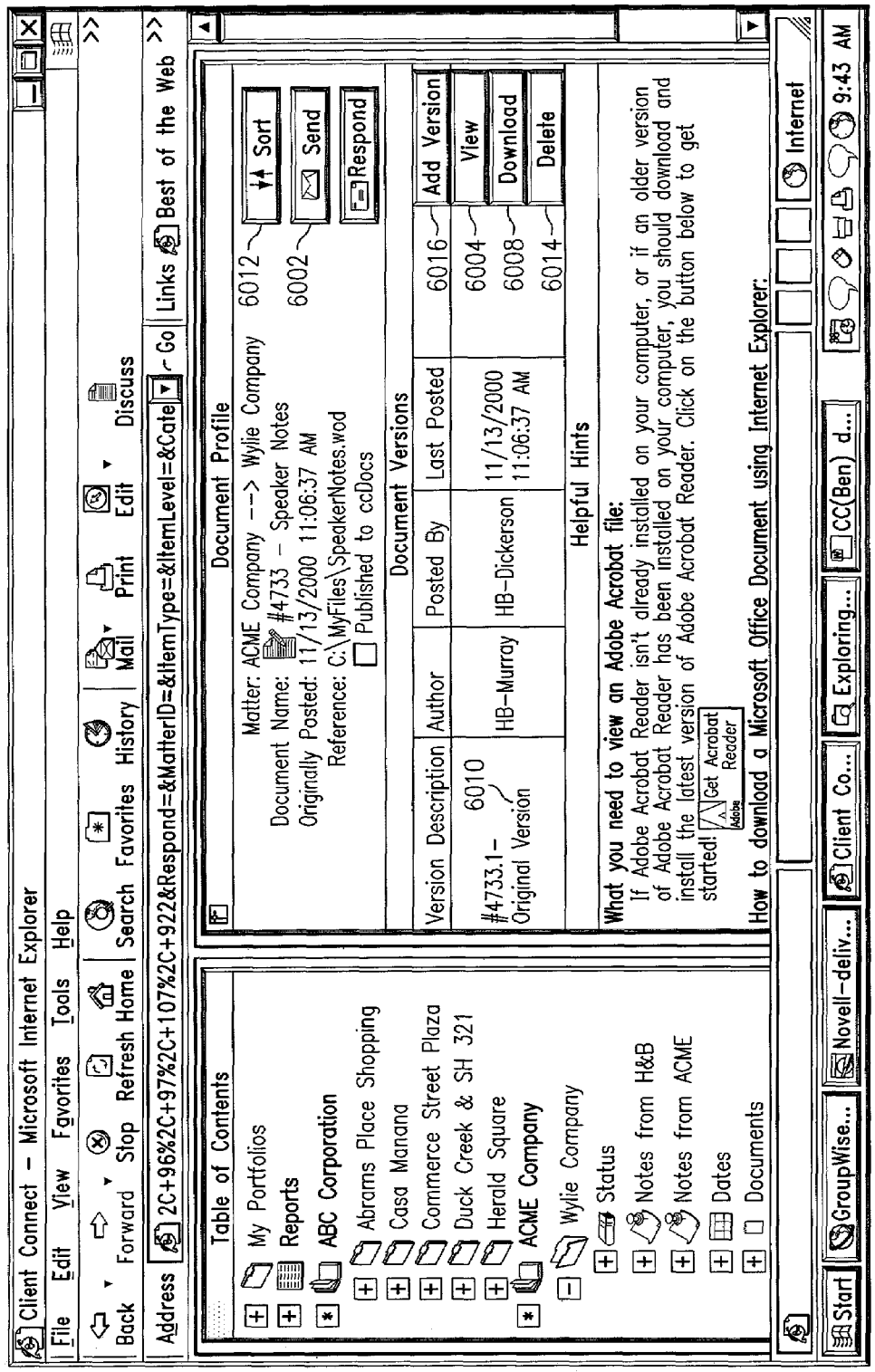

A user also has the option to send an E-mail notification after a document has been posted. To do this, the user proceeds as described above with reference to posting a document to a specific project (FIGS. 55, 55A, and 56), except that once the document is located on the Documents screen 5600, the user clicks on the document name to open a Document Profile screen 6000, as illustrated in FIG. 60. Clicking on a Send button 6002 results in the display of the Send E-mail Notification dialog box 5900 illustrated in FIG. 59. The user simply completes the dialog box 5900 as described above to send the E-mail notification to the designated recipients.

To view and/or print a document, the user proceeds as described above with reference to posting a document to a specific project (FIGS. 55, 55A, and 56), except that once the document is located on the Documents screen 5600, the user clicks on the document name to open the Document Profile screen 6000 (FIG. 60). Clicking on a View button 6004 results in the opening of the application appropriate for viewing the selected document. The prompts to view the document will vary depending on the particular application with which the selected document is associated. Clicking on the appropriate print button (not shown) within the application, if a paper copy of the document is desired, will result in the printing of the document.

To download a document, the user proceeds as described above with reference to posting a document to a specific project, except that once the document is located in the Documents screen 5600, the user clicks on the document name to open the Document Profile screen 6000 (FIG. 60). Clicking on a Download button 6008 results in the opening of the application appropriate for downloading the selected document. The prompts to download the document will vary depending on the identity of the particular application with which the selected document is associated. Next, the user specifies the location to which the document is to be saved and renames the document, if so desired.

Figure 61:
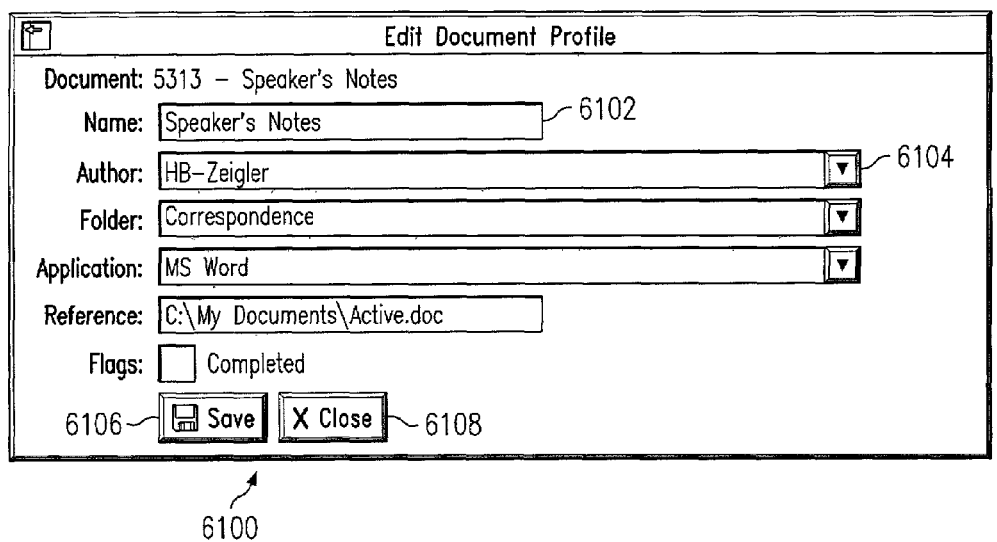

To rename a document, the user proceeds as described above with reference to posting a document to a specific project, except that once the document is located in the Documents screen 6000, the user clicks on the document name to open the Document Profile screen 6000 (FIG. 60). Next, the user clicks on the document name under the Version Description field 6010, which results in the display of an Edit Document Profile screen 6100, as illustrated in FIG. 61. Using the screen 6100, the user can rename the document and adjust the author of the version of the document by entering the requisite information in appropriate fields 6102, 6104, respectively. Clicking on a Save button 6106 saves the amended information. Clicking on a Close button 6108 closes the Edit Document Profile screen 6100. It should be noted that only the original posting user or designated author is permitted to rename or edit a Document Profile.

Figure 62:
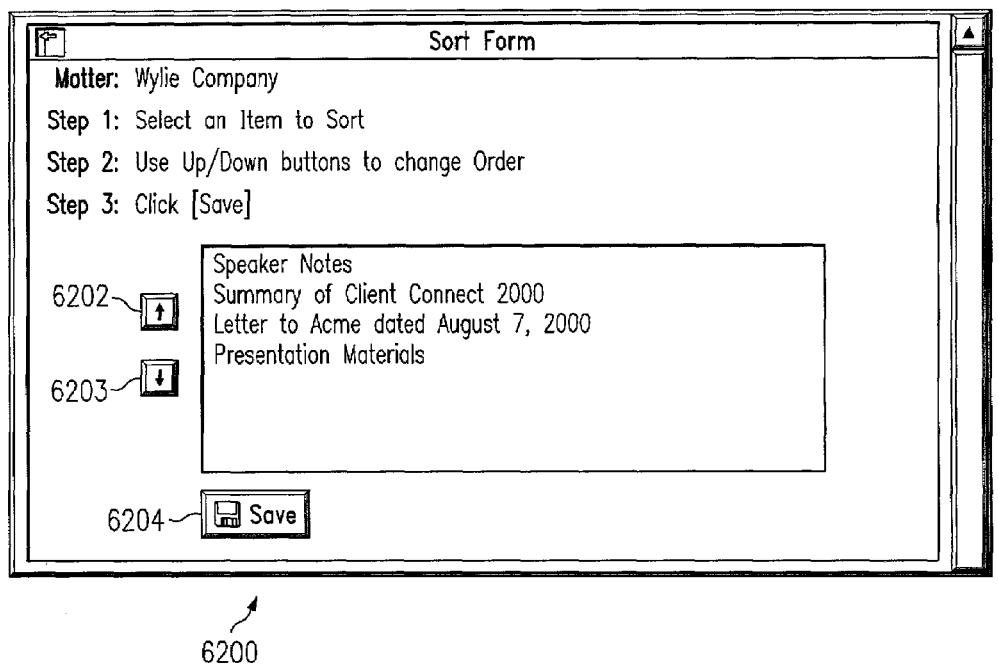

To sort a document, the user proceeds as described above with reference to posting a document to a specific project, except that once the document is located in the Documents screen 5600, the user clicks on the document name to open the Document Profile screen 6000 (FIG. 60). From the document profile screen, clicking on a Sort button 6012 results in the display of a Sort Form screen 6200, illustrated in FIG. 62. Using the Sort Form screen 6200, the user clicks on the name of the document to sort and then on Up/Down buttons 6202, 6203, to adjust the document location. Clicking on a Save button 6204 causes the adjustments to be saved.

Only the author of or the user that posted a document can delete that document. To delete a document, the user proceeds as described above with reference to posting a document to a specific project, except that once the document is located in the Documents screen 5600, the user clicks on the document name to open the Document Profile screen 6000 (FIG. 60). From the Document Profile screen 6000, clicking on a Delete button 6014 causes the document to be deleted without any warning prompts.

Figure 63:
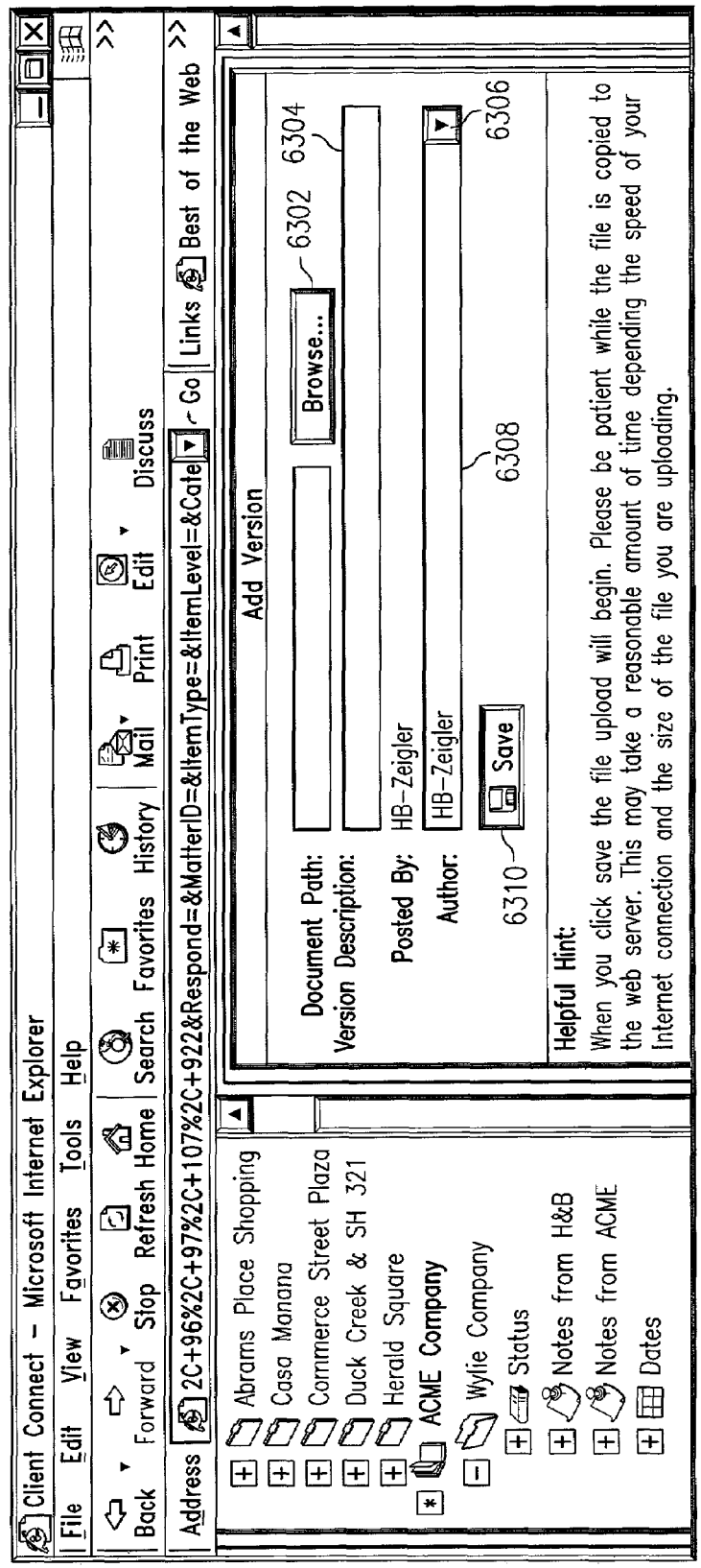

To add a new version of a document, the user proceeds as described above with reference to posting a document to a specific project, except that once the document is located in the Documents screen 5600, the user clicks on the document name to open the Document Profile screen 6000 (Fig. G). From the Document Profile screen 6000, clicking on an Add Version button 6016 results in the display of an Add Version screen 6300, as illustrated in FIG. 63. From the Add Version screen 6300, clicking on a Browse button 6302 enables the user to locate the version of the document to be posted. The version of the document to be posted is selected from the Windows dialog box (not shown) and opened. A name for the document version is entered in a Version Description field 6304. Clicking a drop-down menu arrow 6306 next to an Author field 6308 enables the user to select the author of the document. Clicking on a Save button 6310 results in the display of the File Upload Complete dialog box 5800 (FIG. 58) displaying the document's information. From this dialog box, the user has several options. Clicking on the OK button 5802 results in the new version being posted to the document library. Clicking on the Send button 5804 results in the user's having the option to send an E-mail to users notifying them that the new version of the document has been posted and is available. Finally, clicking on the Publish button 5806 publishes the document to a parallel website, referred to as "ccDocs," which will be described in greater detail below.

It will be noted that many similarities exist between the document library feature and the document management feature described above with reference to FIGS. 45-54.

Response threads are a special feature of the application 12 that enable users to capture and carry on a continuing dialog regarding information on a particular matter or project. Response threads are located within every application component, including Status, Notes, Dates, Checklists, and Documents.

Figure 64:
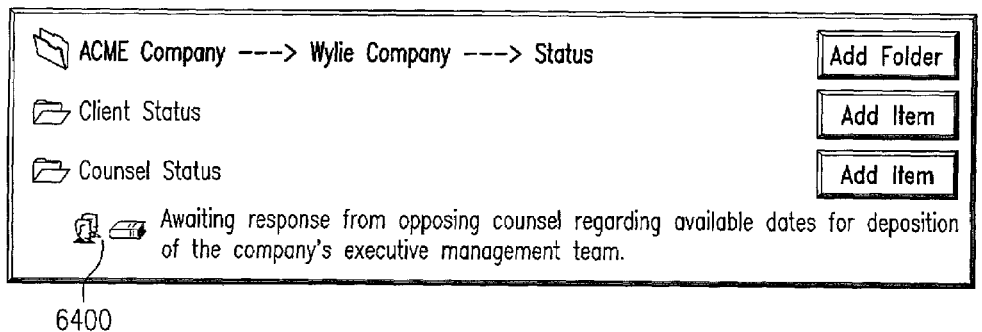
FIGS. 64-69 illustrate various uses of response threads of the alternative embodiment of the application of FIGS. 1 and 1A.
Figure 65:
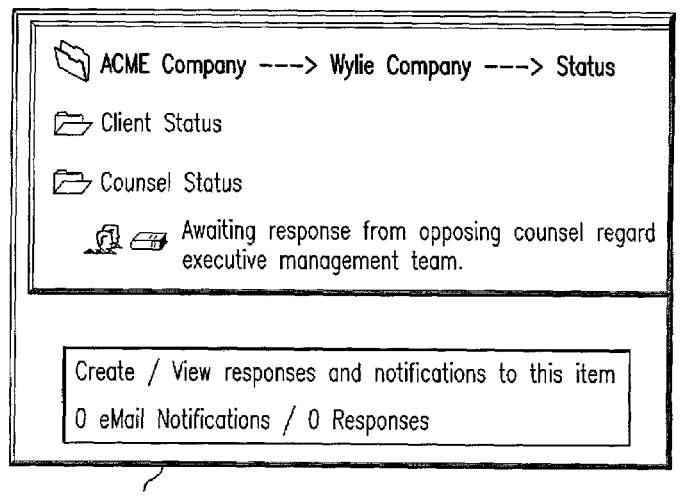
Figure 66:
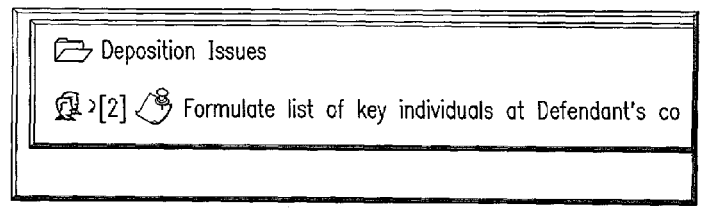

Referring to FIG. 64, located to the left of all posted items or documents is a response thread icon 6400. The response thread icon 6400 enables users to post their responses to the corresponding item or document. Referring now also to FIG. 65, when a user places the mouse over the response thread icon 6400, a box 6500 will be displayed showing how many responses have been posted and how many E-mail notifications have been sent for the corresponding item or document. In addition, if a response has been posted, a number will always be displayed to the right of the icon 6400 indicating the number of responses posted to that particular item or document. For example, as shown in FIG. 66, two responses have been posted in connection with the associated item.

Figure 67:
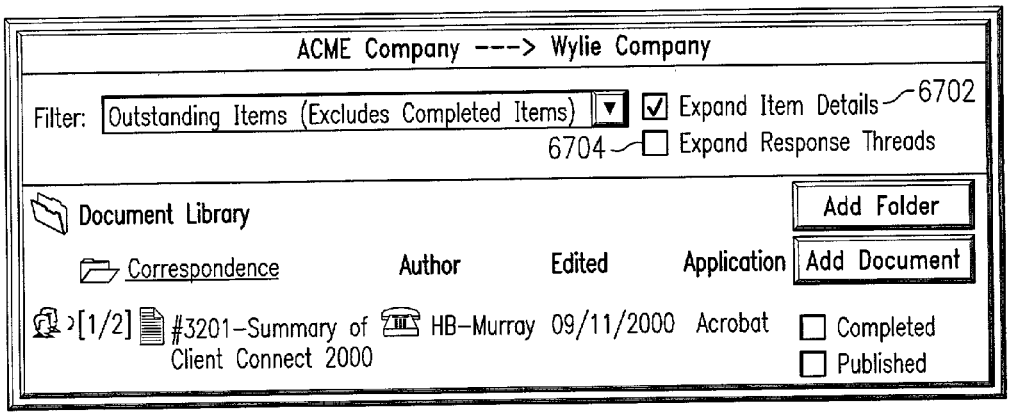

To display both the number of responses and the number of E-mail notifications, rather than only the number of responses, to the right of the icon 6400, as shown in FIG. 67, the user can check an Expand Item Details checkbox 6702. Checking the checkbox 6702 will also result in further details regarding the item or document being displayed.

Figure 68:
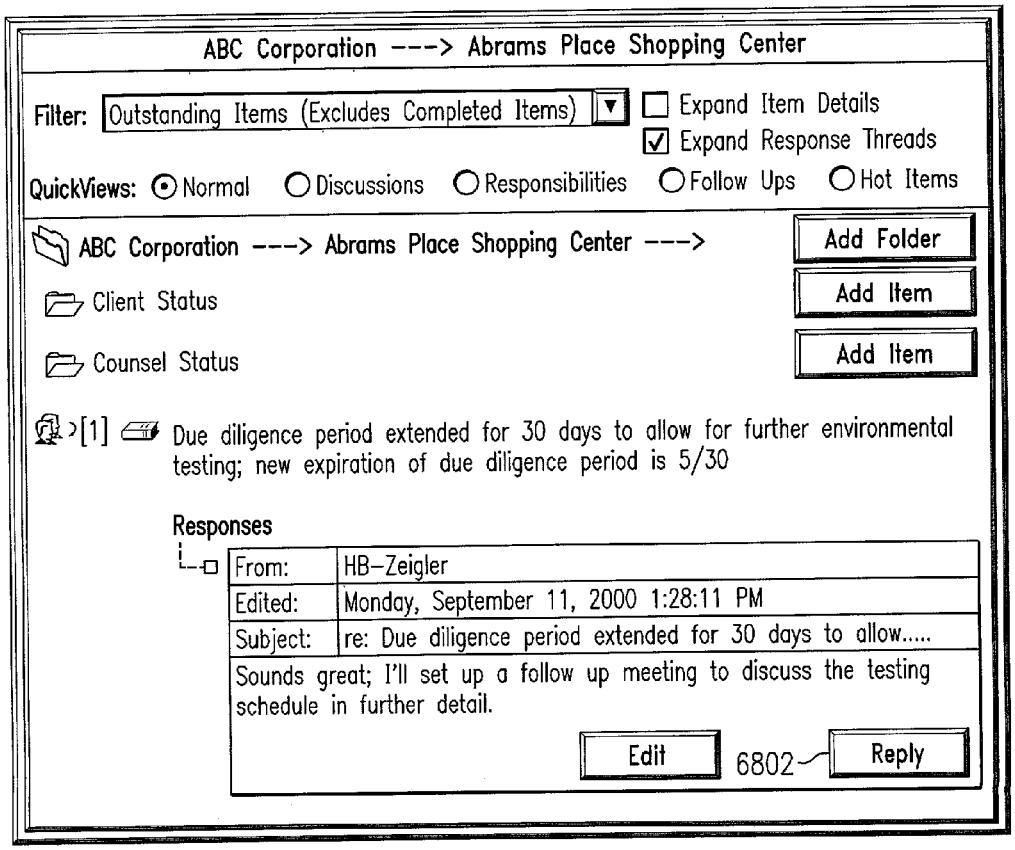

To view response threads for a particular component, the user clicks on an Expand button 5506 next to a project name in the Table of Contents 5502. All components are then displayed beneath the project name. Clicking on a components, such as Status or Documents, results in the display of folders and items that have been created within the selected component for the selected project. Checking an Expand Response Threads check box 6704 results in the display of all response threads that have been posted for the selected component, as illustrated in FIG. 68. Only the user who posted a response will have the option to edit that response; however, all users may reply to a posted response.

Figure 69:
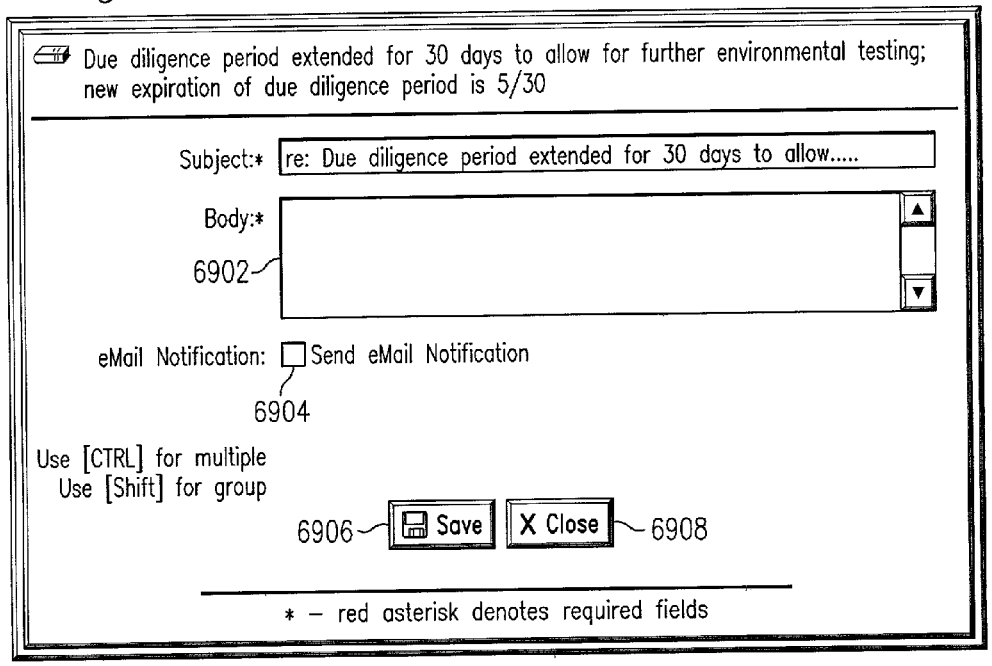

To post a response to an item within the application 12, the user clicks on an Expand button 5506 next to a project name in the Table of Contents 5502. All components are then displayed beneath the project name. Clicking on a components, such as Status or Documents, results in the display of folders and items that have been created within the selected component for the selected project. The user then locates the item or document the response is to be posted to and clicks on the Response Thread icon 6400 next to that item or document, resulting in the display of an Add Response screen 6900, as illustrated in FIG. 69. Using the Add Response screen 6900, the user types the response in a Body text box 6902 and then places a check next to a Send E-mail Notification box 6904 to send an E-mail notifying others that the response has been posted, if desired. The user then clicks on a Save button 6906 to save the response and then on a Close button 6908 to close the screen 6900.

Figure 70:
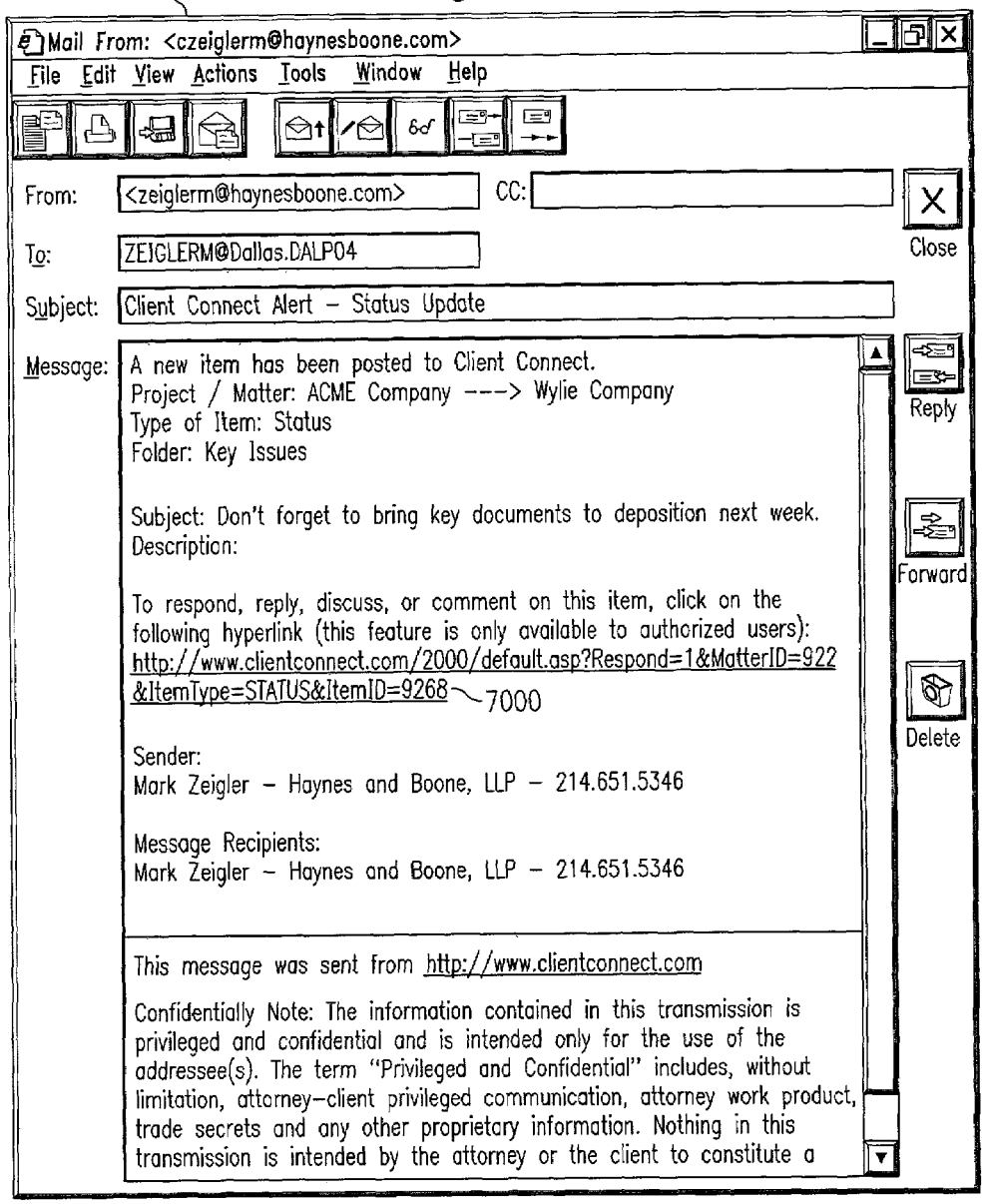
FIG. 70 illustrates an E-mail message containing a link to a document that has been posted.

To post a response to an item or document from within an E-mail, as illustrated in FIG. 70, the user clicks on a response hyperlink 7000 within a received E-mail 7002. This results in the application log in screen being displayed. After the user logs into the application 12, the Add Response screen 6900 is displayed and the user completes the information in the Add Response screen as described above.

To reply to a response from within the application 12, the user clicks on an Expand button 5506 next to a project name in the Table of Contents 5502. All components are then displayed beneath the project name. Clicking on a components, such as Status or Documents, results in the display of folders and items that have been created within the selected component for the selected project. The user then checks the Expand Response Threads checkbox 6704, which results in the display of all response threads for the particular component (FIG. 68). Once the user locates the item or document to reply to, he or she clicks on a Reply button 6802, which results in the display of an Add Reply screen, which is similar to the Add Response screen 6900 shown in FIG. 69. The user completes the information in the Add Reply screen in a manner similar to that described above with respect to the Add Response screen 6900.

Alternatively, one can reply to a response from within the application 12 by clicking on a responsible or discussion party's name to an item.

Finally, to reply to a response from within an E-mail, the user proceeds as described with reference to and as illustrated in FIG. 70. After the user logs into the application, the Add Reply screen described above is displayed and the user completes the information in the Add Reply screen as described above.

Similar to the user groups described above, E-mail groups are another component of the alternative embodiment of the application 12 that can assist a user in quickly locating vital information on users associated with certain projects. E-mail groups displays all users that are part of the E-mail group list for a particular project. In addition to listing the users, the component also displays E-mail addresses, phone numbers, fax numbers, and last date and time the user logged on to the application 12. The E-mail function in the application 12 is completely independent of any E-mail program within the users browser software; however, all reply E-mails will go into the users normal E-mail "In Box".

Figure 71:
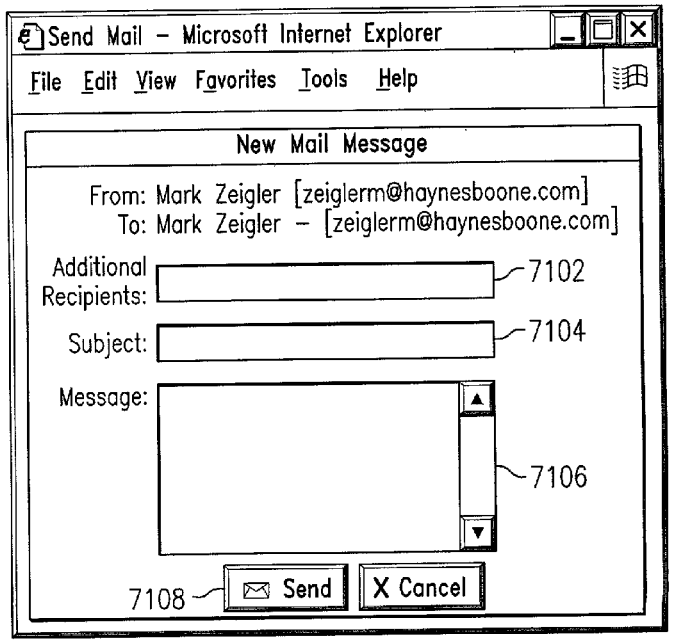
FIGS. 71-73 illustrate various uses of E-mail groups of the alternative embodiment of the application of FIGS. 1 and 1A.

To send an E-mail using E-mail groups, the user clicks on the expand button 5506 next to the project name in the Table of Contents 5502 (FIG. 55), which causes all components to be displayed beneath the project name. At this point, the user clicks on an E-mail Groups component 5520 (FIG. 55A), which results in the display of all users and their key information, such as name, company, phone number, fax number, and last log in date. Once a desired user's name has been located, clicking on the name results in the display of a New Mail Message dialog box 7100, as shown in FIG. 71. At this point, the names of additional recipients may be included in an Additional Recipients field 7102, the subject of the message is typed in a Subject field 7104, and the message body is typed in a Message field 7106. Clicking on a Send button 7108 results in the E-mail being sent to the designated users/recipients.

Figure 72:
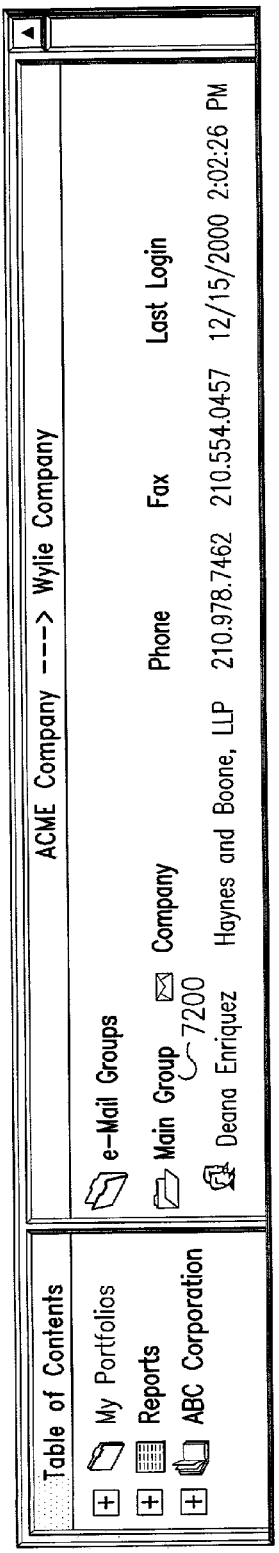
Figure 73:
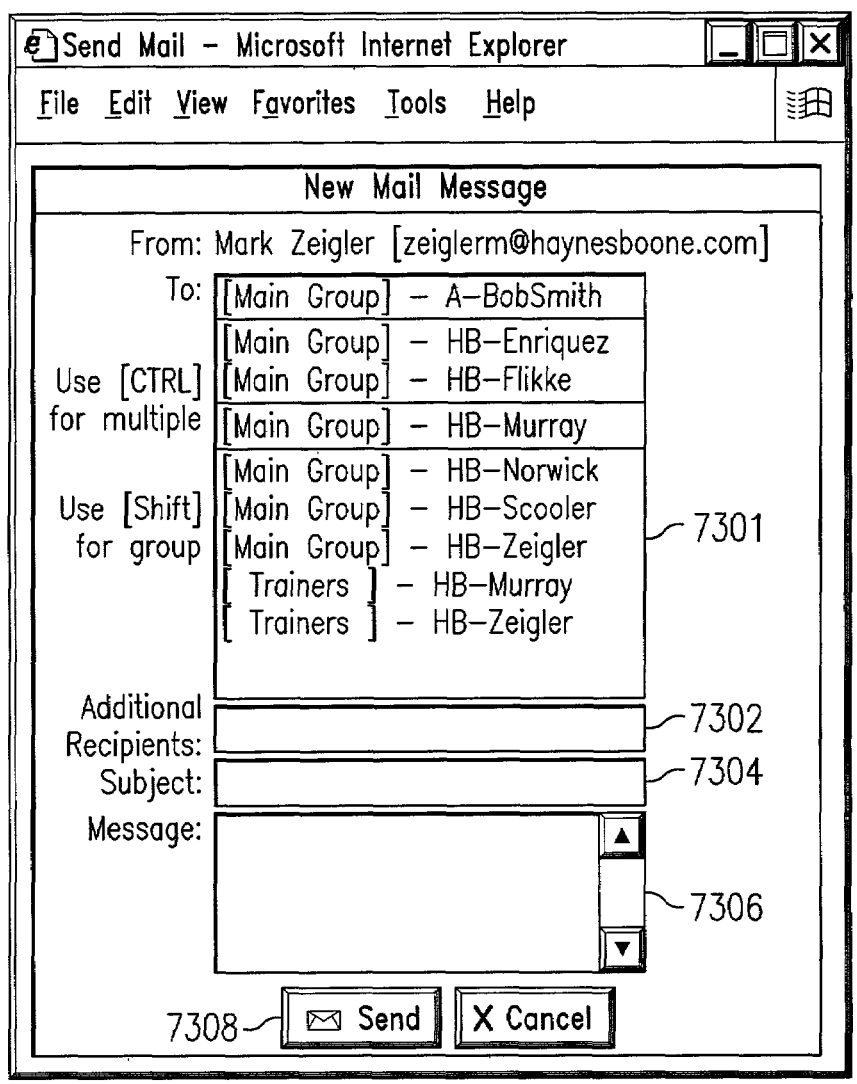

To send an E-mail to an entire group, the user proceeds as described above with reference to sending an E-mail to designated users. Once the user clicks on the E-mail groups component to display all users and their key information, the user clicks on a Main Group button 7200 (FIG. 72), which opens a New Mail Message dialog box 7300 (FIG. 73). The dialog box 7300 is similar to the dialog box 7100, except that the list of recipients in a "To" field 7301 includes all users who are members of the selected group (in this case, Main Group). Users are selected using Ctrl/Click or Shift/Click. At this point, additional recipients, if any, are typed in an Additional Recipients field 7302, the subject is typed in a Subject field 7304, and the message is typed in a Message field 7306. Clicking on a Send button 7308 results in the E-mail being sent to the designated recipients.

As shown in FIGS. 1 and 1A, ccDocs is an optional extension of the application 12 that functions as a separate website 30 that works in conjunction with the document library described above. When ccDocs is enabled, any document posted in the document library can be "published" to this separate website 30. Typically, documents are published to the ccDocs website 30 in order to share them with parties who do not have access to the application 12.

For example, a law firm and one of its clients may use the application 12 for sharing documents and collaboration and knowledge transfer in reference to one or more specific legal matters. In addition, they might use ccDocs to publish documents posted in the application regarding those specific legal matters so as to provide access to other parties, including opposing counsel, co-counsel, consultants, etc.

Figure 74:
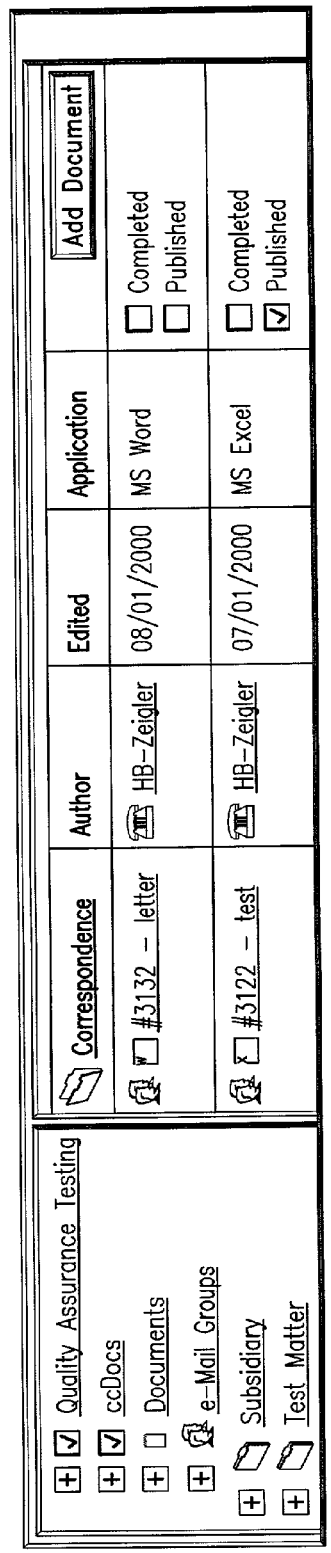

To publish a document to the ccDocs website 30 that is currently posted in the document library, from the MMKB screen 5500 (FIG. 55), the user clicks on a project name in the Table of Contents 5502 or expands a project folder to Documents and then clicks on a Document Library option or clicks on Documents in the Table of Contents 5502. These actions result in the display of any folders and documents created within the document library for the selected project, as illustrated a Documents screen 5600 shown in FIG. 56. It will be recognized that the identity of the documents displayed will depend on the current filter that is being applied, which is displayed in a Filter field 5601. From the Documents screen 5600, the user simply locates a folder 5602 in which the document is to be posted and clicks an Add Documents button 5604 to the right of the folder. This results in the display of an Add Document screen 5700, illustrated in FIG. 57. Once the user locates the document he or she wishes to publish to the ccDocs website 30, he or she checks a box designated "Published" for that document (FIG. 74).

Figure 75:
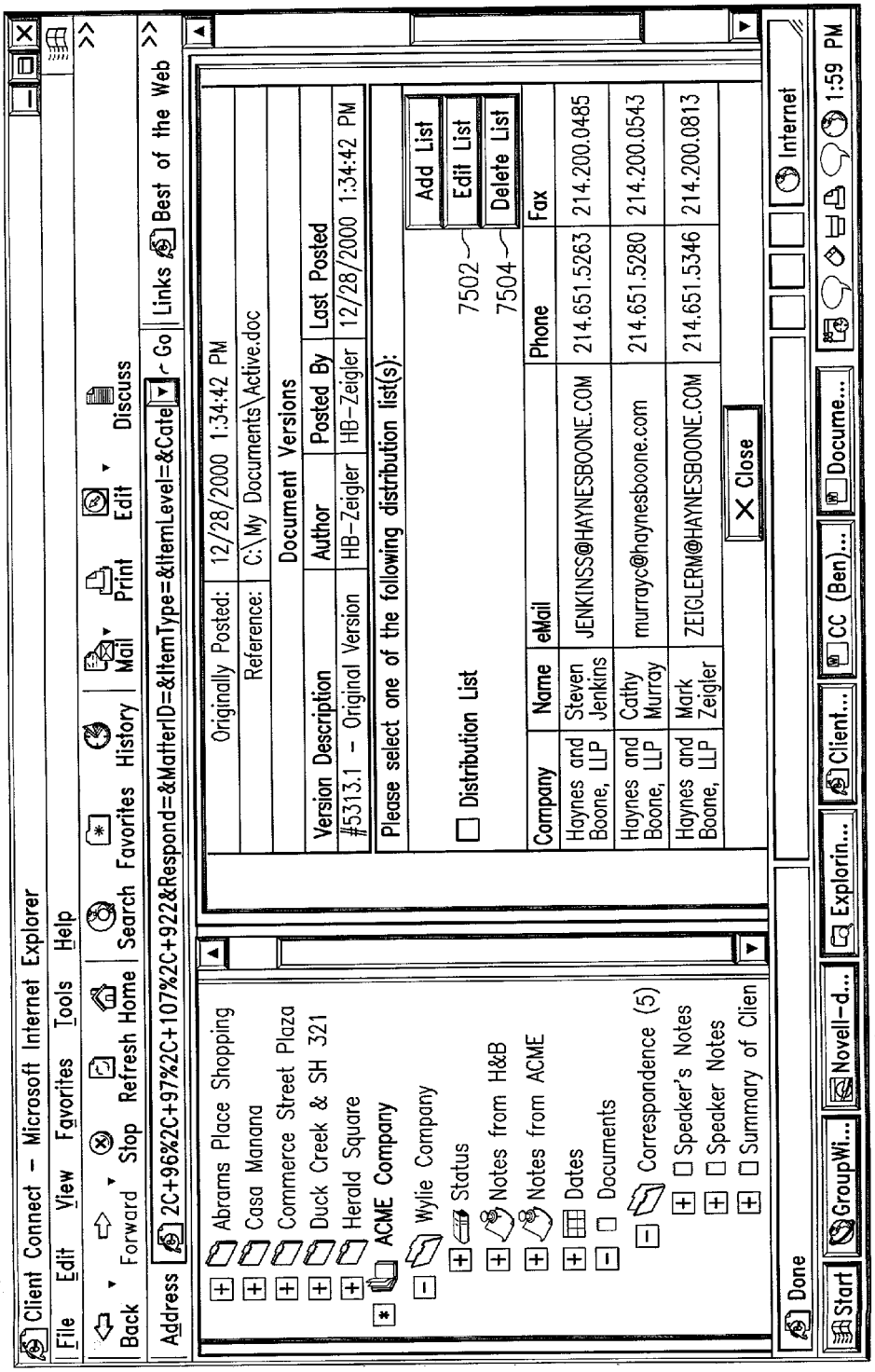

At that point, a Publishing Document to ccDocs screen 7500, as illustrated in FIG. 75, is displayed, prompting the user to select a distribution list. A distribution list is a list of E-mail addresses that the application 12 will use to send an E-mail to notify the selected users that a document has been published and is now available for their access. The E-mail will contain a hyperlink to the published document, along with instructions on how to access the document. If there are no current distribution list already created for the project, the application 12 will open to a screen prompting the user to create a new distribution list.

At this point, the user scrolls down and clicks in a check box next to the distribution list to be activated, which results in a dialog box 7600, as illustrated in FIG. 76, notifying the user that the document will be published to the ccDocs website 30 for access by all members of the selected distribution list. Additionally, an E-mail will be sent to all members of the distribution list notifying them that the document has been published and including a hyperlink to the document. Once the user selects an OK button 7602, another dialog box 7700, as illustrated in FIG. 77, will be displayed to notify the user of the option to publish additional documents and include those document references in the E-mail notification. Selecting an OK button 7702 enables the user to select additional documents; selecting a Cancel button 7704 cancels this option and causes the one document to be published. A notation that a document has been published will be included as a check mark in a check box of the document in the document library. Users can use the filter to see only "published" documents for a project.

To publish a document to the ccDocs website 30 when posting the document to the document library, a user proceeds as described above with reference to how to post a document to the document library until the File Upload Complete dialog box 5800, illustrated in FIG. 58, is displayed. As described above, clicking on the Publish button 5806 results in the user's having the option to publish the document to the ccDocs website 30 and results in the display of the Publishing Document to ccDocs screen 7500, as illustrated in FIG. 75, as described above. The user then continues as described above in connection with the description of publishing to the ccDocs website 30 a document that has already been published to the document library.

To unpublish a published document, the user proceeds as described above with reference to publishing to the ccDocs website 30 a document that has already been published to the document library until the screen shown in FIG. 74 is displayed. At this point, the user locates the document he or she wants to unpublish and then clicks in the check box designated Published" for the document to remove the check mark therein. At this point, the Publishing Document to ccDocs screen 7500 (FIG. 75) will be displayed, prompting the user to deselect the distribution list that is assigned to the specific document to be unpublished. Next, a dialog box 7800, as illustrated in FIG. 78, will be displayed to notify the user that the document will no longer be available to those on the selected distribution list. Clicking on an OK button 7802 results in the document's being unpublished (removed) from the ccDocs website 30.

As previously noted, a distribution list is a list of E-mail addresses that the application 12 will use to send an E-mail notifying selected users that a document has been published and is now available for access. Similar to the E-mail illustrated in FIG. 70, the E-mail will contain a hyperlink to the published document in the ccDocs website 30, as well as instructions on how to access the ccDocs website 30. Users may add, edit, or delete distribution lists.

To create a distribution list, a user locates a document to be published and clicks in a check box designated Published next to the document, as described above. If there are no current distribution lists already created for the project, a dialog box 7900, as shown in FIG. 79, will be displayed prompting the user to create a new distribution list. Using the dialog box 7900, the user clicks in a Members text box 7902 and begins adding E-mail addresses, separated by commas, to the distribution list. To name the distribution list, the user clicks in a List Name text box 7904 and types a name for the list. At this point, the user clicks on a Save button 7906 to save the list, resulting in the display of a dialog box 8000, as illustrated in FIG. 80. The dialog box 8000 displays detail information (e.g., company name, E-mail, phone number, and fax number) for each member of the distribution list and allows the user to add additional members to the list, if desired. If detail information on a certain member is not displayed, the user may click on each individual detail field and add the information. The user may also delete members from the distribution list by clicking on a Delete button 8002 associated with the member to be deleted. Additional members may be added in an Additional Members text box 8004 and a name for the list is entered in a List Name field 8005. Clicking on a Save button 8006 results in the new distribution list being added.

To edit a distribution list, within the screen 7500 (FIG. 75), the user clicks on an Edit List button 7502 of the distribution list to be edited. The screen 7500 may be accessed by clicking on the Publish button next to a published or unpublished document. At this point, the necessary or desired changes are made by the user to the distribution list and the Save button is selected to save the changes.

Figure 81:
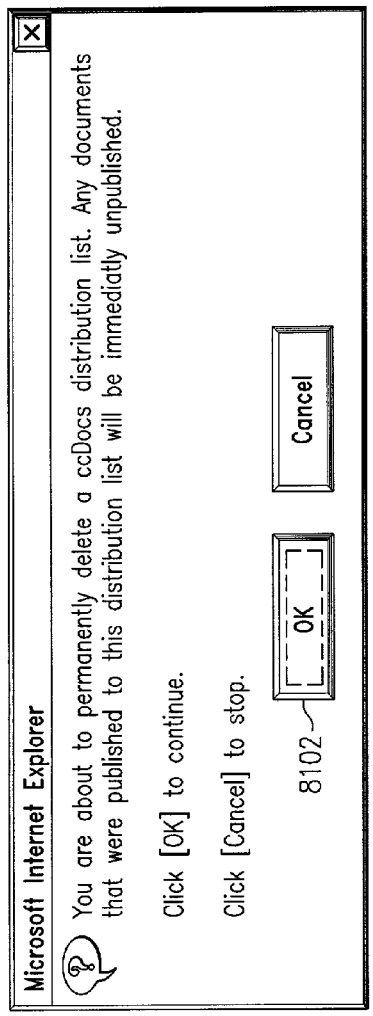

Similarly, to delete a distribution list, within the screen 7500, the user clicks on a Delete button 7504 of the distribution list to be deleted. This results in the display of a dialog box 8100 (FIG. 81) notifying the user of the deletion of the list. Clicking on an OK button 8102 results in the deletion of the list.

In the alternative embodiment of the application 12, the Wizard portion (FIGS. 4-30) is replaced by an administrative tool that enables a user easily to manage companies (comparable to the "clients" of the Wizard described above), people (comparable to the "users" of the Wizard portion), and projects (comparable to the "matters" of the Wizard portion) within the application 12.

Figure 82:
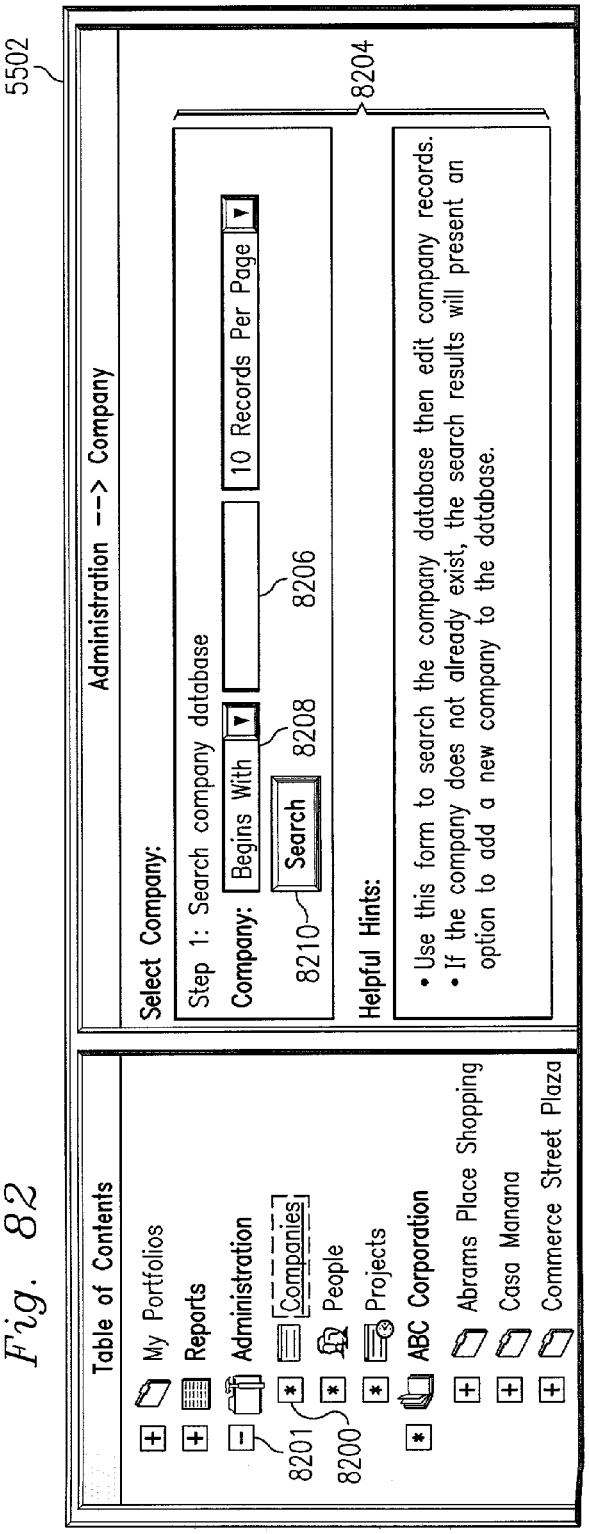

Referring now to FIG. 82, to access a Companies component 8200, the user clicks on an expand button next to an Administration component 8201 in the Table of Contents 5502. This displays whatever Administration components the user has been given access to, as will be described in greater detail below in connection with permissions. Clicking on the Companies component 8200 results in the display of a Company screen 8204. Before a user can create a new company, he or she must perform a search to verify that the company does not already exist in the database. A similar search must also be performed when editing an existing company. An Add a New Company button (FIG. 83) appears after an initial search is performed. There are may available options for editing an existing company within the application 12.

To edit an existing company, from the Company screen 8204, the user enters the company's name, or a portion thereof, in a text field 8206 and selects a type of search from a drop down menu 8208. "Begins With" searches allow the user to search for any company whose name begins with the string of characters entered in the text field 8206 For example, if the letter "A" is entered in the text field 8206, the search results will include any company whose name begins with the letter A. "Contains" searches allow the user to search for any company the name of which contains the string of characters entered in the text field 8206. For example, if the string "AB" is entered in the text field 8206, the search results will include any company whose name includes "AB" anywhere therein.

The user can also select the number of records to be displayed per page using a drop down menu 8208. The default number of records per page is 10; however, this can be adjusted to 20, 30, 40, or 50, using the menu 8208.

Once the above-described information is entered, clicking on a Search button 8210 results in Company screen 8204 being updated to include the search results in a search results portion 8302 thereof, as illustrated in FIG. 83. If the desired company is not included in the search results portion 8302, the user can perform another search by entering new search criteria in a search criteria portion 8304, as described above. If the desired company is included, clicking on the company's name results in the display of a Company Profile screen 8400 (FIG. 84). The Company Profile screen 8400 contains six sections for editing purposes. These sections include a Details section 8402a, a License Status section 8402b, a Company Permissions section 8402c, a People Groups section 8402d, a Project Templates section 8402e, and a Project Categories section 8402f. Each of these will be described in greater detail below.

The Details section 8402a provides access, via an Edit button 8404a, to edit company information, such as physical address, phone number, fax number, web address, and zip code. Additionally, the Details section 8402a provides access for the addition and deletion of company locations. The License Status section 8402b provides access, via an Edit button 8404b, to control and management of which components are enabled or disabled for the company, as described in greater detail below. The Company Permissions section 8402c provides access, via an Edit button 8404c, to management of user rights for a company. The People Groups section 8402d enables, via an Edit button 8404d, the creation and management of specific people groups for a company. The Project Templates section 8402e provides for the creation and maintenance of templates for a company via an Edit button 8404e. Finally, the Project Categories section 8402f provides for the further classification of projects via an Edit button 8404f.

Figure 85:
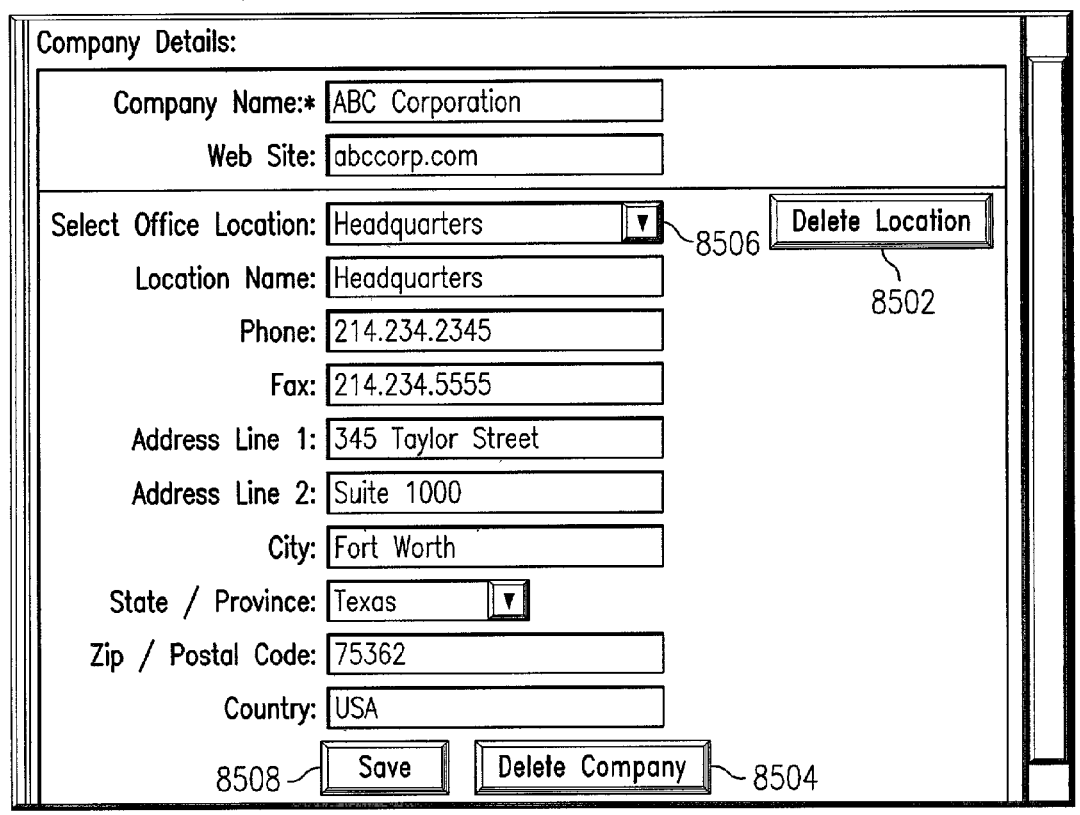

Clicking on the Edit button 8404a results in the display of an Edit Details screen 8500 (FIG. 85). Using the Edit Details screen 8500, a user may edit the company information by changing/adding/deleting information in the various fields as necessary. Additionally, clicking on a Delete Location button 8502 deletes the currently displayed location in its entirety. Clicking on a Delete Company button 8504 deletes the entire company, as well as all of its locations. To add another company location, the user simply uses a drop down menu 8506 and selects Add New Location therefrom. Once the new location information is entered, clicking on a Save button 8508 saves the entered information. Similarly, once the user has completed editing existing information, clicking on the Save button 8508 saves the newly entered information.

From the License Status section 8402b, clicking on a drop down menu 8405a enables the user to view all components licensed by the company. Similarly, clicking on a drop down menu 8405b enables the user to view all components not licensed by the company. Clicking on the Edit button 8404b results in the display of an Edit License Status screen 8600 (FIG. 86). This screen displays all of the components available for license to clients. Using this screen 8600, the user simply selects/deselects the desired components and clicks on a Save button 8602 to save the selections. Clicking on a link 8604 returns the user to the Company Profile screen 8400 (FIG. 84). As shown in FIG. 86, licensable components include various components and features of the application 12 as described herein. It will be recognized that the list illustrated in FIG. 86 is for purposes of example only and is not an exhaustive list of all of the components and/or features that could be separately licensed.

Figure 84A:
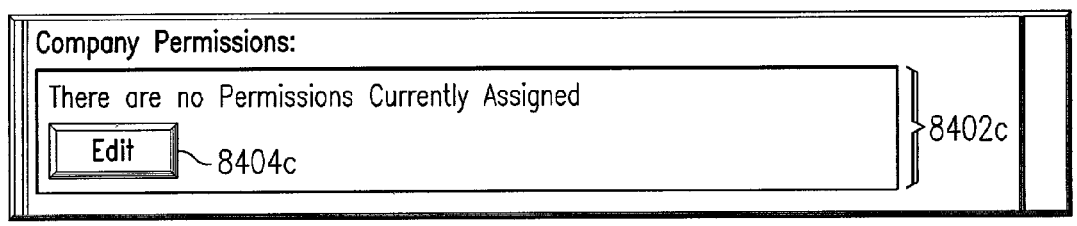

From the Company Permissions section 8402c, clicking on a drop down menu 8410a enables the user to view the names of all users that have been assigned "Company Administrator" status for the company. A user that has been granted "Company Administrator" privileges may create and manage all projects created within that company, as well as manage users within those projects (i.e., assign permissions to other users). Clicking on a drop down menu 8410b enables the user to view the names of all users that have been assigned "Create New Project" status. Users that have been assigned "Create New Project" status have the ability to create new projects within the company. If there are no permissions currently assigned, the Company Permissions section will appear as illustrated in FIG. 84A. Clicking on the Edit button 8404c results in the display of an Edit Company Permissions screen 8700 (FIG. 87). The screen 8700 includes an Add Permissions section 8702 and a Delete Permissions section 8704. To add company permissions, the user must first perform a search by entering information in the text fields provided in the section 8702 and then clicking on a Search button 8706, at which point, the search results are returned in a Search Results section 8708 (FIG. 87A). The user then checks the box next to the desired person and then clicks on a drop down menu 8710 to select the desired permission level, e.g., "Create New Projects" or "Company Administrator". Clicking on an Add Selected Permission button 8712 results in the assignation of the new company permissions to the selected user. To delete permissions for one or more people, in the Delete Permissions section 8704 (FIG. 87), the user selects the person(s) for whom permissions are to be deleted and then clicks on a Delete Selected People button 8714. Once all of the desired permissions have been added/deleted, the user clicks on a link (not shown) to return to the Company Profile screen 8400 (FIG. 84).

Figure 88:
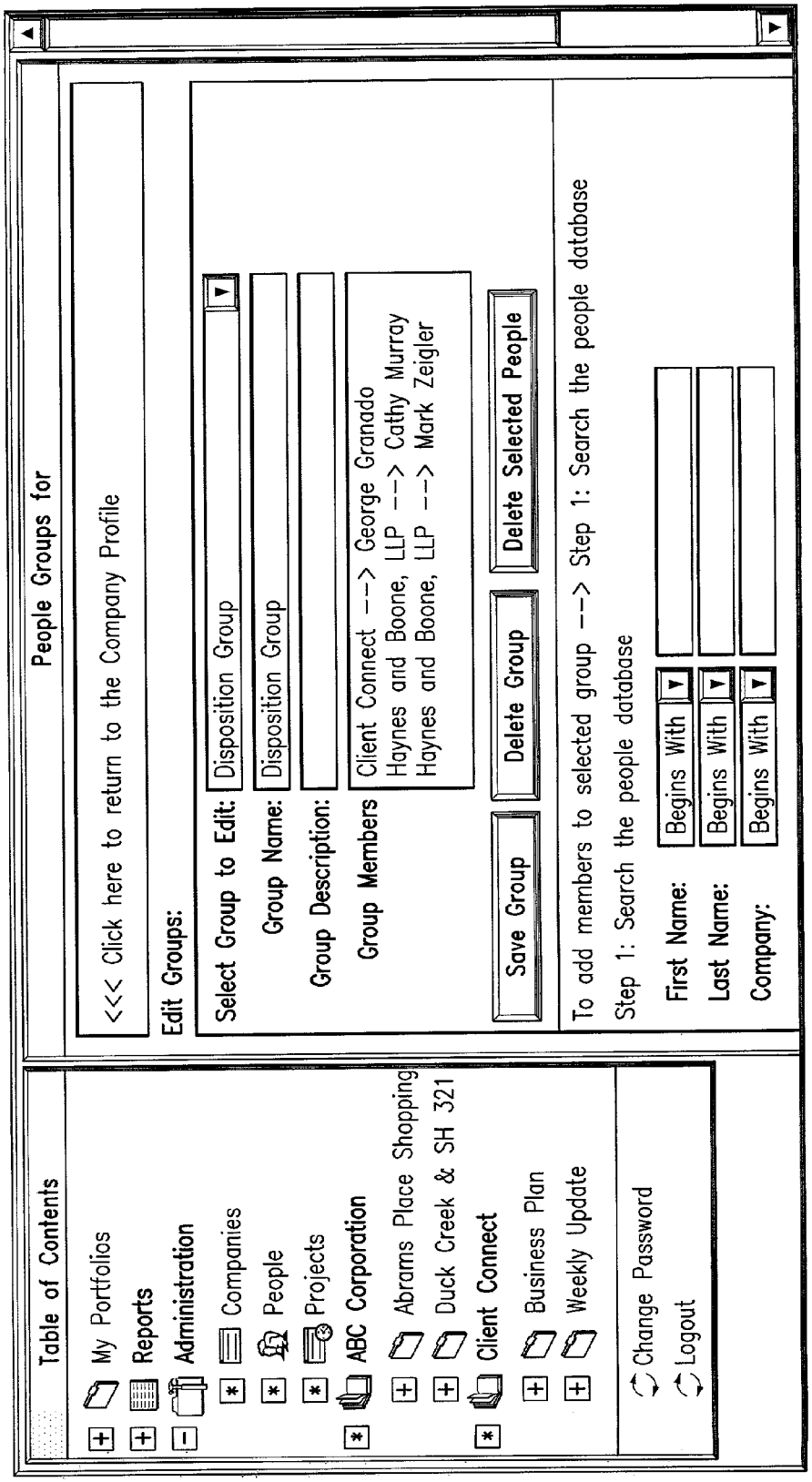

The People Groups section 8402d includes, for each people group, the name of the group, an optional description of the group, and a drop down menu 8414 associated with the group. From the People Groups section 8402d, clicking on a drop down menu 8414 enables the user to view the current members of the corresponding people group. There are two people groups shown in FIG. 84, including "Core Users 1," which is described as "The Main List of users", and "Secondary Group." Clicking on an Edit button 8404d results in the display of an Edit People Groups screen 8800 (FIG. 88).

People groups allow certain users to be grouped together. Created at the company component level, people groups function in conjunction with the projects component (described below), where project permissions may be applied to all users within the selected people group.

The Project Templates section 8402e enables the creation of project templates at the company level. Once created, these templates contain predefined settings and configurations that can be applied to new projects that are created within the company. Examples of some of the predefined configurations include establishing components, folders, and lists.

The Project Categories section 8402f enables the definition of project categories at the company level. Project categories allow further project classification, from a department (e.g., accounting, marketing, etc.) and project-type perspective.

Figure 89:
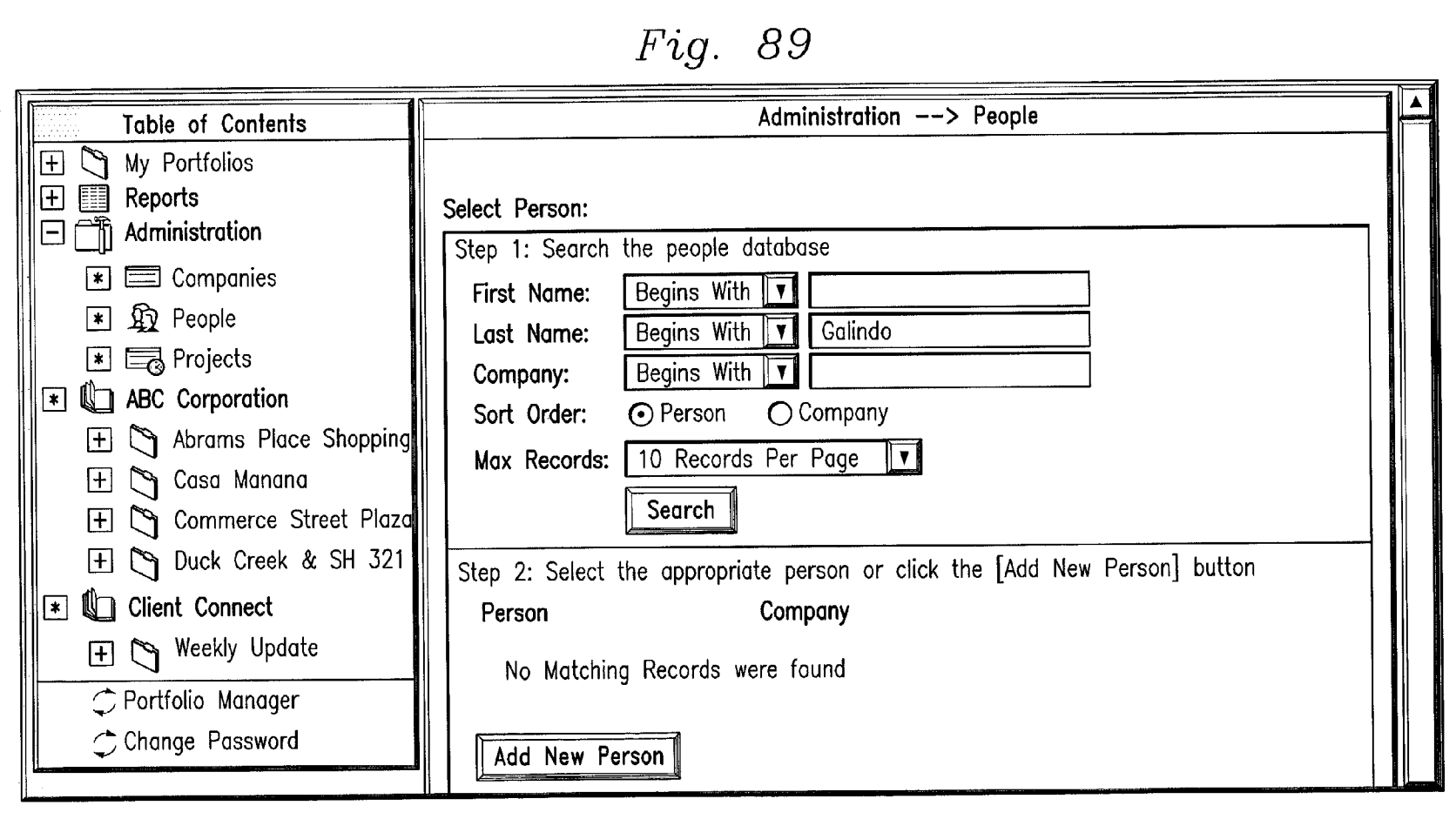
Figure 90:
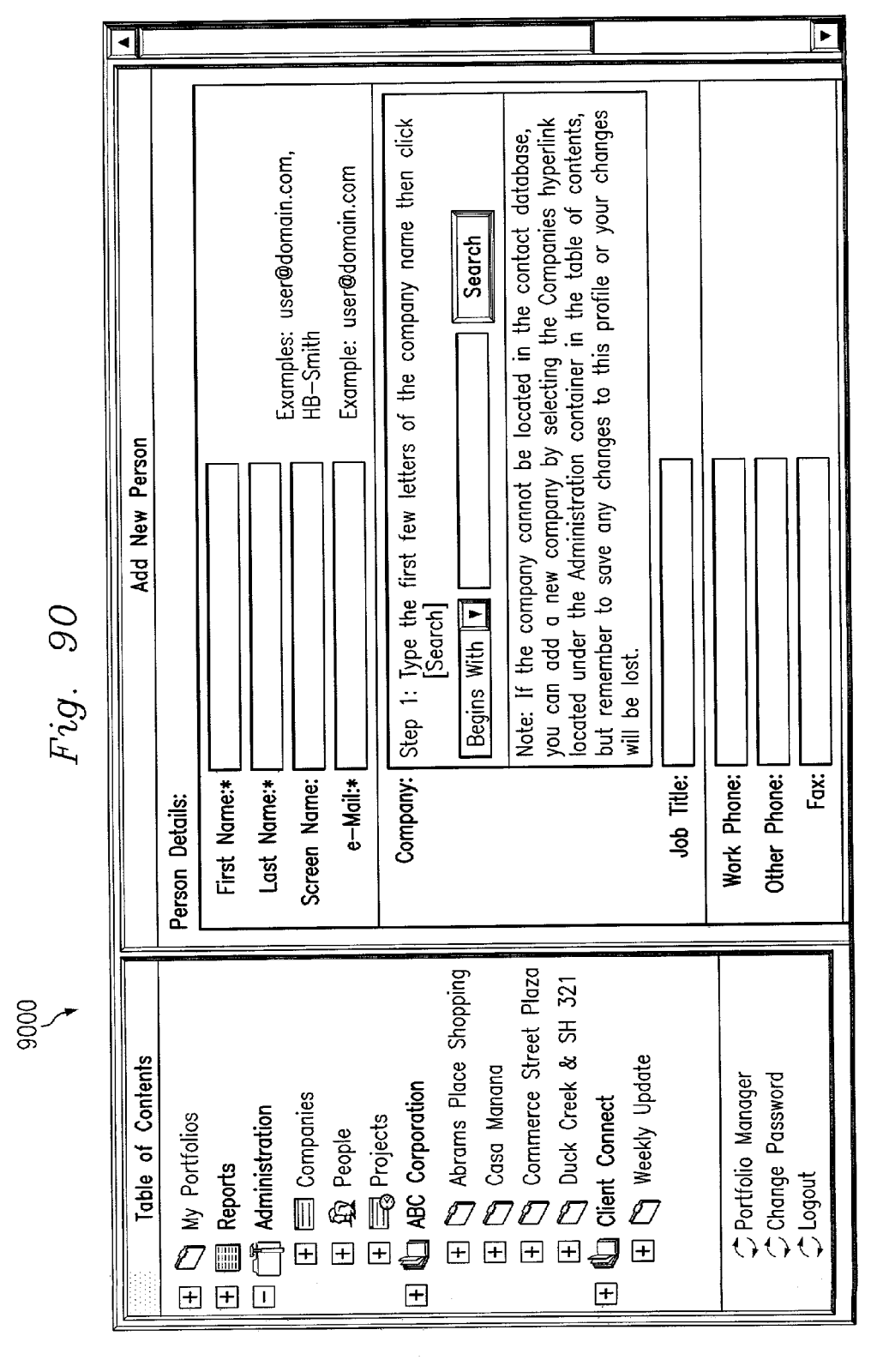
Figure 91:
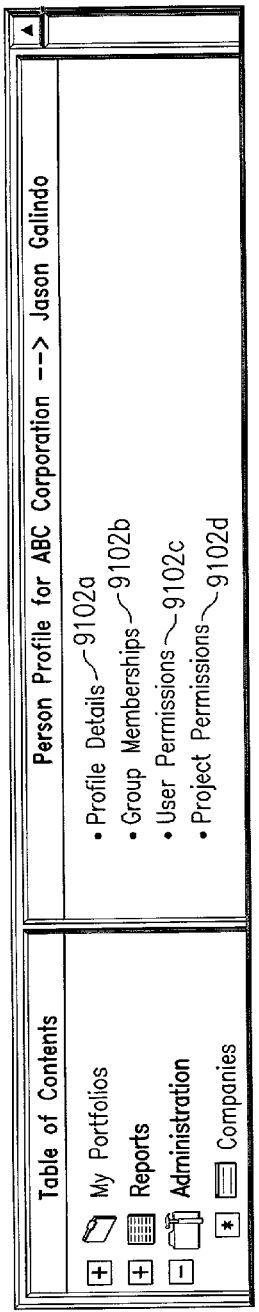

As the companies administration component provides for the management of companies within the application 12, a people administration component provides for the complete management of users within the application 12. Maintenance and functionality within the people administration component includes adding, editing, and deleting users, assigning group membership privileges to users, managing user permissions, and managing user's project permissions. Before a new user can be added, a search must be performed on the people database to verify that the user does not already exist, as illustrated in FIG. 89. Once verification that the user does not already exist has been obtained, an option is provided to add a new user via an Add New User screen 9000, as shown in FIG. 90. Via the Add New User screen 9000, the user enters such information for the new user as name, screen name, company, E-mail address, phone number, and other contact information. After the necessary information is supplied, a Person Profile screen 9100, as shown in FIG. 91, is displayed. The Person Profile screen 9100 enables the provision and assignment of further information regarding the new user by selecting one of the options 9102a-9102d provided. For example, clicking on Group Memberships enables the user to be assigned one or more group memberships. Assigning a user to group membership enables the user quickly to inherit any and all permissions assigned to the selected group. Clicking on User Permissions provides the option of assigning a new user certain administration permissions, such as the ability to create and manage projects, as well as the option to be assigned the position of "Company Administrator" for specific companies within the application. Clicking on Project Permissions enables the assignment and management of project permissions.

Figure 92:
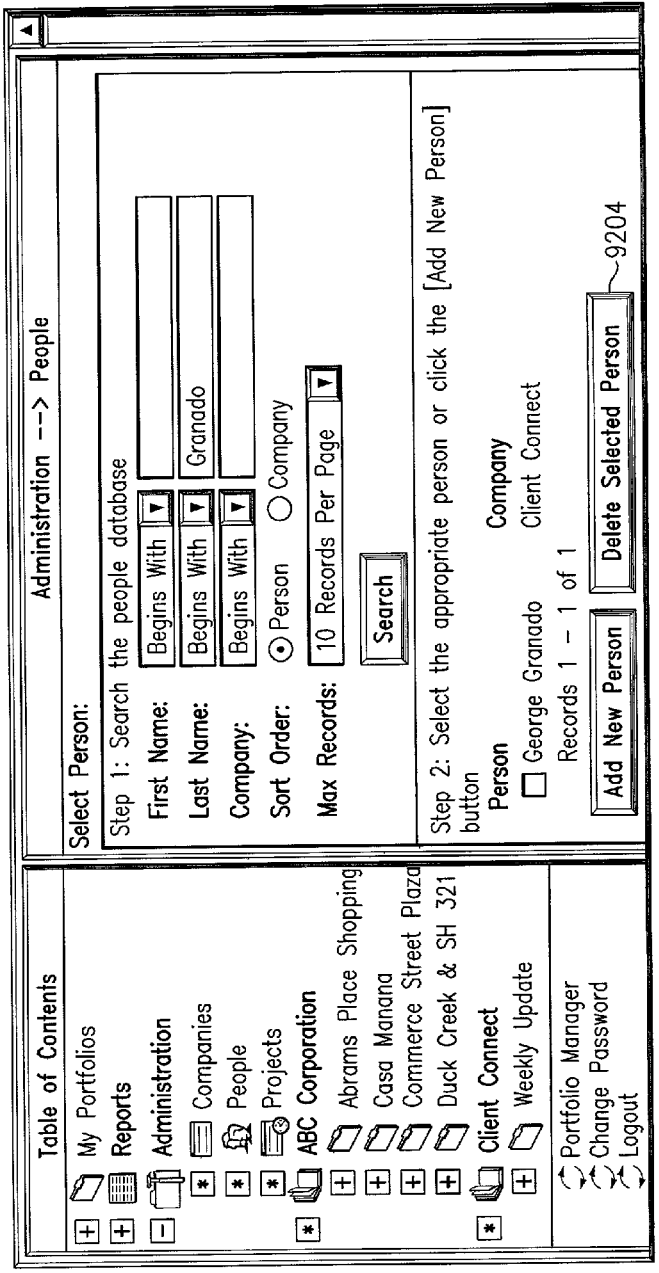

A search must also be performed to edit or delete an existing user. Once search results have identified one or more users that match the input criteria, as illustrated in FIG. 92, a user is selected by clicking on a check box next to the selected user's name. Clicking on a link comprising the selected user's name provides access to the selected user's person profile. Clicking on a Delete Selected People button 9204 results in the deletion of the selected user(s).

Finally, a project administration component is provided for the management of new and existing projects within the application 12. Project administration maintenance and functionality within this component includes the ability to create new projects, to define project attributes and configurations, and assign project permissions to users. In addition, existing projects may be edited and deleted within this component.

Figure 93:
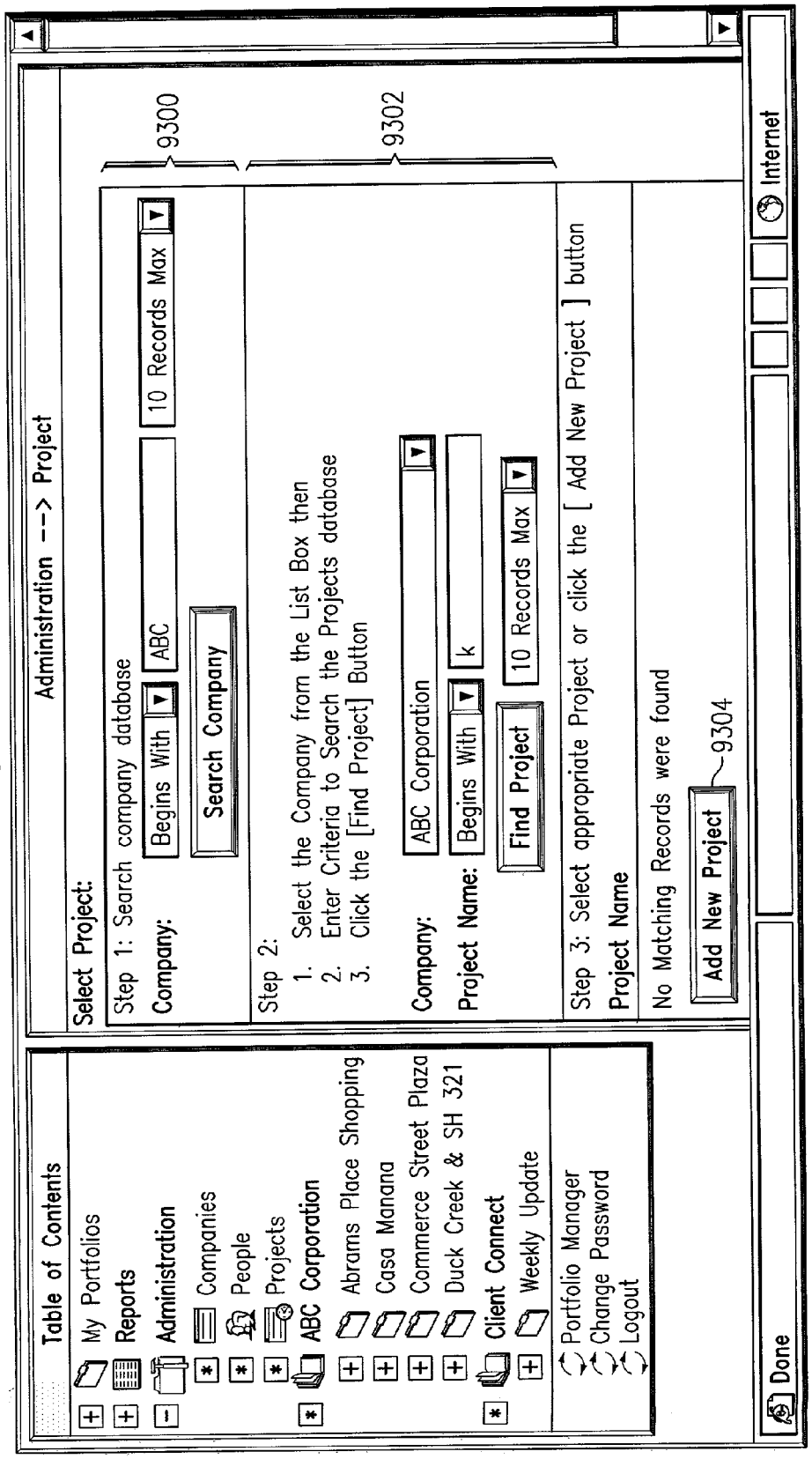

Referring now to FIG. 93, before a new project can be added, a search must be performed on the company database to locate and specify the company to which the new project will be added (section 9300). Once the company is specified, another search must be performed on the project database to verify that the project does not already exist (section 9302). Once verification that the project has not already been created has been obtained, the application 12 will provide the user with the option of adding a new project by clicking on an Add New Project button 9304.

Clicking on the Add New Project button 9404 results in the display of an Add New Project screen 9400 (FIG. 94). Using this screen 9400, the user enters project details, such as the project name, department, type, sub-type, description, and start date, in the appropriate fields. In addition, the user can specify project leads and links to other websites by clicking the appropriate links 9402, 9404, respectively.

Figure 95:
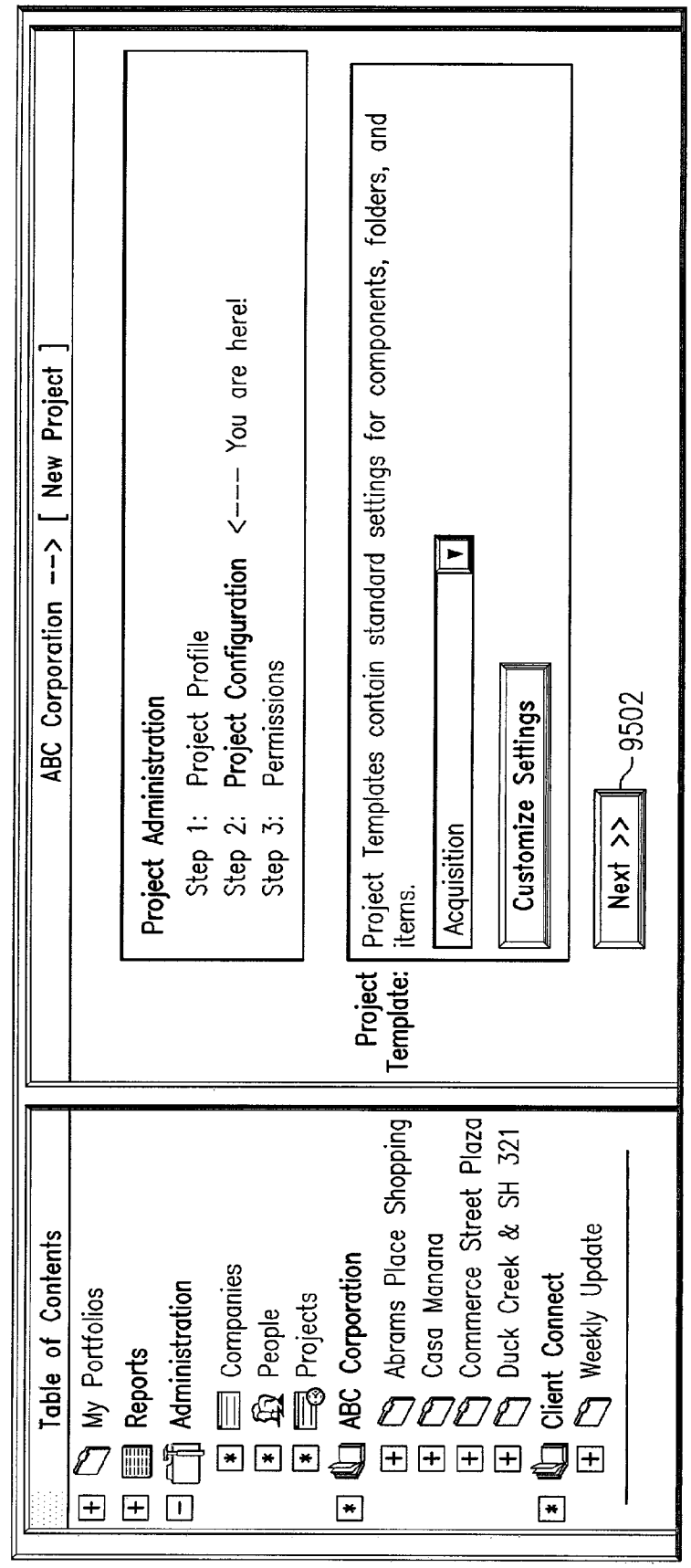

Once the project details have been entered, clicking on a Next button (not shown) gives the user the option to apply a predefined project template to the new project. Project templates are created as described above with reference to FIG. 84 and are available to be applied to new projects created within the particular company. If a new project has a project template applied, that project will "inherit" all of the template attributes and configurations. Examples of template attributes include components, folders, and E-mail groups. Additionally, the application 12 provides the option to customize the project templates at this level, as needed. FIG. 95 illustrates a Project Template screen 9500.

Clicking on a Next button 9502 brings the user to the third and final step in the creation of a new project, which is to assign project permissions to the users who will need to access the project.

Although illustrative embodiments have been shown and described, other modifications, changes, and substitutions are intended in the foregoing disclosure. For example, some operations described above may be performed by different computers working together or independently. Also, as technology progresses, some operations may be performed by a single computer. For another example, the computers 14a and/or 16a of FIG. 1 may merely be terminals to the client server 18. In addition, as previously indicated, the invention may be used in connection with any type of outside service provider, including, for example, law firms, accounting firms, advertising agencies, etc. The specific example of a law firm is used herein to facilitate a complete understanding of the invention and should not be construed to limit application of the invention in connection with other outside service providers. Accordingly, it is appropriate that the appended claims be construed broadly and in a manner consistent with the scope of the disclosure.

What is claimed is:

1. A method of implementing a collaborative management system, the method comprising:
    posting an item to a project within the collaborative management system; sending to a user an E-mail message notifying the user that the posted item has been posted; storing in connection with the posted item the contents of the E-mail message; and responsive to the user sending a response to the E-mail message, storing in connection with the posted item the contents of the response; and
    displaying in connection with the posted item a response thread identifying a number of E-mail messages and a number of responses sent in connection with the posted item.

2. The method of claim 1 wherein the posted item is a document, the method further comprising:
    publishing the document to a separate website; and
    sending to a third party an E-mail message notifying the third party that the document has been published.

3. The method of claim 2 wherein the publishing occurs subsequent to the posting.

4. The method of claim 2 wherein the publishing occurs simultaneously with the posting.

5. The method of claim 2 wherein the E-mail message to the third party includes a hyperlink to the published document.

6. The method of claim 1 wherein the posted item is a document, the method further comprising taking an action with respect to the document selected from the group consisting of viewing, printing, downloading, sorting, deleting, and adding a new version of the document.

7. The method of claim 2 further comprising:
    unpublishing the published document; and
    sending to the third party an E-mail message notifying the third party that the document has been unpublished.

8. The method of claim 2 further comprising creating a distribution list in connection with the project, the distribution list comprising a list of third parties to be notified that the document has been published.

9. The method of claim 1 further comprising creating a user group in connection with the project, the user group comprising a list of users to be notified that the item has been posted.

10. The method of claim 1 further comprising defining within the collaborative management system a company, comprising:
    providing contact information for the company;
    identifying a component of the collaborative management system that has been licensed for use by the company;
    identifying user permissions for the company;
    defining a people group for the company;
    creating a project template for the company; and
    creating a project category for the company.

11. The method of claim 1 further comprising defining within the collaborative management system a user, wherein the defining includes at least one of the following steps:
    providing contact and identification information for the user;
    identifying a group to which the user is a member;
    assigning administrative permissions to the user; and
    assigning project permissions to the user.

12. The method of claim 1 further comprising defining within the collaborative management system a project, wherein the defining includes at least one of the following steps:
    creating a project profile for the project;
    configuring the project; and
    assigning permissions in connection with the project.

13. A method of implementing a collaborative management system, the method comprising:
    posting an item to a project; sending a first E-mail message notifying a user that the posted item has been posted;
    storing in connection with the posted item the contents of the first E-mail message; responsive to the user sending a response to the E-mail message, storing in connection with the posted item the contents of the response; publishing the item to a website;
    sending to a third party a second E-mail message notifying the third party that the item has been published; and
    displaying in connection with the posted item a response thread identifying a number of E-mail messages to users and a number of responses sent in connection with the posted item.

14. The method of claim 13 further comprising displaying in connection with the posted item the contents of the first E-mail message and responses sent regarding the posted item.

15. The method of claim 13 wherein the publishing occurs subsequent to the posting.

16. The method of claim 13 wherein the publishing occurs simultaneously with the posting.

17. The method of claim 13 wherein the second E-mail message includes a hyperlink to the published item.

18. The method of claim 13 wherein the posted item is a document, the method further comprising taking an action with respect to the document selected from the group consisting of viewing, printing, downloading, sorting, deleting, and adding a new version of the document.

19. The method of claim 13 further comprising:
unpublishing the published item; and
sending to the third party an E-mail message notifying the third party that the item has been unpublished.

20. The method of claim 13 further comprising creating a distribution list in connection with the project, the distribution list comprising a list of third parties to be notified that the item has been published.

21. The method of claim 13 further comprising creating a user group in connection with the project, the user group comprising a list of users to be notified that the item has been posted.

22. The method of claim 13 further comprising defining within the collaborative management system a company, wherein the defining includes at least one of the following steps:
providing contact information for the company;
identifying a component of the collaborative management system that has been licensed for use by the company;
identifying user permissions for the company;
defining a people group for the company;
creating a project template for the company; and
creating a project category for the company.

23. The method of claim 13 further comprising defining within the collaborative management system a user, wherein the defining includes at least one of the following steps:
providing contact and identification information for the user;
identifying a group to which the user is a member;
assigning administrative permissions to the user; and
assigning project permissions to the user.

24. The method of claim 13 further comprising defining within the collaborative management system a project, wherein the defining includes at least one of the following steps:
creating a project profile for the project;
configuring the project; and
assigning permissions in connection with the project.

* * * * *